US009986085B2

United States Patent
Lee et al.

(10) Patent No.: US 9,986,085 B2
(45) Date of Patent: May 29, 2018

(54) MOBILE DEVICE AND METHOD OF EXECUTING APPLICATION BASED ON PARTICULAR ZONE

(71) Applicant: SAMSUNG ELECTRONICS CO., LTD., Suwon-si (KR)

(72) Inventors: Sung-min Lee, Suwon-si (KR); Chan-ju Park, Seoul (KR); Bok-deuk Jeong, Yongin-si (KR); Jae-yong Yoo, Gwangju (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 79 days.

(21) Appl. No.: 14/815,177

(22) Filed: Jul. 31, 2015

(65) Prior Publication Data

US 2016/0036963 A1 Feb. 4, 2016

(30) Foreign Application Priority Data

Jul. 31, 2014 (KR) .................. 10-2014-0098637
Jun. 9, 2015 (KR) .................. 10-2015-0081505
Jul. 27, 2015 (KR) .................. 10-2015-0106102

(51) Int. Cl.
*H04M 1/725* (2006.01)
*G06Q 10/10* (2012.01)
(Continued)

(52) U.S. Cl.
CPC .......... *H04M 1/72572* (2013.01); *G06F 8/61* (2013.01); *G06F 8/62* (2013.01); *G06F 9/445* (2013.01);
(Continued)

(58) Field of Classification Search
CPC . H04M 1/72572; H04M 1/72522; G06F 8/61; G06F 8/62; H04W 4/021; H04W 4/028; H04W 4/043
See application file for complete search history.

(56) References Cited

U.S. PATENT DOCUMENTS

| 8,136,117 B2* | 3/2012 | Kamura ............... G06F 9/5077 709/220 |
| 8,230,069 B2 | 7/2012 | Korupolu |

(Continued)

FOREIGN PATENT DOCUMENTS

| JP | 4987555 B2 | 7/2012 |
| KR | 10-1151591 B1 | 6/2012 |
| WO | 2013/022849 A1 | 2/2013 |

OTHER PUBLICATIONS

Communication dated Oct. 14, 2015 issued by the European Patent Office in counterpart European Patent Application No. 15179378.3.
(Continued)

*Primary Examiner* — Patrick Edouard
*Assistant Examiner* — Eboni Hughes
(74) *Attorney, Agent, or Firm* — Sughrue Mion, PLLC

(57) ABSTRACT

Provided is a mobile terminal that executes an application in a predetermined area, and a method performed by the mobile terminal. The mobile terminal that executes the application in the predetermined area may include a memory; a location finder configured to obtain location information of the mobile terminal; a communicator configured to communicate with a server; and a controller configured to receive, via the communicator, the application that is executable in a predetermined area corresponding to the obtained location information and an operating system (OS) for executing the application from a server that corresponds to the obtained location information, and to install the application and the OS in the memory.

28 Claims, 69 Drawing Sheets

(51) Int. Cl.
*G06F 9/445* (2018.01)
*H04W 4/02* (2018.01)
*H04W 4/04* (2009.01)
*G06F 9/455* (2018.01)

(52) U.S. Cl.
CPC ......... *G06F 9/45533* (2013.01); *G06Q 10/10* (2013.01); *H04M 1/72522* (2013.01); *H04W 4/021* (2013.01); *H04W 4/028* (2013.01); *H04W 4/043* (2013.01)

(56) References Cited

U.S. PATENT DOCUMENTS

| | | |
|---|---|---|
| 2010/0146504 A1 | 6/2010 | Tang |
| 2011/0208797 A1 | 8/2011 | Kim |
| 2011/0314467 A1 | 12/2011 | Pearson |
| 2012/0042036 A1* | 2/2012 | Lau ........................... G06F 8/61 709/217 |
| 2013/0007734 A1 | 1/2013 | McCloy |
| 2014/0019970 A1* | 1/2014 | Okamoto .............. G06F 9/4856 718/1 |
| 2014/0136830 A1* | 5/2014 | Chan ................. G06F 17/30085 713/2 |
| 2014/0194146 A1 | 7/2014 | Yarvis |
| 2014/0208397 A1 | 7/2014 | Peterson |

OTHER PUBLICATIONS

Communication dated Nov. 13, 2015 issued by the International Searching Authority in counterpart International Patent Application No. PCT/KR2015/007991 (PCT/ISA/210 and PCT/ISA/237).

\* cited by examiner

FIG. 16

| | VIRTUAL MACHINE REQUEST INFORMATION | EXAMPLES |
|---|---|---|
| 800 | | |
| 801 | USER INFORMATION | COMPANY STAFF MEMBER: USER ID, USER NAME, EMPLOYEE NUMBER, CONTACT INFORMATION, NAME OF DEPARTMENT, POSITION, ASSIGNED TASK, SECURITY LEVEL, ETC. |
| | | VISITOR : COMPANY NAME OF VISITOR, NAME OF VISITOR, RESIDENT REGISTRATION NUMBER, TELEPHONE NUMBER, TELEPHONE NUMBER, MEETING ROOM INFORMATION, VISIT PURPOSE INFORMATION, RELATED-TASK INFORMATION, ETC. |
| 802 | TERMINAL LOCATION INFORMATION | ADDRESS INFORMATION OF CURRENT LOCATION, BUILDING INFORMATION, PARTICULAR FLOOR OF BUILDING, PARTICULAR OFFICE INFORMATION, ETC. |
| 803 | ADDITIONAL INFORMATION | AUTHORITY INFORMATION PRE-OBTAINED BY USER (E.G., AUTHORITY EQUIVALENT TO STAFF MEMBER OF COMPANY, AUTHORITY EQUIVALENT TO STAFF MEMBER OF COOPERATIVE FIRM, AUTHORITY TO INCREASE SECURITY LEVEL IN PARTICULAR OFFICE, ETC.) |
| | | ATTENDANCE TIME INFORMATION, QUITTING TIME INFORMATION, ETC |

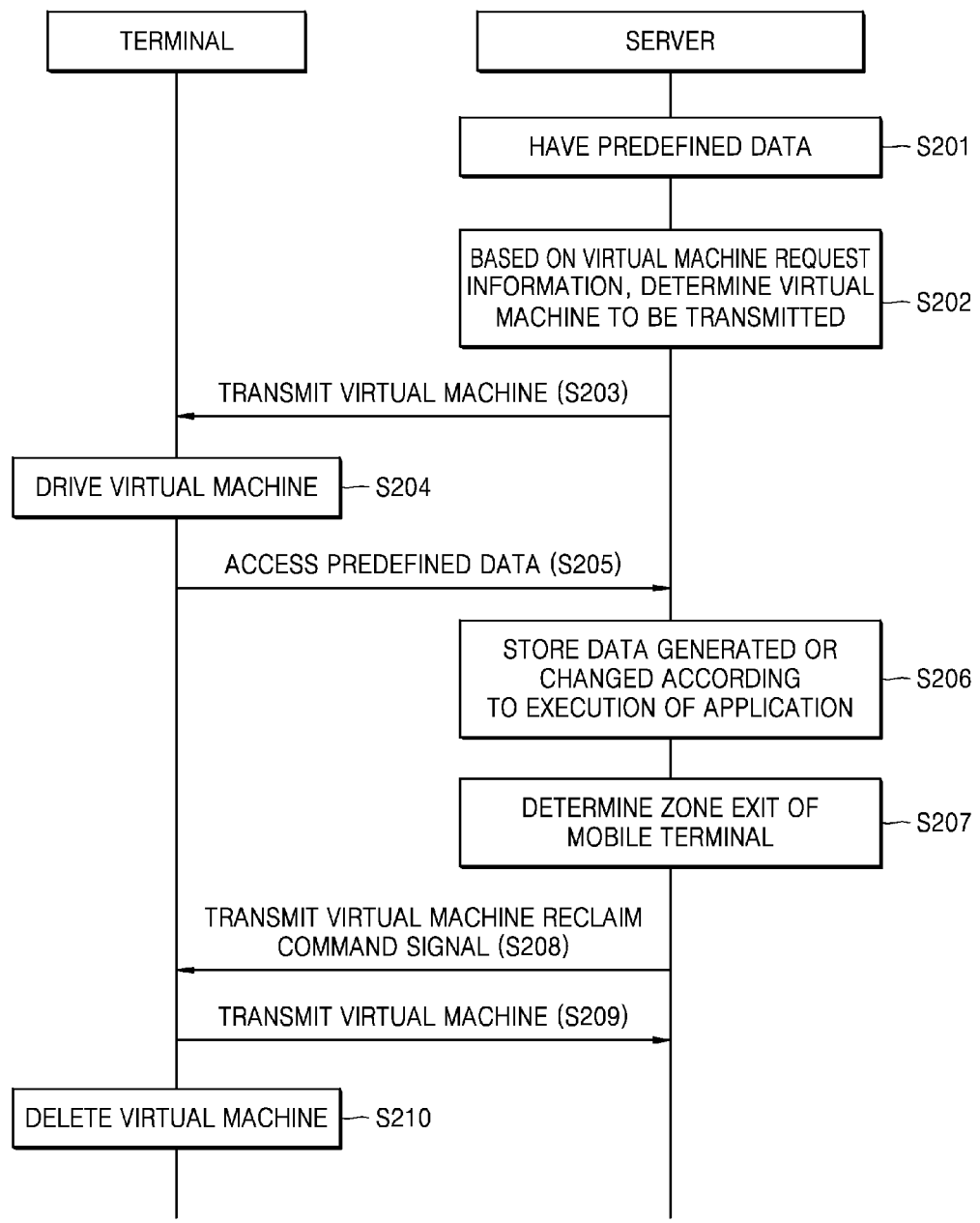

FIG. 39

| | VIRTUAL MACHINE REQUEST INFORMATION | EXAMPLES |
|---|---|---|
| 810 | | |
| 811 | USER INFORMATION | AGE INFORMATION, GENDER INFORMATION, SPOKEN LANGUAGE INFORMATION, NATIONALITY, RESIDENCE INFORMATION, INFORMATION OF INTERESTS, TERMINAL PERFORMANCE INFORMATION, ETC. |
| 812 | TERMINAL LOCATION INFORMATION | BUILDING, FLOOR LEVEL, AND EXHIBITION ROOM INFORMATION OF CURRENT LOCATION, INFORMATION ABOUT ENTERING DISTANCE RANGE FROM PARTICULAR WORK OF ART, ETC |
| 813 | ADDITIONAL INFORMATION | AUTHORITY INFORMATION USER PRE-OBTAINED (E.G., INFORMATION ABOUT WHETHER USER PURCHASED TICKET (PAID VIEWING OR FREE VIEWING), VIEWING AUTHORITY ON PARTICULAR EXHIBITION ROOM, AND AUTHORITY DURING PARTICULAR TIME PERIOD)<br><br>INFORMATION ABOUT VIEWING-ALLOWED SECTIONS DEPENDING ON TICKET TYPES<br><br>ADMISSION TIME INFORMATION, EXPECTED EXIT TIME INFORMATION<br><br>DESIRED SERVICE INFORMATION ABOUT IMAGE, VOICE, TEXT, ETC. |

FIG. 47

| | VIRTUAL MACHINE REQUEST INFORMATION | EXAMPLES |
|---|---|---|
| 820 | | |
| 821 | USER INFORMATION | STUDENT : STUDENT ID INFORMATION, STUDENT ID CARD NUMBER, STUDENT ID NUMBER, USER ID, USER NAME, CONTACT INFORMATION, GRADE-LEVEL INFORMATION, GENDER INFORMATION, ETC.<br>PROFESSOR : PROFESSOR ID INFORMATION, EMPLOYEE NUMBER, USER ID, USER NAME, CONTACT INFORMATION, TEACHING CLASS INFORMATION, TEACHING SUBJECT INFORMATION, CAREER INFORMATION, POSITION INFORMATION, ETC. |
| 822 | TERMINAL LOCATION INFORMATION | BUILDING INFORMATION, CLASS ROOM INFORMATION, PROFESSOR'S OFFICE INFORMATION, SCHOOL EXAMINATION SITE INFORMATION, RESTAURANT INFORMATION, PLAYGROUND INFORMATION, ETC. |
| 823 | ADDITIONAL INFORMATION | FOR CLASS REGISTRATION : REGISTERED SUBJECT INFORMATION, PROGRESS INFORMATION FOR EACH SUBJECT, REGISTERED-SUBJECTS SUMMARY INFORMATION, SELECTED PROFESSOR INFORMATION, ETC.<br>FOR EXAMINATION : EXAMINATION SUBJECT INFORMATION, EXAMINATION LEVEL INFORMATION, ETC.<br>ATTENDANCE AND TARDINESS CONFIRMATION INFORMATION, ETC. |

FIG. 48A

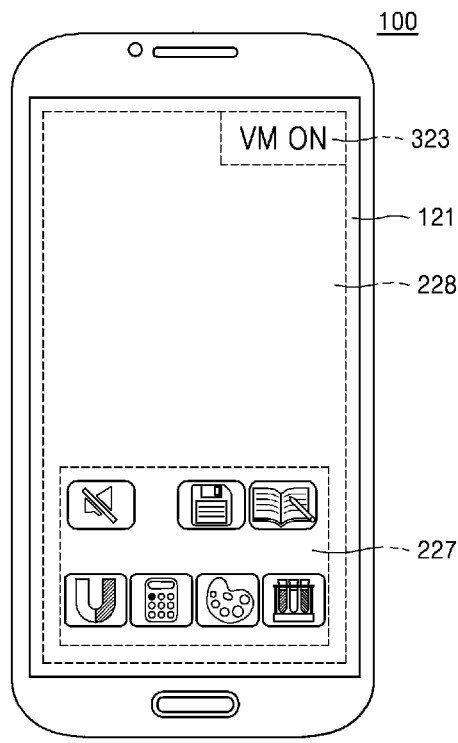

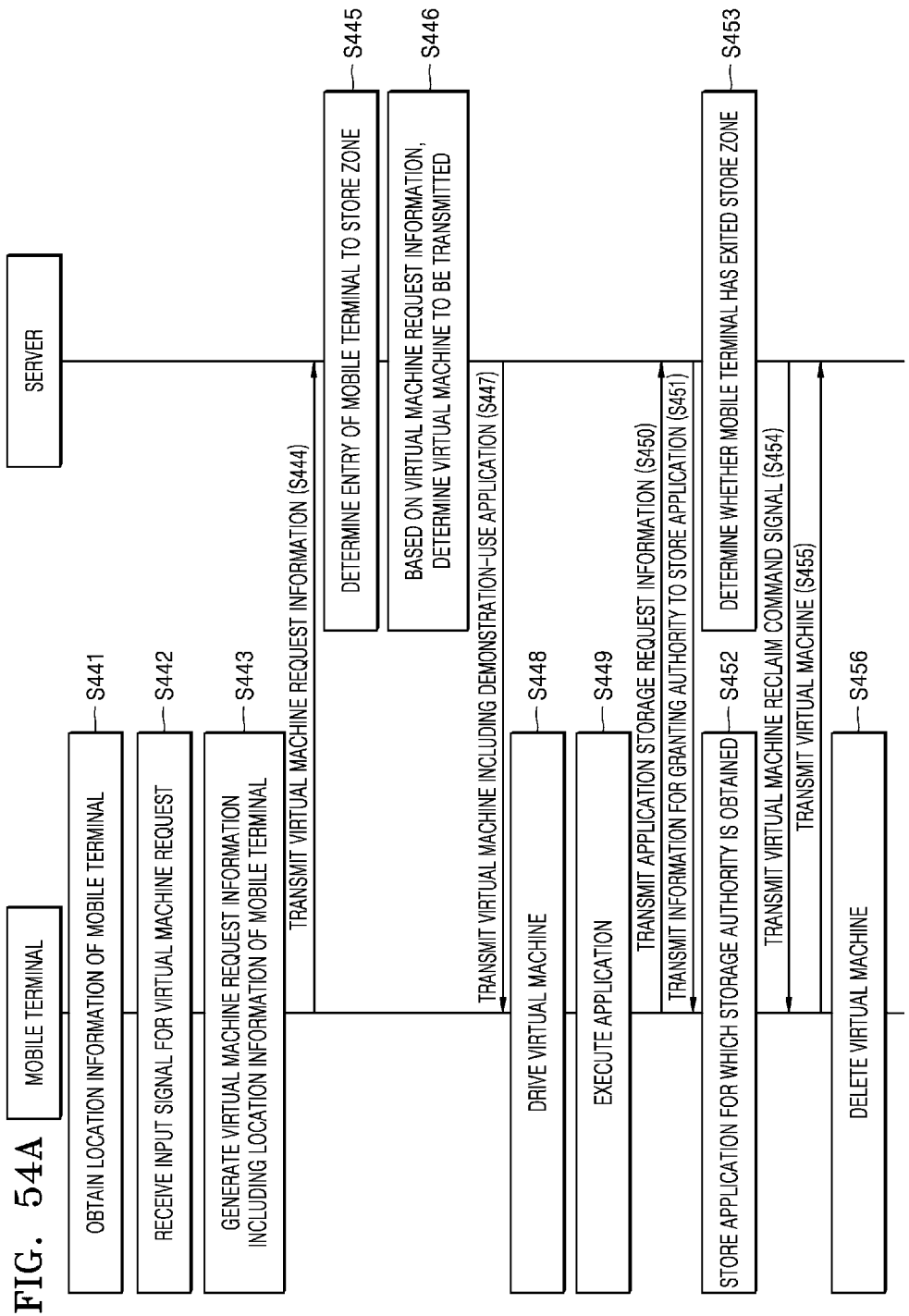

MOBILE DEVICE AND METHOD OF EXECUTING APPLICATION BASED ON PARTICULAR ZONE

CROSS-REFERENCE TO RELATED APPLICATIONS

This application claims priority from Korean Patent Application Nos. 10-2014-0098637, filed on Jul. 31, 2014, 10-2015-0081505, filed on Jun. 9, 2015, and 10-2015-0106102, filed on Jul. 27, 2015, in the Korean Intellectual Property Office, the disclosures of which are incorporated herein by reference in their entireties.

BACKGROUND

1. Field

Apparatuses and methods consistent with exemplary embodiments relate to executing an application in a particular zone, and more particularly, to a mobile device and method of driving a virtual machine (VM) for executing a particular service provided by a server, based on a location of the mobile device.

2. Description of the Related Art

Due to advancement in computer network technologies, a computing environment that depended on an independent hardware function of each terminal has evolved into a cloud computing environment that provides a service by using all computing resources in a network, according to a request of a terminal.

A cloud computing service is an 'on-demand outsourced service of computing resources' via an information communication network such as the internet. In a cloud computing environment, a service provider consolidates, via virtualization, data centers that are distributed over a network, and provides a service that users need.

The service provider generally does not install and use required computing resources such as applications, storage, operating systems (OS), security software, etc. in a terminal of each user that owns the terminal. Instead, the service provider selects desired services generated in a virtual space via virtualization and uses the desired services at a desired time.

A cloud computing system using virtualization may generate, by using one physical machine, a plurality of virtual machines that are independent execution environments, and may install and execute an independent OS or applications in each of the generated virtual machines.

The virtual machine may be a virtual computing execution environment generated with hardware resources allocated from the physical machine. A hypervisor may be software that generates the virtual machine and manages an OS or applications installed and executed in the virtual machine.

In a cloud computing system that provides a cloud computing service, a virtual machine migration technology may be used for migrating the virtual machine between a plurality of physical machines that configure the cloud computing system.

SUMMARY

Provided is a mobile terminal and a method of driving a virtual machine (VM) for executing a particular service provided by a server, based on a location of the mobile device.

Additional aspects will be set forth in part in the description which follows and, in part, will be apparent from the description, or may be learned by practice of the presented exemplary embodiments.

According to an aspect of an exemplary embodiment, there is provided a mobile terminal that executes an application in a predetermined area, the mobile terminal including: a memory; a location finder configured to obtain location information of the mobile terminal; a communicator configured to communicate with a server; and a controller configured to: receive, via the communicator, the application that is executable in a predetermined area corresponding to the obtained location information and an operating system (OS) for executing the application from a server that corresponds to the obtained location information; and install the application and the OS in the memory.

The application and the OS may be configured to operate in a virtual machine.

In response to the controller determining, based on the obtained location information, that the mobile terminal has entered the predetermined area, the controller may be further configured to transmit virtual machine request information including the obtained location information to the server that corresponds to the obtained location information.

The controller may be further configured to receive, via the communicator, data that may be used for executing the application, from the server corresponding to the obtained location information.

The controller may be further configured to execute the application, and to access, via the communicator, data that may be stored in the server corresponding to the obtained location information and may be used in executing the application.

The controller may be further configured to access the data stored in the server corresponding to the obtained location information by using a network file system (NFS).

The controller may be further configured to execute the application, and to store, in the memory, data that may be generated by the execution of the application.

The controller may be further configured to execute the application; transmit, via the communicator, data generated by the execution of the application, to the server that corresponds to the obtained location information; and control the data to be stored in the server.

When the application and the OS are installed in the memory, the controller may be further configured to set whether to store data generated by execution of the application in the memory, or whether to store, via the communicator, the data in the server corresponding to the obtained location information.

The mobile terminal may include a display, wherein, in response to the controller determining, based on the obtained location information, that the mobile terminal has entered the predetermined area, the controller may be further configured to control the display to display information about the application that may be executable in the predetermined area.

The mobile terminal may include a display configured to display a background screen corresponding to an OS that may be driven in the mobile terminal, and wherein, when the controller drives the OS received from the server, the controller may be further configured to switch a screen of the display to a background screen corresponding to the OS received from the server.

The location finder may be further configured to obtain the location information of the mobile terminal at regular intervals.

In response to the controller determining, based on the obtained location information, that the mobile terminal has exited the predetermined area, the controller may be further configured to delete the installed application and the installed OS.

In response to the controller determining, based on the obtained location information, that the mobile terminal has exited the predetermined area, the controller may be further configured to transmit the installed application and the installed OS to the server.

According to an aspect of another exemplary embodiment, there is provided a method of executing an application in a predetermined area, the method performed by a mobile terminal and including: obtaining location information of the mobile terminal; receiving, via a communicator, the application that is executable in the predetermined area corresponding to the obtained location information and an operating system (OS) for executing the application from a server that corresponds to the obtained location information; and installing the application and the OS in a memory of the mobile terminal.

The installed application and the installed OS operate in a virtual machine.

The method may include determining, based on the obtained location information, whether the mobile terminal has exited the predetermined area, and if the mobile terminal has exited the predetermined area, deleting the installed application and the installed OS, and wherein the obtaining the location information may include obtaining the location information of the mobile terminal at regular intervals.

According to an aspect of another exemplary embodiment, there is provided a server that provides an application that is executable in a predetermined area, the server including: a communicator configured to communicate with a mobile terminal; and a controller configured to transmit, via the communicator, the application and an operating system (OS) for executing the application to the mobile terminal located in the predetermined area.

In response to the controller obtaining location information of the mobile terminal at regular intervals and determining, based on the location information, that the mobile terminal has exited the predetermined area, the controller may be further configured to transmit, via the communicator, a signal to the mobile terminal for reclaiming the application and the OS.

In response to the controller obtaining location information of the mobile terminal at regular intervals and determining, based on the location information, that the mobile terminal has exited the predetermined area, the controller may be further configured to transmit, via the communicator, a signal to the mobile terminal for deleting the application and the OS.

In response to the controller obtaining location information of the mobile terminal at regular intervals and determining, based on the location information, that the mobile terminal has exited the predetermined area, the controller may be further configured to transmit, via the communicator, a signal to the mobile terminal for limiting at least one function that may be provided by the application.

After a predetermined time period has elapsed, the controller may be further configured to transmit, via the communicator, a signal to the mobile terminal for limiting at least one function that may be provided by the application.

According to an aspect of another exemplary embodiment, there is provided a system including a mobile terminal that executes an application in a predetermined area and a server that provides the application, wherein the mobile terminal is configured to: receive the application, which is executable in the predetermined area corresponding to location information of the mobile terminal, and an operating system (OS) for executing the application, from the server corresponding to the obtained location information of the mobile terminal, and install the application and the OS in a memory of the mobile terminal; and the server is configured to transmit the application and the OS for executing the application to the mobile terminal located in the predetermined area.

The mobile terminal may include a display on which a user may be notified when the user enters a predetermined area.

The mobile terminal may be further configured to receive a user input signal for a virtual machine request.

According to an aspect of another exemplary embodiment, there is provided a method of driving a virtual machine on a mobile terminal, the method including: obtaining location information of the mobile terminal; receiving an input signal from the user including user information; generating virtual machine request information including at least one of the location information of the mobile terminal and the user information; and transmitting the virtual machine request information to an external source.

The user information may include at least one of age information of the user, gender information of the user, nationality information of the user, and position information in a company of the user.

The location information may include at least one of address information of a current location, building information, and a particular floor of a building.

BRIEF DESCRIPTION OF THE DRAWINGS

These and/or other aspects will become apparent and more readily appreciated from the following description of the exemplary embodiments, taken in conjunction with the accompanying drawings, in which:

FIG. 16 illustrates an example of information included in the virtual machine request information according to an exemplary embodiment;

FIG. 19 is a flowchart illustrating a controlling method performed by the server and the terminal that accesses data stored in the server, according to an exemplary embodiment;

FIG. 39 illustrates examples of information included in the virtual machine request information, according to an embodiment;

FIG. 47 illustrates a table showing examples of information included in virtual machine request information, according to an exemplary embodiment;

FIGS. 48A through 48C illustrate screens of the mobile terminal in which a virtual machine operates, according to an exemplary embodiment;

FIG. 54A is a flowchart illustrating a controlling method performed by the terminal and the server, according to an exemplary embodiment;

DETAILED DESCRIPTION

Figure 1:
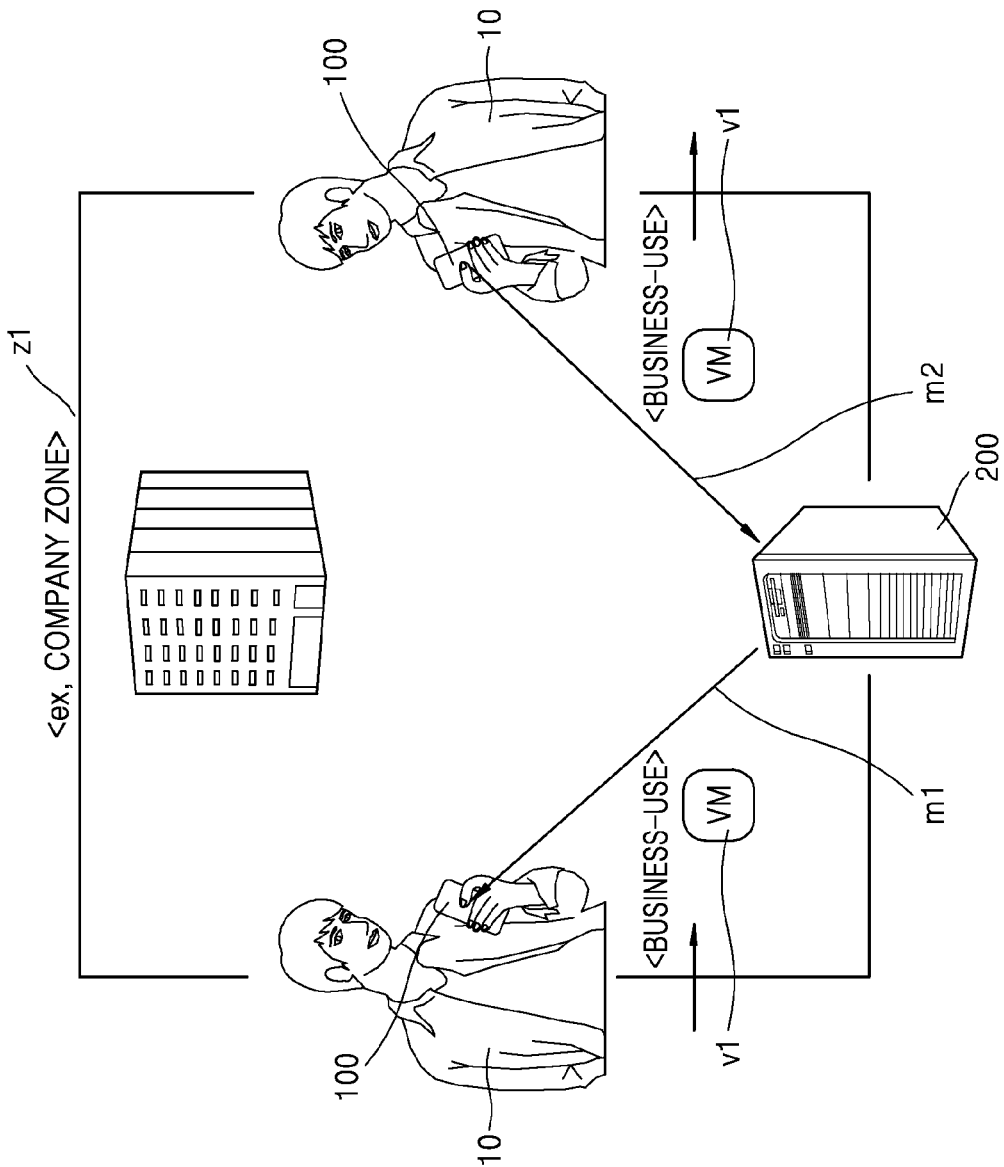
FIG. 1 is a diagram illustrating a user entering a company zone, according to an exemplary embodiment.

Reference will now be made in detail to exemplary embodiments, examples of which are illustrated in the accompanying drawings. The exemplary embodiments may have different forms and should not be construed as being limited to the descriptions set forth herein. The exemplary embodiments are merely described below, by referring to the figures, to explain aspects of the inventive concept. Throughout the present disclosure, like reference numerals refer to like elements. Well-known functions or constructions are not necessarily described in detail if it would obscure the invention with unnecessary detail. Although the terms including an ordinal number such as first, second, etc., can be used for describing various elements, the structural elements are not restricted by the terms. The terms are only used to distinguish one element from another element. For example, without departing from the scope of the present disclosure, a first structural element may be named a second structural element. Similarly, the second structural element also may be named the first structural element.

Furthermore, in the present disclosure, a "module" or a "unit" may perform at least one function or operation and may be embodied as hardware or software or as a combination of hardware and software. Also, a plurality of "modules" or a plurality of "units" may be integrated into at least one module except a "module" or a "unit" that may be embodied as particular hardware, to be embodied as at least one processor.

Throughout the present disclosure, a mobile terminal may include a mobile phone, a smartphone, a tablet personal computer (PC), a laptop computer, a terminal for digital broadcasting, a personal digital assistant (PDA), a portable multimedia player (PMP), navigation, etc. However, except for an example in which a configuration is applicable only to a mobile terminal, it should be understood that configurations according to one or more exemplary embodiments may be applied to a fixed terminal such as a digital television (TV), a desktop computer, etc.

Throughout the present disclosure, it should also be understood that when an element is referred to as being "connected to" or "coupled with" another element, it can be directly connected to or coupled with the other element, or it can be electrically connected to or coupled with the other element by having an intervening element interposed therebetween. Also, when a part "includes" or "comprises" an element, unless there is a particular description to the contrary, the part can further include other elements, not excluding the other elements.

Below, terms of the present disclosure are briefly described.

Throughout the present disclosure, a 'virtual machine (VM)' installed in a mobile terminal may correspond to a virtual computing execution environment that is generated with hardware resources allocated from the mobile terminal, and may indicate software including an application and an operating system (OS) for executing the application.

Throughout the present disclosure, the virtual machine may be referred to as 'virtual machine', 'VM', or 'virtual machine service'.

Throughout the present disclosure, a 'zone' may mean a particular area having a range that is predefined based on location information. A server may preset the range (i.e., the zone) where the virtual machine service is provided. That is, the zone may indicate a particular area with a predefined range (e.g., within a 50-meter radius from a point where an exhibition hall A is located, a first floor of the exhibition hall A, in a building of the S company, etc.) that is set by the server that provides the virtual machine service. Thus, when the mobile terminal is located in the particular area (the zone) with the predefined range, the mobile terminal may be provided with the virtual machine service including an application provided by the server that corresponds to the particular area.

As used herein, the term "and/or" includes any and all combinations of one or more of the associated listed items. Expressions such as "at least one of," when preceding a list of elements, modify the entire list of elements and do not modify the individual elements of the list.

Below, one or more exemplary embodiments will be described in detail with reference to the attached drawings.

FIG. 1 is a diagram illustrating a user entering a company zone, according to an exemplary embodiment.

According to an exemplary embodiment, as illustrated in FIG. 1, if a user 10 who carries a mobile terminal 100 (also referred to as the terminal 100) enters a zone z1 corresponding to a company, the user 10 may receive (m1) a VM v1 including applications for company work and an OS for executing the applications, from a server 200 (also referred to as the company server 200) corresponding to the company; the user may install the VM v1 in a memory of the mobile terminal 100; and the user may execute the VM v1.

For example, a staff member who enters a company zone may install applications (e.g., a business document work application, an application related to contact information of in-house staff, a work clock-in/clock-out application tracking time at work, etc.) required in a company, and an OS for executing the applications in a personal mobile terminal of the staff member, and may use them for company work. Here, data (e.g., a document file related to work) generated by executing an application may not be stored in the personal mobile terminal of the staff member but may be transmitted to the company server 200. Accordingly, an outflow of company's classified information and business-related document files may be prevented in advance, so that security may be maintained.

Referring to FIG. 1, when the mobile terminal 100 of the user 10 exits the company zone z1, the mobile terminal 100 may transmit (m2), to the company server 200, the business-use VM v1 including the applications and the OS for executing the applications that were installed to be used in the company. According to an exemplary embodiment, when the mobile terminal 100 that received the business-use VM v1 exits a company zone, a server that corresponds to the company zone may reclaim the business-use VM v1 by transmitting a signal for reclaiming the business-use VM v1 to the mobile terminal 100. When the mobile terminal 100 exits the company zone, the mobile terminal 100 may delete the VM v1 from its memory.

When the mobile terminal 100 of the user 10 exits a particular zone (e.g., predetermined area) where execution of a VM is allowed, the mobile terminal 100 cannot execute the VM anymore.

According to an exemplary embodiment, an application required in a particular zone is not permanently installed in a user terminal but is provided for a limited time, so a VM can only be used in the particular zone. In this way, a security-required application and data generated during execution of the application may be protected.

According to an exemplary embodiment, an application required in a particular zone and an OS providing an environment capable of driving the application are temporarily uploaded to a memory of a user terminal and are executed, so that dependence on an OS loaded in the user terminal may be decreased, and thus it may be useful in a bring your own device (BYOD) environment.

For example, a user may conveniently use an Android OS for personal use but may need to use an application that is executable in a Windows OS in a particular zone (e.g., a company, an exhibition hall, a school examination site, etc.). In this example, if an OS that is driven in a user terminal is an Android OS, the user may be inconvenienced since the user may not be able to use an application developed to be executed in a Windows OS. According to an exemplary embodiment, without depending on an OS driven in a user terminal, a user may download a different OS, e.g., Windows, and an application that is executable in Windows, may temporarily install them in a memory, and may execute them when required, so that a mobile interface environment convenient for the user may be provided.

Figure 2A:
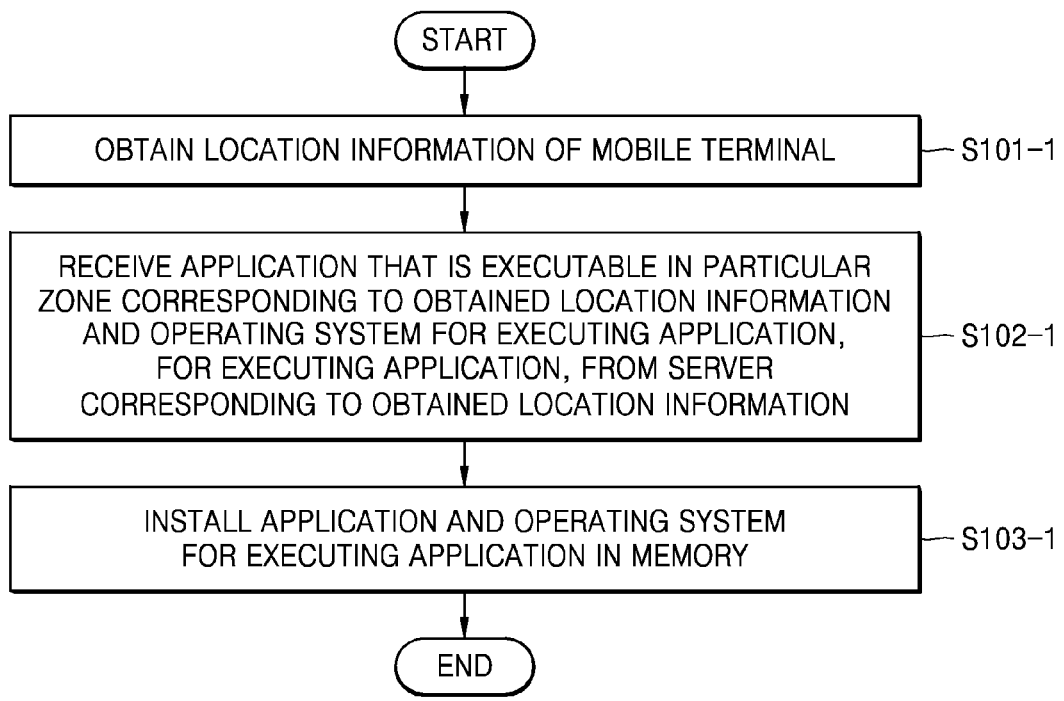
FIG. 2A is a flowchart illustrating a method of controlling a mobile terminal, according to an exemplary embodiment.

FIG. 2A is a flowchart illustrating a method of controlling the mobile terminal 100, according to an exemplary embodiment.

Figure 64:
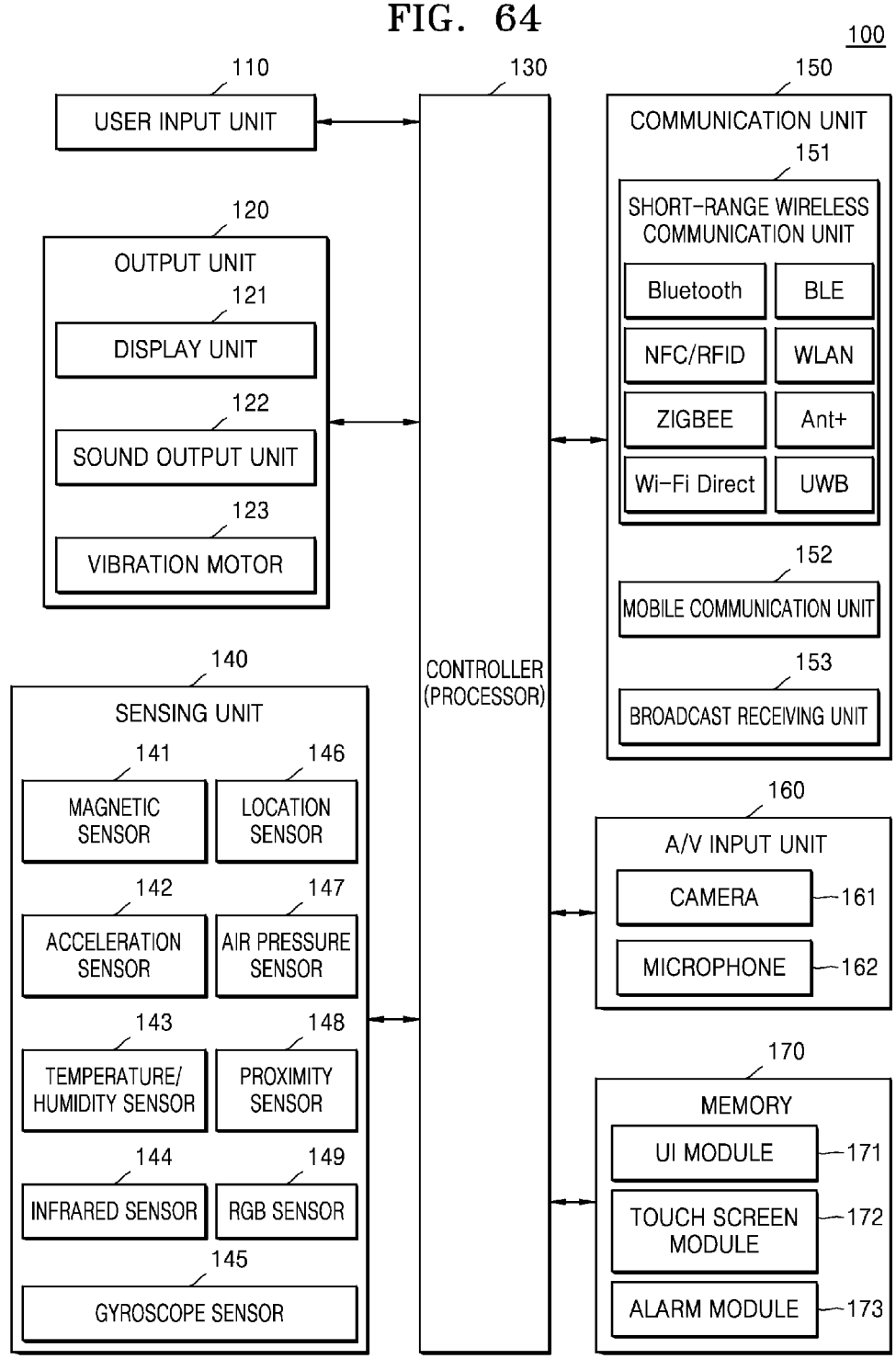

According to an exemplary embodiment with reference to FIGS. 2A and 64, for example, when the mobile terminal 100 of a user is located in a company zone, the user may receive an application that is executable in the company zone and an OS for executing the application from a company server, and may install them in the mobile terminal 100.

In operation S101-1, the mobile terminal 100, according to an exemplary embodiment, may obtain location information of the mobile terminal 100.

According to an exemplary embodiment, the mobile terminal 100 may determine a location of the mobile terminal 100 by using a location information obtaining unit (e.g., location finder). The location information obtaining unit may include a location sensor 146. The mobile terminal 100 may determine indoor and outdoor locations of the mobile terminal 100 by using the location sensor 146. For example, the location sensor 146 may be a global positioning system (GPS).

A controller 130 (e.g., processor) may determine the location information of the mobile terminal 100 by using pedestrian dead reckoning (PDR), which is a technique of determining a speed, a direction, and/or a distance of movement of a person by using sensors including an accelerometer, a gyroscope, a magnetometer, and the like.

The controller 130 may detect a location of the mobile terminal 100 of the user via a trilateration process or a triangulation process using sensors and communication units such as $3^{rd}$ generation (3G), Long Term Evolution (LTE), a Global Navigation Satellite System (GNSS), a global system for mobile communication (GSM), Loran-C, Northwest European Loran-C System (NELS), a wireless local area network (WLAN), Bluetooth, and the like.

When the mobile terminal 100 is located indoor, the controller 130 may detect a location of the mobile terminal 100 by using sensors and communication units including indoor-GPS, Bluetooth, WLAN, visual logic controller (VLC), an active badge, GSM, radio frequency identification (RFID), visual tags, a wireless intrusion prevention system (WIPS), WLAN, a ultrasound sensor, a geomagnetic sensor, and the like.

The method of obtaining the location information of the mobile terminal 100 according to an exemplary embodiment is not limited to the aforementioned examples, and other methods capable of obtaining the location information of the mobile terminal 100 may be applied thereto.

In operation S102-1, the mobile terminal 100, according to an exemplary embodiment, may receive an application that is executable in a particular zone corresponding to the obtained location information and an OS for executing the application, from a server corresponding to the obtained location information. In operation S103-1, the mobile terminal 100 may install the application and the OS for executing the application in a memory.

For example, the mobile terminal 100 that is located in a particular zone (e.g., a company zone) preset by a company server may receive a business-related application that is executable in the particular zone (the company zone) and an OS for executing the business-related application from the company server, and may install the business-related application and the OS in a memory 170.

Figure 2B:
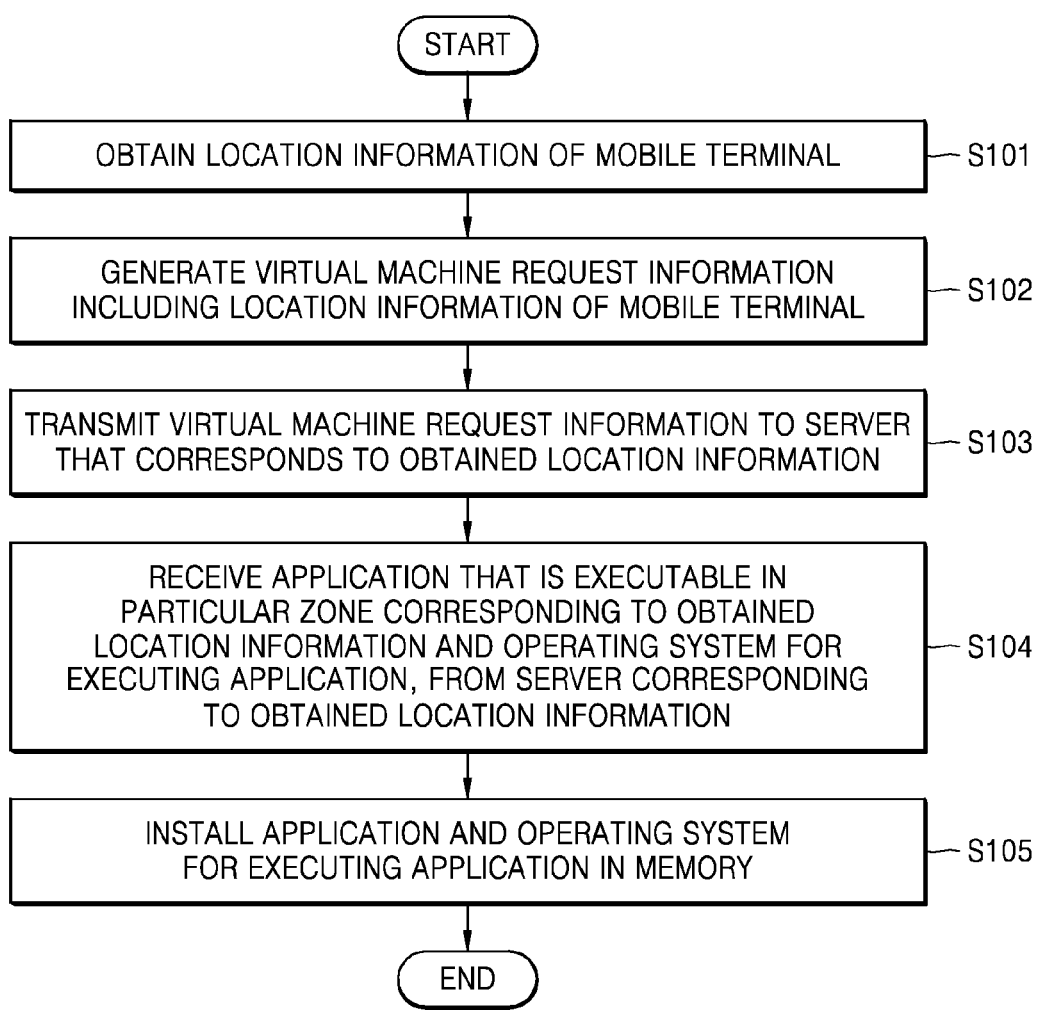
FIG. 2B is a flowchart illustrating a method of controlling the mobile terminal, according to another exemplary embodiment.

FIG. 2B is a flowchart illustrating a method of controlling the mobile terminal 100, according to another exemplary embodiment.

Figure 65:
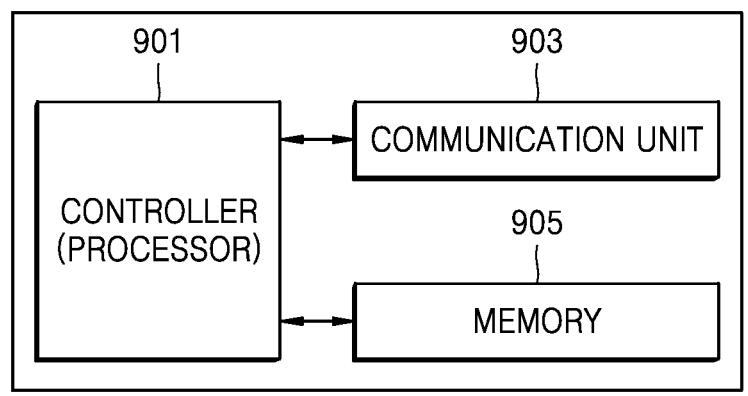
FIG. 65 is a block diagram illustrating the server, according to an exemplary embodiment.

According to an exemplary embodiment, with reference to FIGS. 2A, 64, and 65, when the mobile terminal 100 enters a company zone, the mobile terminal 100 transmits virtual machine request information including location information of the mobile terminal 100 to a company server, so that the mobile terminal 100 receives an application that is executable in the company zone and an OS for executing the application from the company server, and installs the application and the OS in the mobile terminal 100.

In operation S101, the mobile terminal 100 may obtain location information of the mobile terminal 100. A method of obtaining the location information is described above with reference to FIG. 2A.

In operation S102, the controller 130 of the mobile terminal 100 may generate virtual machine request information including location information of the mobile terminal 100.

Throughout the present disclosure, virtual machine request information or VM request information may mean information of the mobile terminal 100 that requests the server 200 to transmit a VM. The virtual machine request information is provided from a user of the mobile terminal 100 to the server 200 so as to receive an appropriate service from the server 200. For example, the virtual machine request information may include user information, and location information indicating a current location of the mobile terminal 100.

The user information may be information necessary for the server 200 to determine which VM service is required for the user of the mobile terminal 100. For example, the user information may include age information, gender information, nationality information, position information in a company of the user, and the like.

In operation S103, the mobile terminal 100 may transmit the virtual machine request information to a server that corresponds to the location information of the mobile terminal 100.

For example, in order to receive a business-use virtual machine appropriate to a user's position etc., the mobile terminal 100 may generate virtual machine request information including general information (e.g., a name, an employee number, a position, etc.) of the user and information such as an assigned task, etc. and may transmit the virtual machine request information to the server 200.

The server 200 that has received the general information of the user and the information such as the assigned task of the user may determine a virtual machine that provides an appropriate service, based on the position of the user, etc.

Based on the location information of the mobile terminal 100 included in the virtual machine request information, the server 200 may recognize that the mobile terminal 100 has entered a preset zone corresponding to the server 200.

In operation S104, the mobile terminal 100 may receive an application that is executable in a particular zone corresponding to the location information and an OS for executing the application, from a server that corresponds to the location information. That is, the mobile terminal 100 may receive, from the server 200, the virtual machine that is determined by the server 200 based on the transmitted virtual machine request information.

In operation S105, the controller 130 of the mobile terminal 100 may install the application and the OS for executing the application in the memory 170. This means that the application and the OS for executing the application may operate as a virtual machine.

The aforementioned exemplary embodiments should be considered in a descriptive sense only and not for purposes of limitation, and are not limited to an order of the operations in the flowcharts of FIGS. 2A and 2B. According to one or more exemplary embodiments, some operations may be skipped or added, and an order of some operations may be changed.

Figure 3A:
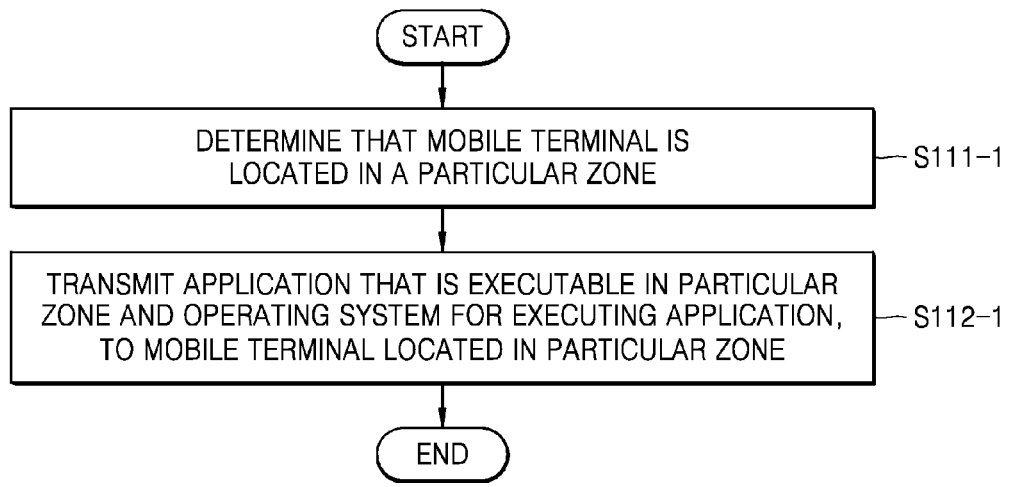
FIG. 3A is a flowchart illustrating a method of controlling a server, according to an exemplary embodiment.

FIG. 3A is a flowchart illustrating a method of controlling the server 200, according to an exemplary embodiment.

According to an exemplary embodiment with reference to FIGS. 3A, 64, and 65, for example, a company server may transmit a business-related application that is executable in a preset particular zone (e.g., a company zone) and an OS for executing the business-related application to the mobile terminal 100 located in the preset particular zone (e.g., the company zone).

In operation S111-1, the server 200 may determine that the mobile terminal 100 is located in a particular zone. In operation S112-1, the server 200 may transmit an application that is executable in the particular zone and an OS for executing the application, to the mobile terminal 100 located in the particular zone. The application and the OS for executing the application may be installed in the memory 170 of the mobile terminal 100 and may operate as a virtual machine.

Figure 3B:
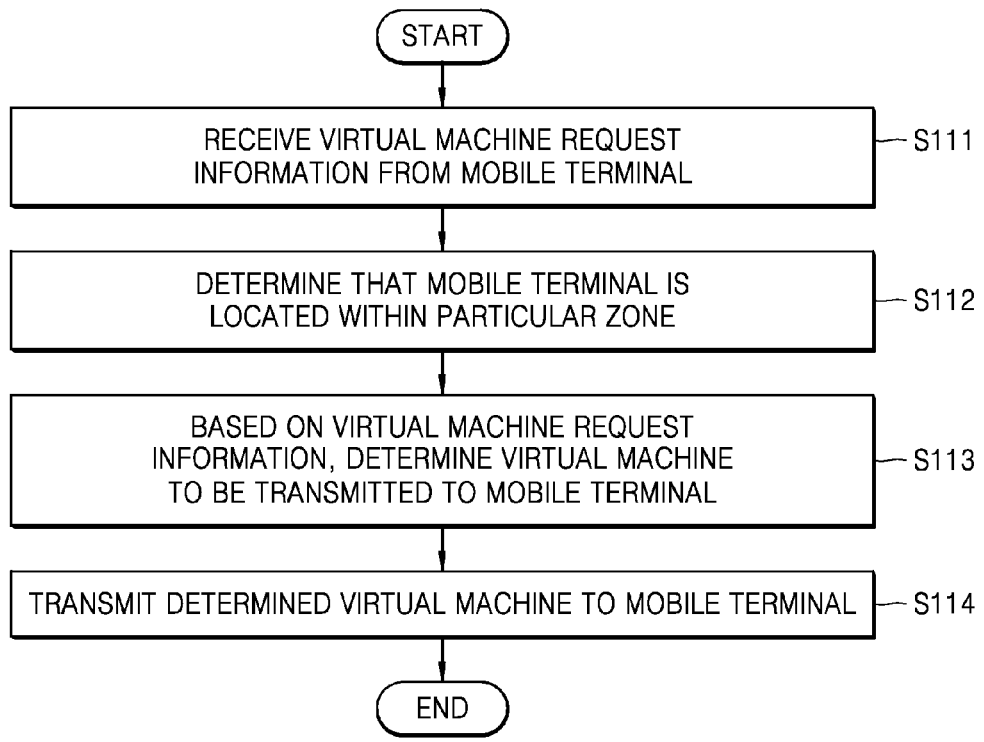
FIG. 3B is a flowchart illustrating a method of controlling the server, according to another exemplary embodiment.

FIG. 3B is a flowchart illustrating a method of controlling the server 200, according to another exemplary embodiment.

According to an exemplary embodiment, with reference to FIGS. 3B and 65, when a company server receives virtual machine request information from a mobile terminal, the company server transmits a virtual machine to the mobile terminal located in a company zone.

In operation S111, the server 200 may receive virtual machine request information from the mobile terminal 100. That is, the mobile terminal 100 may obtain location information, and may transmit the virtual machine request information including the location information to the server 200 that corresponds to the location information. For example, the mobile terminal 100 located in a company zone may transmit the virtual machine request information to a company server.

In operation S112, a controller 901 (also, referred to as a processor 901) of the server 200 may determine that the mobile terminal 100 is located within a particular zone. For example, the company server may preset the particular zone (e.g., in a building of the S company) with a predefined range as the company zone, based on location information, and may determine whether the mobile terminal 100 is located in the preset zone.

In operation S113, based on the virtual machine request information, the controller 901 of the server 200 may determine a virtual machine to be transmitted to the mobile terminal 100.

The controller 901 may determine the virtual machine from among virtual machines stored in a virtual machine storage 905 (also, referred to as a memory 905), based on the virtual machine request information. For example, based on a position, an assigned task, etc., of a user that is received from the mobile terminal 100, the controller 901 may determine the virtual machine capable of executing a service that is providable to the user.

In operation S114, the controller 901 of the server 200 may transmit the determined virtual machine to the mobile terminal 100 via a communication unit 903.

The aforementioned exemplary embodiments should be considered in a descriptive sense only and not for purposes of limitation, and are not limited to an order of the operations in the flowcharts of FIGS. 3A and 3B. According to one or more exemplary embodiments, some operations may be skipped or added, and an order of some operations may be changed.

Figure 4:
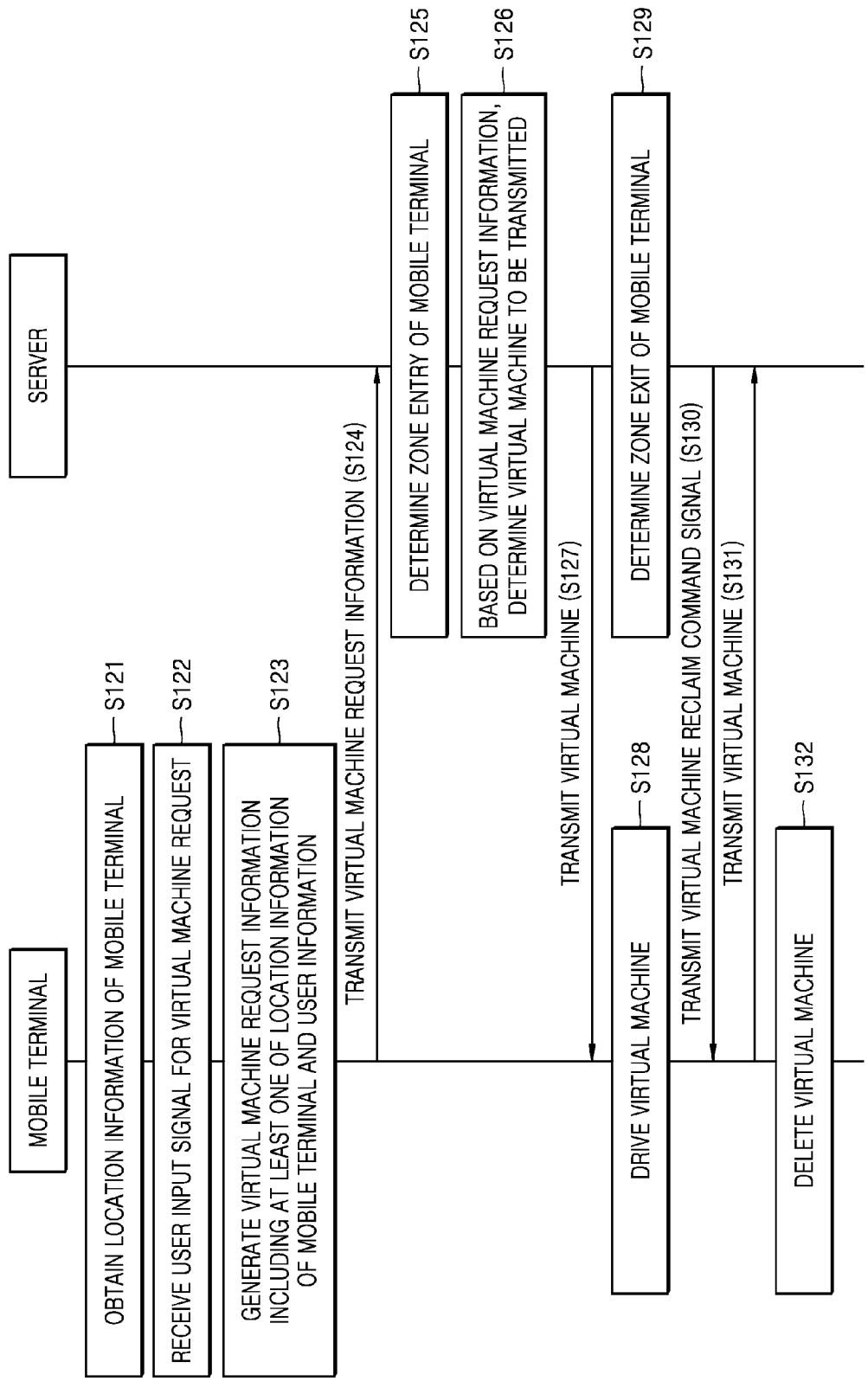
FIG. 4 is a flowchart illustrating a method of controlling the mobile terminal and the server, according to an exemplary embodiment.

FIG. 4 is a flowchart illustrating a method of controlling the mobile terminal 100 and the server 200, according to an exemplary embodiment.

In operation S121, the controller 130 of the mobile terminal 100 may obtain location information of the mobile terminal 100. The controller 130 may determine indoor and outdoor locations of the mobile terminal 100 by using the location sensor 146 of the mobile terminal 100. For example, the location sensor 146 may include a GPS, an accelerometer, a gyroscope, a magnetometer, and the like. The controller 130 may determine the location information of the mobile terminal 100 by using PDR, which is a technique of determining a speed, a direction, and/or a distance of movement of a person by using location sensors.

The controller 130 may detect a location of the mobile terminal 100 of a user by using sensors and communication units such as 3G, LTE, GNSS, GSM, WLAN, Bluetooth, and the like.

The method of obtaining the location information of the mobile terminal 100 according to an exemplary embodiment is not limited to the aforementioned example, and other methods capable of obtaining the location information of the mobile terminal 100 may be applied thereto.

In operation S122, the controller 130 of the mobile terminal 100 may receive a user input signal for a virtual machine request.

The user input signal for the virtual machine request may indicate a signal that is input via the mobile terminal 100 by the user who attempts to receive the virtual machine.

For example, the user input signal for the virtual machine request may correspond to an input of tagging the mobile terminal 100 to a particular position (e.g., a quick response code (QR code), a near field communication (NFC) tag, etc.), a voice input of the user, and the like.

The mobile terminal 100 according to an exemplary embodiment may skip the operation S122 of receiving the user input signal for the virtual machine request. That is, the mobile terminal 100 may generate virtual machine request information automatically without the user input signal, and may transmit the virtual machine request information to the server 200 automatically.

In operation S123, the controller 130 of the mobile terminal 100 may generate virtual machine request information including at least one of location information of the mobile terminal 100 and user information. That is, the controller 130 may generate virtual machine request information including at least one of the obtained location information of the mobile terminal 100 and the user information input by the user.

In operation S124, the controller 130 of the mobile terminal 100 may transmit the virtual machine request information to the server 200. The controller 130 may determine a zone corresponding to the location information of the mobile terminal 100, and may transmit the virtual machine request information to the server 200 corresponding to the determined zone, via a communication unit 150.

In operation S125, the controller 901 of the server 200 may determine a zone entry of the mobile terminal 100. The controller 901 of the server 200 may determine the zone entry of the mobile terminal 100 based on the location information of the mobile terminal 100 received from the mobile terminal 100. That is, the server 200 may preset a preset range area as a zone, based on location information, and may determine whether the mobile terminal 100 has entered the zone.

In operation S126, based on the virtual machine request information, the controller 901 of the server 200 may determine a virtual machine to be transmitted. That is, based on the user information, and the like, included in the received virtual machine request information, the controller 901 may determine the virtual machine capable of executing a service to be provided to the user.

In operation S127, the controller 901 of the server 200 may transmit the virtual machine to the mobile terminal 100. The controller 901 may transmit, via the communication unit 903, the virtual machine to the mobile terminal 100 that transmitted the virtual machine request information.

In operation S128, the controller 130 of the mobile terminal 100 may drive the virtual machine. The controller 130 may control the virtual machine to operate in the mobile terminal 100.

In operation S129, the controller 901 of the server 200 may determine a zone exit of the mobile terminal 100.

The server 200 that transmitted the virtual machine to the mobile terminal 100 may periodically determine whether the mobile terminal 100 left the zone. For example, the mobile terminal 100 may provide the location information of the mobile terminal 100 to the server 200 at regular or irregular intervals. Interval times may be set by an operator of a server 200. Based on the received location information of the mobile terminal 100, the server 200 may determine whether the mobile terminal 100 left the zone.

In operation S130, the controller 901 of the server 200 may transmit a virtual machine reclaim command signal to the mobile terminal 100.

If the server 200 determines that the mobile terminal 100 left the zone, the server 200 may transmit the virtual machine reclaim command signal to the mobile terminal 100 so as to reclaim the transmitted virtual machine (S130). In operation S131, the controller 130 of the mobile terminal 100 may transmit the virtual machine to the server 200.

That is, the mobile terminal 100 that received the virtual machine reclaim command signal may transmit the virtual machine to the server 200 via the communication unit 150. The virtual machine reclaim command signal may include a command signal for allowing the virtual machine operating in the mobile terminal 100 to be automatically transmitted to the server 200.

In operation S132, the controller 130 of the mobile terminal 100 may delete the virtual machine. The virtual machine reclaim command signal may include a command signal for allowing the virtual machine operating in the mobile terminal 100 to be automatically deleted.

That is, when the mobile terminal 100 exits the zone, the mobile terminal 100 receives a command signal programmed to delete the virtual machine that was used in the zone, so that the mobile terminal 100 may delete the virtual machine.

The aforementioned exemplary embodiments should be considered in a descriptive sense only and not for purposes of limitation, and are not limited to an order of the operations in the flowchart of FIG. 4. According to one or more exemplary embodiments, some operations may be skipped or added, and an order of some operations may be changed.

Figure 5:
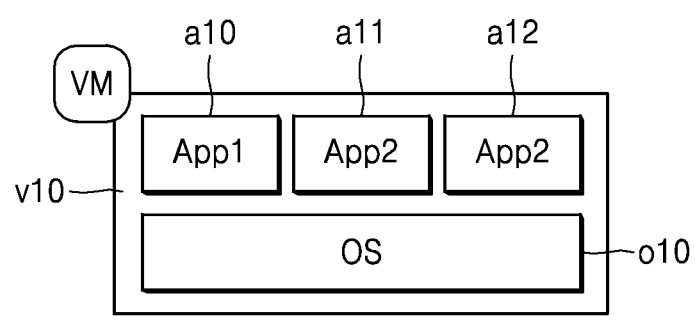
FIG. 5 is a block diagram illustrating a virtual machine, according to an exemplary embodiment.

FIG. 5 is a block diagram of a virtual machine v10, according to an exemplary embodiment.

The virtual machine v10 according to an exemplary embodiment may include an OS o10 and applications a10, a11, and a12 that operate in the OS o10.

A virtual machine may be a virtual computing execution environment generated with hardware resources allocated from a physical machine. A hypervisor may be software that manages an OS and applications operating in the virtual machine.

The mobile terminal 100 may drive, in its memory, the virtual machine v10 that is required in a particular place. By doing so, the mobile terminal 100 may not permanently install an application but may execute the application in the memory when required, and may delete it.

The OS o10 indicates a program that controls hardware and software of a computer so as to allow a user to use the computer. That is, the OS o10 is a core program among system software, and consists of programs that efficiently manage hardware. The OS o10 does not directly perform a task of inputting data and outputting a result, and assists with executing a processing program.

The OS o10 that is included in the virtual machine v10 driving in the mobile terminal 100 is not limited to a particular OS, and any mobile OS capable of driving in the mobile terminal 100 may be applied thereto.

The OS o10 according to an exemplary embodiment may be configured with a function capable of driving a particular application (e.g., a document generating program).

The application may be a group of computer programs designed to perform particular tasks, and is generally referred to as an application program.

A virtual machine according to another exemplary embodiment may further include an OS, a predefined application operating in the OS, and predefined data used in executing the application.

The data may correspond to a file that may be read, written, copied, or deleted according to execution of the application. For example, the data may be, but is not limited to, a document file, a voice file, a music file, an image file, an execution file, and the like.

For example, the data may be a file including a document and an image related to company businesses. The data may be a file including examination papers and answer information related to examination application. The data may be an image file or document file including pamphlet information related to a particular exhibition and detail information about exhibits. The data is not limited to the above examples.

The aforementioned exemplary embodiments should be considered in a descriptive sense only and not for purposes of limitation.

Figure 6A:
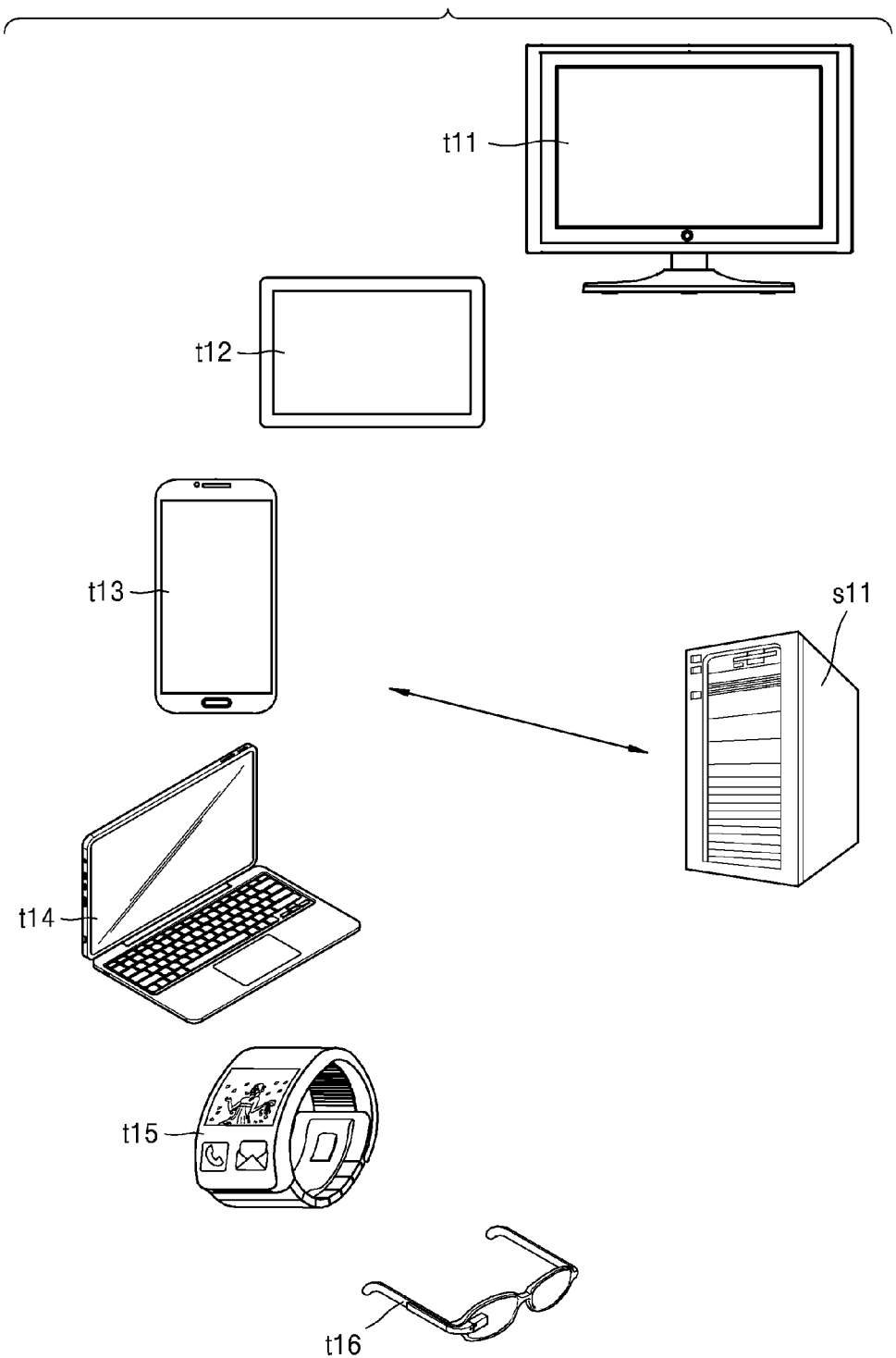
FIGS. 6A through 6C illustrate migration of a virtual machine between a terminal and a server, according to an exemplary embodiment.
Figure 6B:
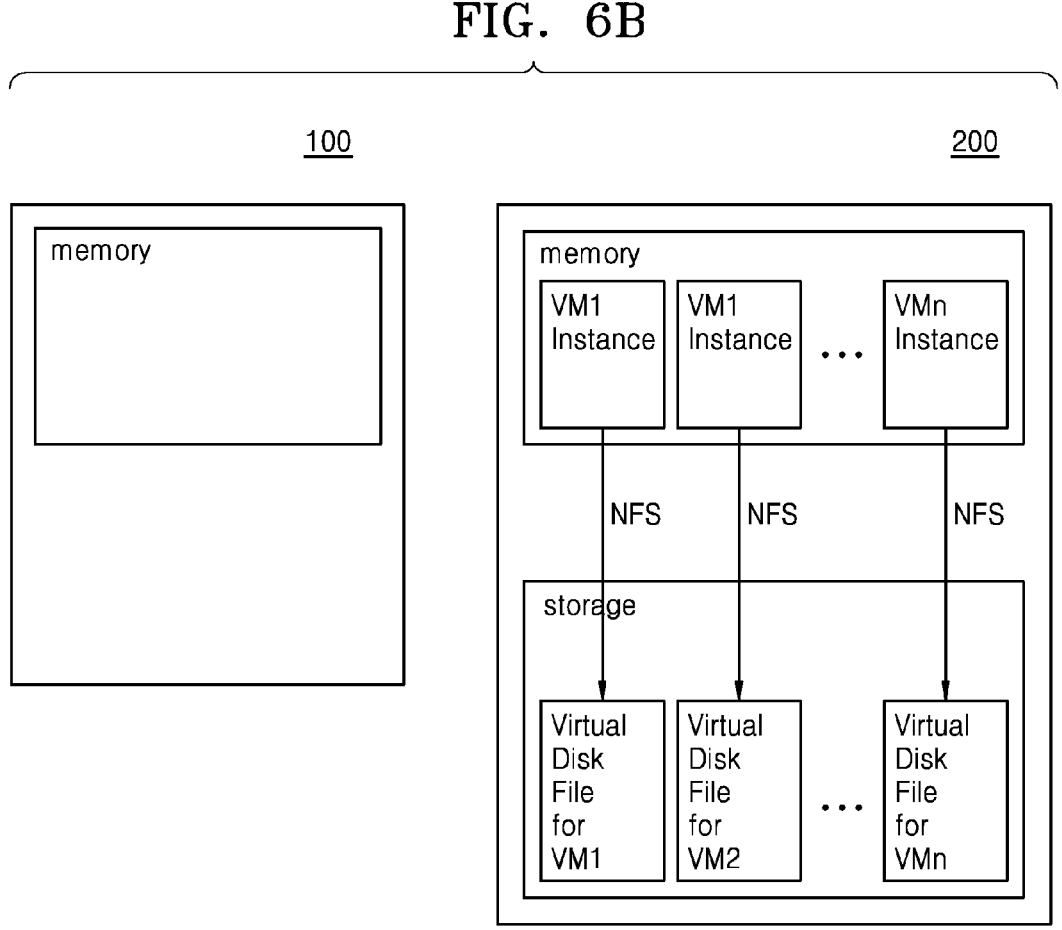
Figure 6C:
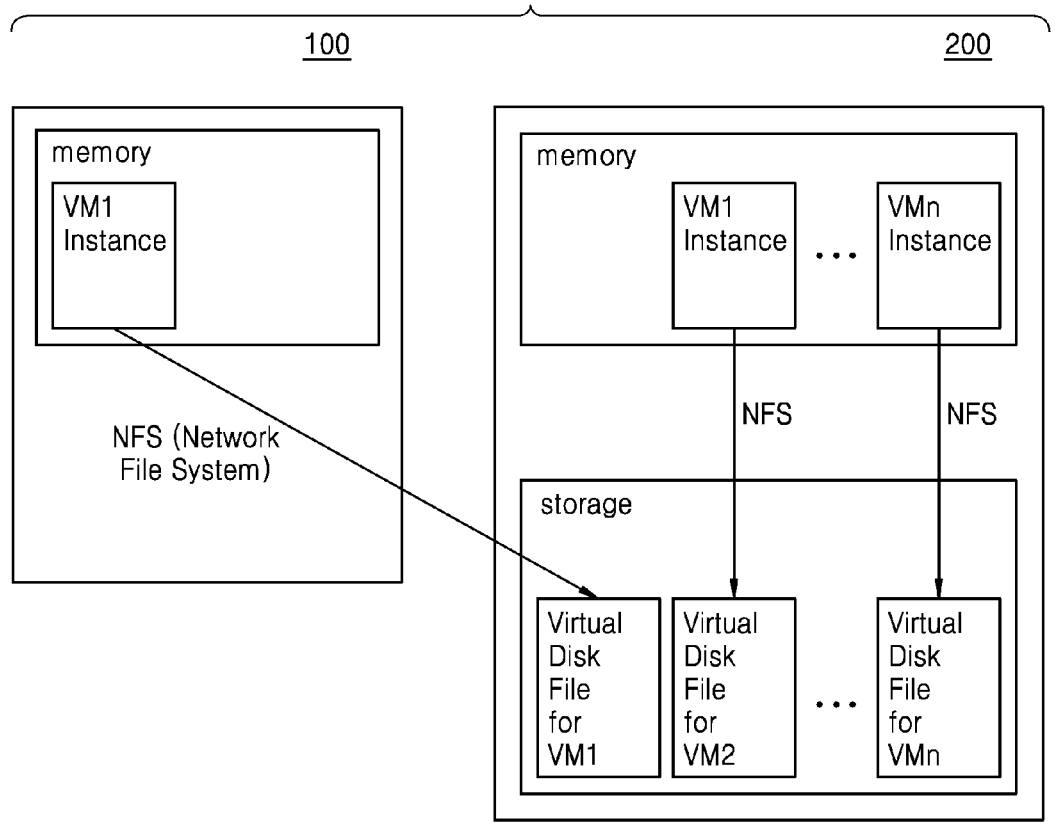

FIGS. 6A through 6C illustrate a migration of a virtual machine between a terminal and a server, according to an exemplary embodiment.

A cloud computing system providing a cloud computing service may provide a service based on a virtual machine. Thus, virtual machine (VM) migration may be performed by migrating the virtual machine between a plurality of physical machines that configure the cloud computing system.

As illustrated in FIG. 6A, a virtual machine may be transmitted in the form of VM migration between terminals t11 through t16 and a server s11, according to an exemplary embodiment.

The terminals t11 through t16 may indicate terminals where a computing environment capable of driving the virtual machine is set up. The terminals t11 through t16 may include a TV t11, a tablet PC t12, a smartphone t13, a notebook t14, a watch-type wearable device t15, and a glasses-type wearable device t16, etc.

According to an exemplary embodiment, a wearable device including the watch-type wearable device t15, the glasses-type wearable device t16, etc. may operate by inter-operating with another mobile terminal of a same user. For example, the watch-type wearable device t15 may perform the VM migration with the server s11 via the smartphone t13 that is interoperable with the watch-type wearable device t15.

The terminals t11 through t16 shown in FIG. 6A are examples to which an exemplary embodiment may be applied, but one or more exemplary embodiments are not limited thereto.

The aforementioned exemplary embodiments should be considered in a descriptive sense only and not for purposes of limitation.

FIGS. 6B and 6C illustrate how a virtual machine is migrated and is managed between the server 200 and the mobile terminal 100. FIG. 6B illustrates states of the server 200 and the mobile terminal 100 before the virtual machine is migrated from the server 200 to the mobile terminal 100, and FIG. 6C illustrates states of the server 200 and the mobile terminal 100 after the virtual machine is migrated from the server 200 to the mobile terminal 100.

Referring to FIG. 6B, virtual machines (e.g., VM1 Instance, VM2 Instance, VMn Instance, etc.) may be driven in a memory of the server 200. Each of the virtual machines may access a virtual disk file (e.g., a virtual disk file for VM1, a virtual disk file for VM2, a virtual disk file for VMn, etc.) stored in a storage of the server 200.

As illustrated in FIG. 6C, when the virtual machine (e.g., VM1 Instance) that was driven in the memory of the server 200 is migrated to and thus is driven in a memory of the mobile terminal 100, the virtual machine VM1 Instance may still access the virtual disk file stored in the storage of the server 200 via a network file system (NFS). The NFS is a network system that allows devices to mutually share a file, wherein the devices access a network. The device that accesses the network may access a file in the other device having the NFS mounted therein, as if the file were a local file stored in the device.

In some embodiments, a file generated in the virtual machine VM1 Instance may not be stored in a storage of the mobile terminal 100 but may be made accessible to the storage of the server 200 via the NFS, so that security of the file may be enhanced.

According to an exemplary embodiment, a file that is processed or is generated in a business-use virtual machine may not be stored in a user's personal terminal but may be stored only in a company server.

Figure 7:
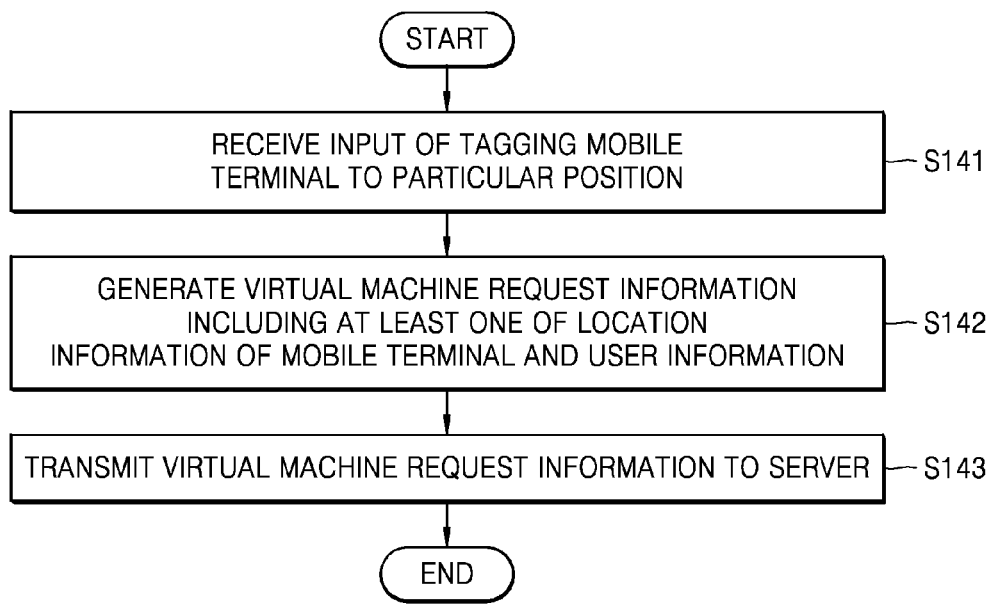
FIG. 7 is a flowchart illustrating an example of receiving an input signal for a virtual machine request, according to an exemplary embodiment.
Figure 8:
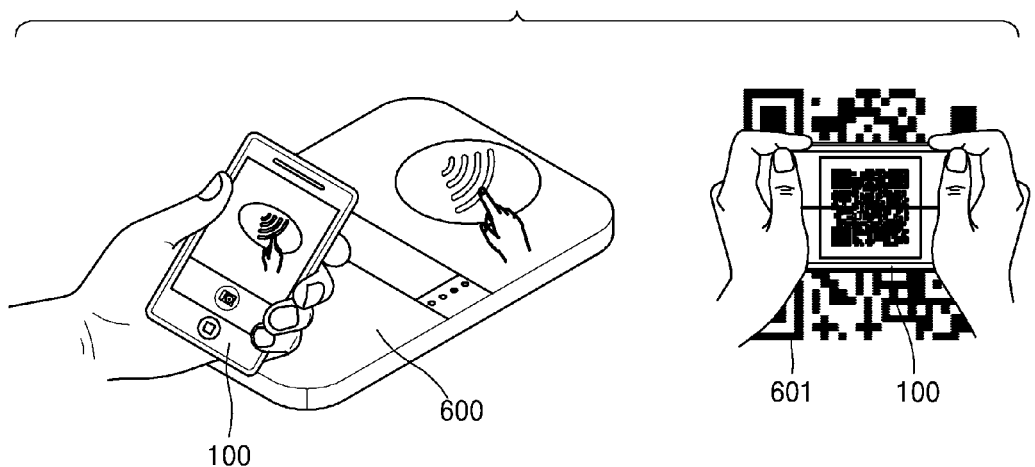
FIG. 8 illustrates an example of receiving the input signal for the virtual machine request, according to an exemplary embodiment.

FIG. 7 is a flowchart illustrating an example of receiving an input signal for a virtual machine request, according to an exemplary embodiment. FIG. 8 illustrates an example of receiving the input signal for the virtual machine request.

As illustrated in FIG. 7, in operation S141, the controller 130 of the mobile terminal 100 according to an exemplary embodiment may receive an input of tagging the mobile terminal 100 to a particular position.

Referring to FIG. 8, the particular position according to an exemplary embodiment may indicate an NFC tag 600, a QR code 601, etc.

NFC is a technology for transmitting data between terminals at a short distance (e.g., 10 cm) by using a contactless short-distance communication module that uses a frequency band (e.g., 13.56 MHz) and that is one of electronic (RFID) tags.

A QR code is a two-dimensional code having a matrix pattern. For example, by scanning a QR code with a smartphone, it is possible to receive various types of information.

The mobile terminal 100 according to an exemplary embodiment may be tagged to the NFC tag 600 disposed in a particular zone or may receive an input of scanning the QR code 601. That is, if the mobile terminal 100 receives a tagging input with respect to the NFC tag 600 disposed in the particular zone or a scanning input with respect to the QR code 601, the mobile terminal 100 may determine that the mobile terminal 100 has received, from a user, an input signal for requesting a server for a virtual machine that is executable in the particular zone.

The controller 130 of the mobile terminal 100 according to an exemplary embodiment may generate virtual machine request information including at least one of location information of the mobile terminal 100 and user information (S142). The controller 130 may transmit the virtual machine request information to the server (S143).

That is, the mobile terminal 100 that received the input signal for requesting the virtual machine may generate the virtual machine request information and may transmit the generated virtual machine request information to the server 200.

The aforementioned exemplary embodiments should be considered in a descriptive sense only and not for purposes of limitation.

One or more exemplary embodiments are not limited to an order of the operations in the flowchart of FIG. 7, and some operations may be skipped or added.

Figure 9:
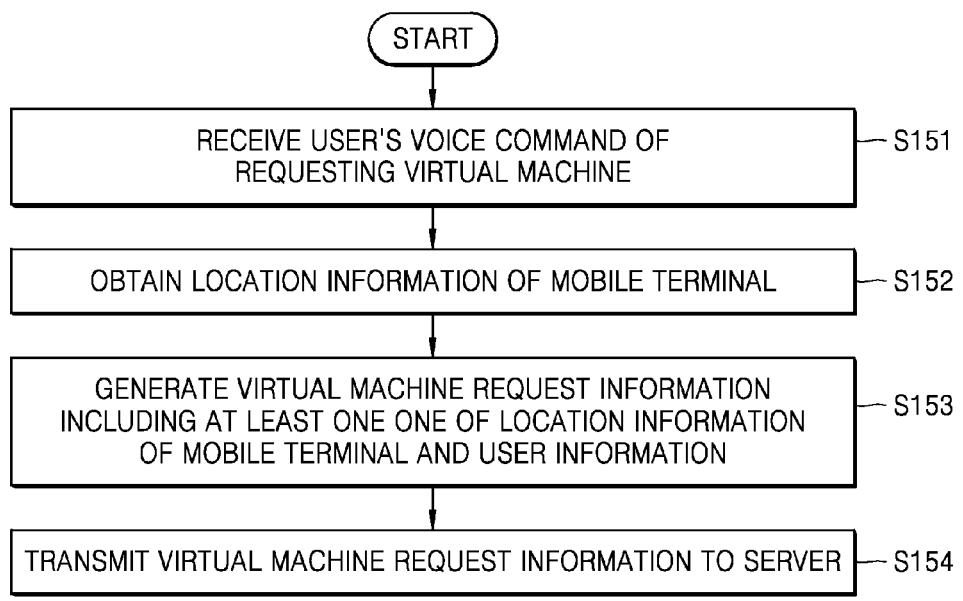
FIG. 9 is a flowchart illustrating an example of receiving an input signal for a virtual machine request, according to another exemplary embodiment.
Figure 10:
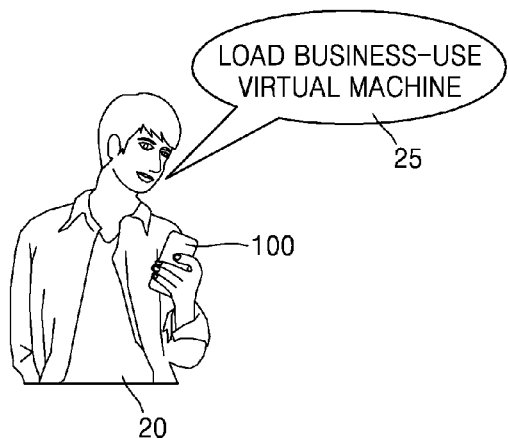
FIG. 10 illustrates an example of receiving the input signal for the virtual machine request.

FIG. 9 is a flowchart illustrating an example of receiving an input signal for a virtual machine request, according to another exemplary embodiment. FIG. 10 illustrates an example of receiving the input signal for the virtual machine request.

As illustrated in FIG. 9, in operation S151, the mobile terminal 100 may receive a user's voice command for requesting a virtual machine. The controller 130 may receive a sound signal from an external device or a user via a microphone 162 (refer to FIG. 64).

As illustrated in FIG. 10, a user 20 may vocally give a voice command saying "Load a business-use virtual machine" 25. The controller 130 of the mobile terminal 100 may recognize the voice command of the user 20 and may perform a function thereof.

According to an exemplary embodiment, when the controller 130 of the mobile terminal 100 receives, from the user 20, the voice command of requesting a virtual machine required in a particular zone, the controller 130 of the mobile terminal 100 may determine that an input signal for requesting a server for the virtual machine has been received.

As illustrated in FIG. 9, in operation S152, the mobile terminal 100 may obtain location information of the mobile terminal 100. A method of obtaining, by the mobile terminal 100, the location information is described above with reference to FIG. 2A.

In operation S153, the controller 130 of the mobile terminal 100 may generate virtual machine request information including at least one of location information of the mobile terminal 100 and user information. In operation S154, the controller 130 may transmit the generated virtual machine request information to the server 200.

The aforementioned exemplary embodiments should be considered in a descriptive sense only and not for purposes of limitation.

One or more exemplary embodiments are not limited to an order of the operations in the flowchart of FIG. 9, and some operations may be skipped or added.

Figure 11:
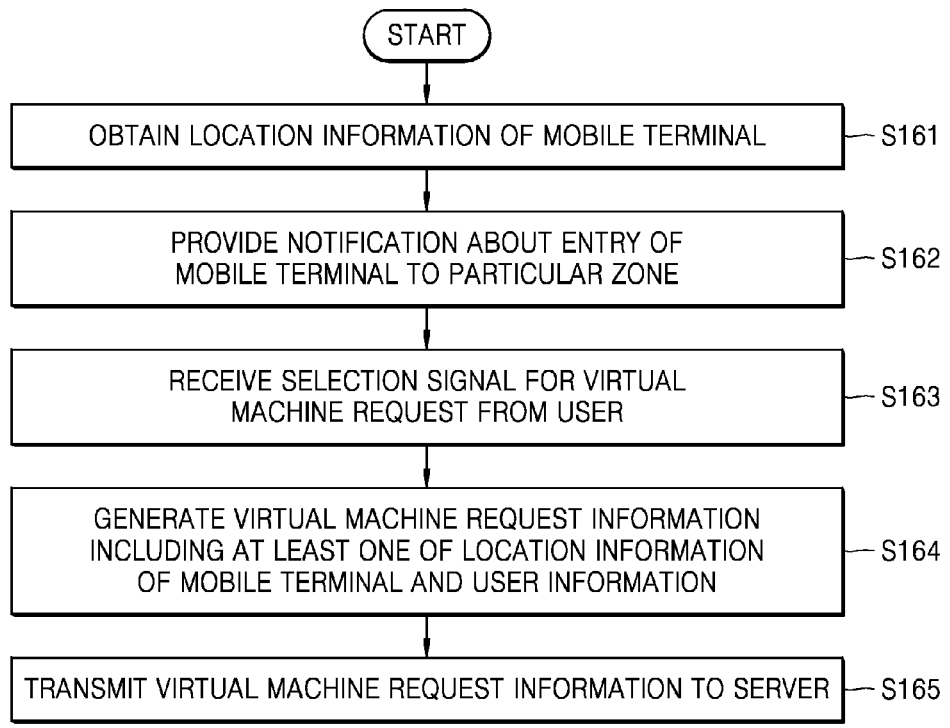
FIG. 11 is a flowchart illustrating an example of receiving an input signal for a virtual machine request, according to another exemplary embodiment.
Figure 12A:
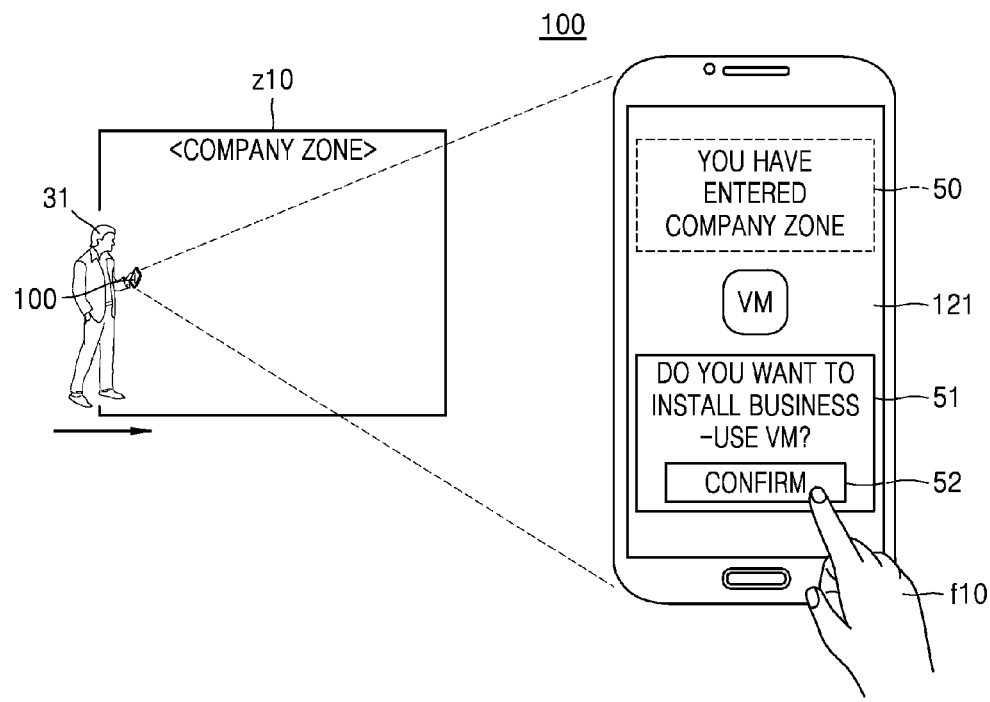
FIGS. 12A and 12B illustrate an example of receiving the input signal for the virtual machine request, according to an exemplary embodiment.
Figure 12B:
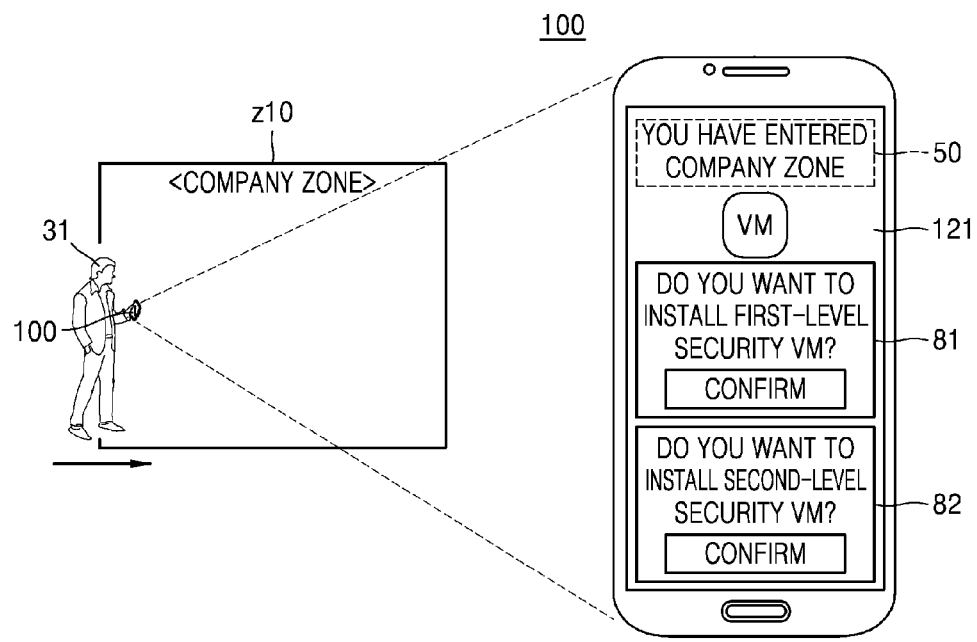

FIG. 11 is a flowchart illustrating an example of receiving an input signal for a virtual machine request, according to another exemplary embodiment. FIGS. 12A and 12B illustrate an example of receiving the input signal for the virtual machine request.

As illustrated in FIG. 11, in operation S161, the controller 130 of the mobile terminal 100 may obtain location information of the mobile terminal 100. A method of obtaining, by the mobile terminal 100, the location information is described above with reference to FIG. 2A.

In operation S162, the controller 130 of the mobile terminal 100 according to an exemplary embodiment may provide notification about entry of the mobile terminal 100 to a particular zone. That is, based on the obtained location information, the controller 130 may provide the notification about the entry to the particular zone.

For example, referring to FIG. 12A, when the controller 130 recognizes that the mobile terminal 100 of a user has entered a company zone z10, the controller 130 may display a notification message saying "You have entered a company zone" 50 on a display unit 121 of the mobile terminal 100.

In operation S163, the controller 130 of the mobile terminal 100 may receive a selection signal for a virtual machine request from the user.

For example, referring to FIG. 12A, the controller 130 may display, on the display unit 121, a message 51 recommending installation of a business-use virtual machine that is operable in the company zone z10. When the controller 130 receives a touch input of selecting (e.g., by using a finger f10 of the user, etc.), a confirm button 52 displayed on the display unit 121, the controller 130 may determine that the controller 130 received the selection signal for the virtual machine request.

As another example, referring to FIG. 12B, the controller 130 may provide a plurality of business-use virtual machines that are operable in the company zone z10. For example, the controller 130 may display, on the display unit 121, a screen for selecting one of installation of a first-level security virtual machine 81 and installation of a second-level security virtual machine 82 that are distinguished according to security levels.

As illustrated in FIG. 11, in operation S164, when the controller 130 of the mobile terminal 100 according to an exemplary embodiment receives the input signal for the virtual machine request, the unit 130 of the mobile terminal 100 may generate virtual machine request information including at least one of the location information of the mobile terminal 100 and user information. In operation S165, the controller 130 may transmit the generated virtual machine request information to the server 200.

According to another exemplary embodiment, the controller 130 may be previously set to periodically receive the input signal for the virtual machine request at every particular time. For example, when the user goes to work every day at a regular time, the controller 130 may be previously set to generate the input signal for the virtual machine request at every attendance time (e.g., 9 a.m.). That is, even if the user who repeatedly enters a particular zone at a particular time does not input the input signal for the virtual machine request, the input signal for the virtual machine request may be automatically generated by the controller 130.

The aforementioned exemplary embodiments should be considered in a descriptive sense only and not for purposes of limitation. One or more exemplary embodiments are not limited to an order of the operations in the flowchart of FIG. 11, and some operations may be skipped or added.

Figure 13:
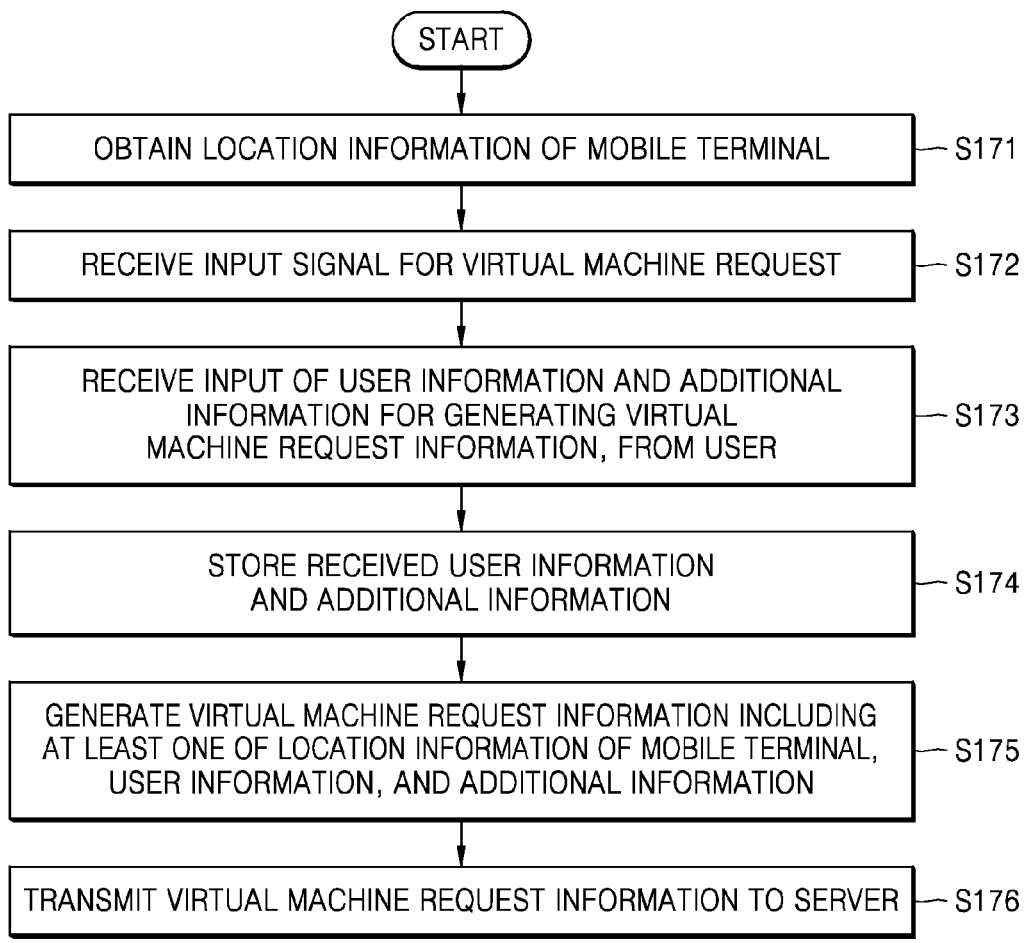
FIG. 13 is a flowchart illustrating an example of obtaining user information for generating virtual machine request information, according to an exemplary embodiment.
Figure 14:
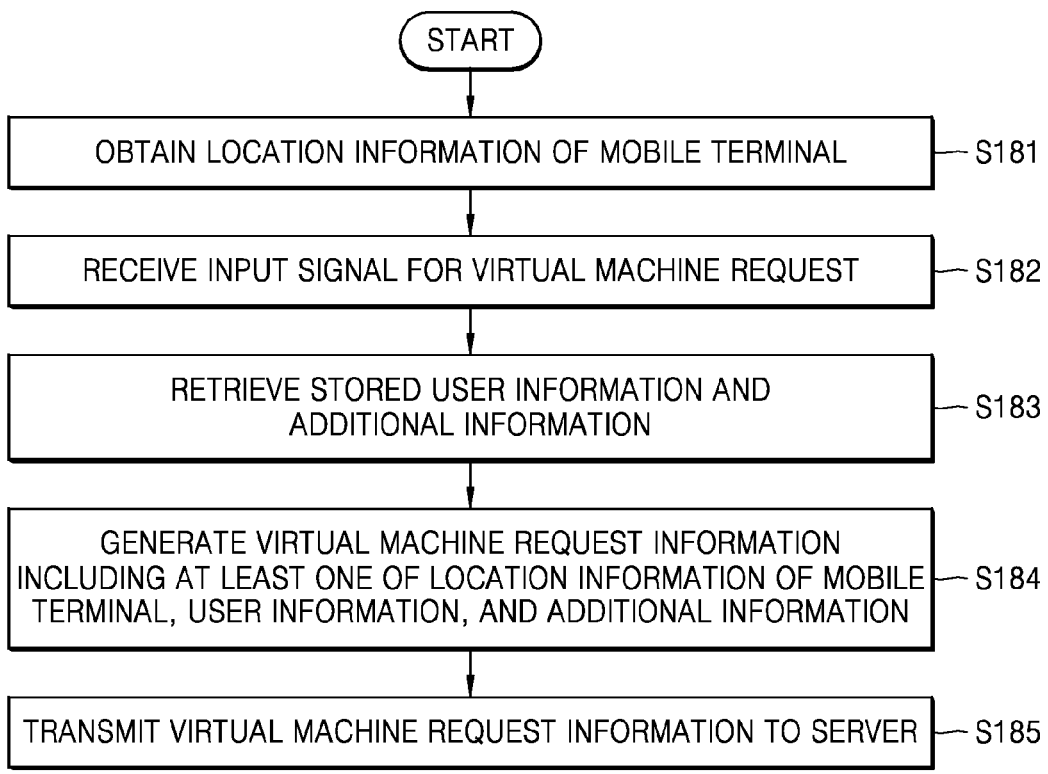
FIG. 14 is a flowchart illustrating an example of obtaining user information for generating virtual machine request information, according to another exemplary embodiment.
Figure 15:
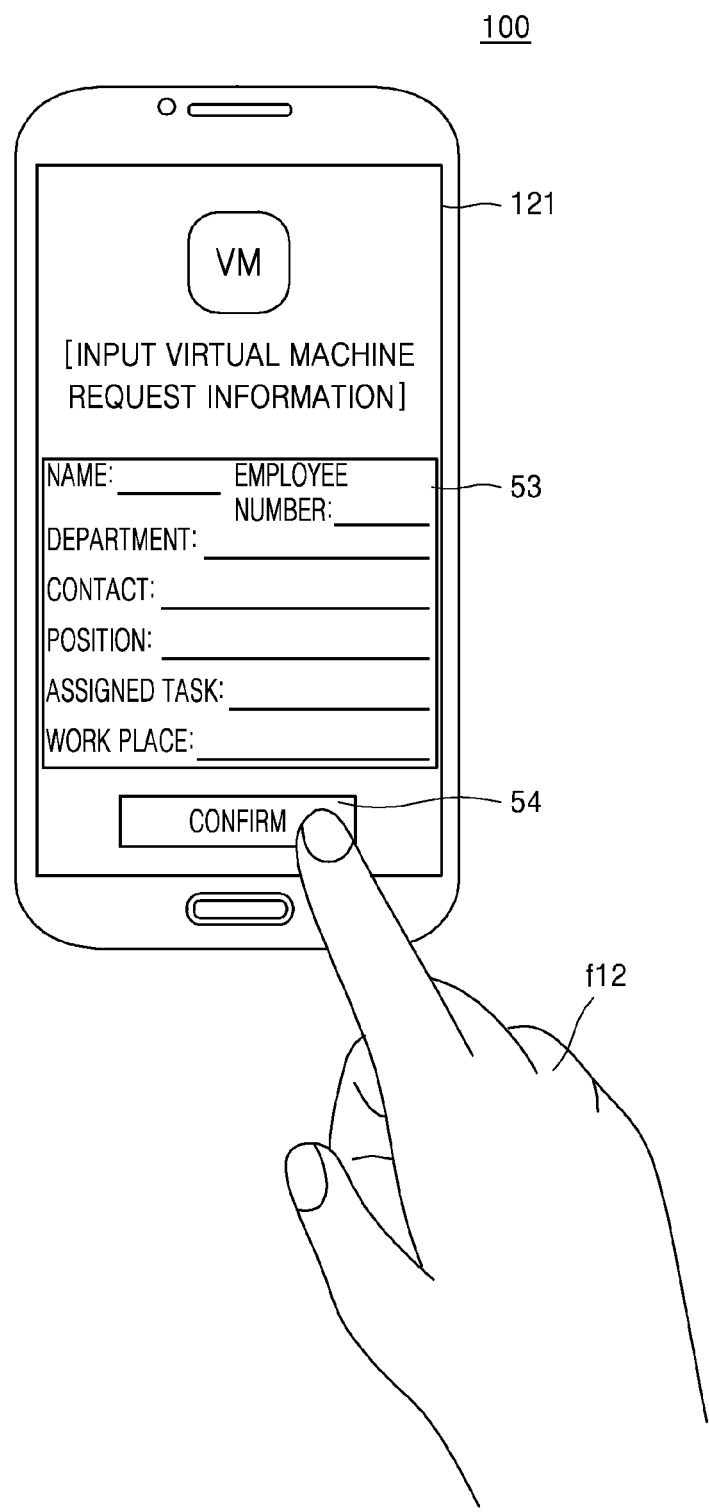
FIG. 15 illustrates a screen for obtaining user information for generating virtual machine request information, according to an exemplary embodiment.

FIG. 13 is a flowchart illustrating an example of obtaining user information for generating virtual machine request information, according to an exemplary embodiment. FIG. 14 is a flowchart illustrating an example of obtaining user information for generating virtual machine request information, according to another exemplary embodiment. FIG. 15 illustrates a screen for obtaining user information for generating virtual machine request information, according to an exemplary embodiment. FIG. 16 illustrates an example of information included in the virtual machine request information according to an exemplary embodiment.

As illustrated in FIG. 13, in operation S171, the controller 130 of the mobile terminal 100, according to an exemplary embodiment, may obtain location information of the mobile terminal 100. A method of obtaining, by the mobile terminal 100, the location information is described above with reference to FIG. 2A.

In operation S172, the controller 130 of the mobile terminal 100 may receive an input signal for a virtual machine request. As described above with reference to FIGS. 7 through 12, the controller 130 may receive a user input signal for requesting a server corresponding to a particular zone for a virtual machine that is executable in the particular zone.

In operation S173, the controller 130 of the mobile terminal 100 may receive an input of user information and additional information for generating virtual machine request information, from a user (S173).

Referring to FIG. 15, the controller 130 may display, on the display unit 121, a screen 53 so as to receive an input of virtual machine request information including user information from the user.

The virtual machine request information may include at least one of the user information, the additional information, and location information of the mobile terminal 100.

The user information may include user's personal information including a name of the user, contact information, a position, a department name, an employee number, an assigned task, a work place, etc.

The additional information may include information for determining a type and scope of a service provided in a particular zone.

The location information of the mobile terminal 100 may include building information and particular office information based on a current location of the mobile terminal 100.

Referring to FIG. 13, in operation S174, the controller 130 of the mobile terminal 100 may store the user information and the additional information.

The controller 130 may store, in the memory 170, the user information and the additional information that are input by the user.

For example, in a case of a company, a school, etc., that the user periodically enters, the controller 130 may store, in the memory 170, user information required to request a virtual machine in the places. When it is required to re-generate virtual machine request information, the controller 130 may retrieve information stored in the memory 170, so that a repeated input process by the user may be skipped.

In operation S175, the controller 130 of the mobile terminal 100 may generate the virtual machine request information including at least one of the location information of the mobile terminal 100, the user information, and the additional information. In operation S176, the controller 130 may transmit the virtual machine request information to a server corresponding to the particular zone.

Referring to FIG. 15, the controller 130 receives a touch input of selecting, by using a finger f12, etc., a confirm button 54 for receiving an input of virtual machine request information from the user, the controller 130 may generate the virtual machine request information including input information, etc., and may transmit the generated virtual machine request information to a server.

The aforementioned exemplary embodiments should be considered in a descriptive sense only and not for purposes of limitation.

FIG. 14 is a flowchart illustrating an example of obtaining user information for generating virtual machine request information, according to another exemplary embodiment.

In operation S181, the controller 130 of the mobile terminal 100 may obtain location information of the mobile terminal 100. A method of obtaining, by the mobile terminal 100, the location information is described above with reference to FIG. 2A.

In operation S182, the controller 130 of the mobile terminal 100 may receive an input signal for a virtual machine request. As described above with reference to FIGS. 7 through 12, the controller 130 may receive a user input signal for requesting a server corresponding to a particular zone for a virtual machine that is executable in the particular zone.

In operation S183, the controller 130 of the mobile terminal 100 may retrieve stored user information and stored additional information.

When the controller 130 previously stored the user information and the additional information for generating the virtual machine request information in the memory 170, the controller 130 may retrieve the user information and the additional information stored in the memory 170. For example, if information for requesting a virtual machine that is executed in a zone that a user repeatedly enters is stored in the memory 170, a process of obtaining the user information and the additional information from the user may be skipped.

The mobile terminal 100 according to an exemplary embodiment may transmit, to a server, the virtual machine request information including the user information stored in the memory 170, and then may receive a request for additional user information from the server. In this case, the mobile terminal 100 may receive a user input of the additional user information.

In operation S184, the controller 130 of the mobile terminal 100 may generate the virtual machine request information including at least one of the location information of the mobile terminal 100, the user information and the additional information. In operation S185, the controller 130 may transmit the virtual machine request information to the server.

In another exemplary embodiment, the mobile terminal 100 may previously store, in the server 200, user information corresponding to user identification information (e.g., identification information of the mobile terminal 100) for identifying a particular mobile terminal. Here, when the mobile terminal 100 transmits the user identification information to the server 200, the server 200 may search for the user information corresponding to the received user identification information, and may use the user information.

The aforementioned exemplary embodiments should be considered in a descriptive sense only and not for purposes of limitation, and are not limited to an order of the operations in the flowcharts of FIGS. 13 and 14. According to one or more exemplary embodiments, some operations may be skipped or added, and an order of some operations may be changed.

FIG. 16 illustrates a table showing examples of information included in virtual machine request information 800, according to an exemplary embodiment.

The virtual machine request information 800 according to an exemplary embodiment may include user information 801, terminal location information 802, additional information 803, etc.

If a user is a staff member in a corresponding company, the user information 801 may include user identification (ID), a user name, an employee number, contact information, a department name, a position, an assigned task, a security level, etc.

If a user is a visitor to the corresponding company, the user information 801 may include a company name of the visitor, a name, a resident registration number, a telephone number, meeting room information, visit purpose information, related-task information, etc.

The terminal location information 802 may include address information of a current location, building information, a particular floor of a building, particular office information, etc.

The additional information 803 may include authority information pre-obtained by the user (e.g., authority equivalent to that of a staff member of the corresponding company, authority equivalent to that of a staff member of a cooperative firm, authority to increase a security level in a particular office, etc.), attendance time information, quitting time information, etc.

The aforementioned exemplary embodiments should be considered in a descriptive sense only and not for purposes of limitation.

Figure 17A:
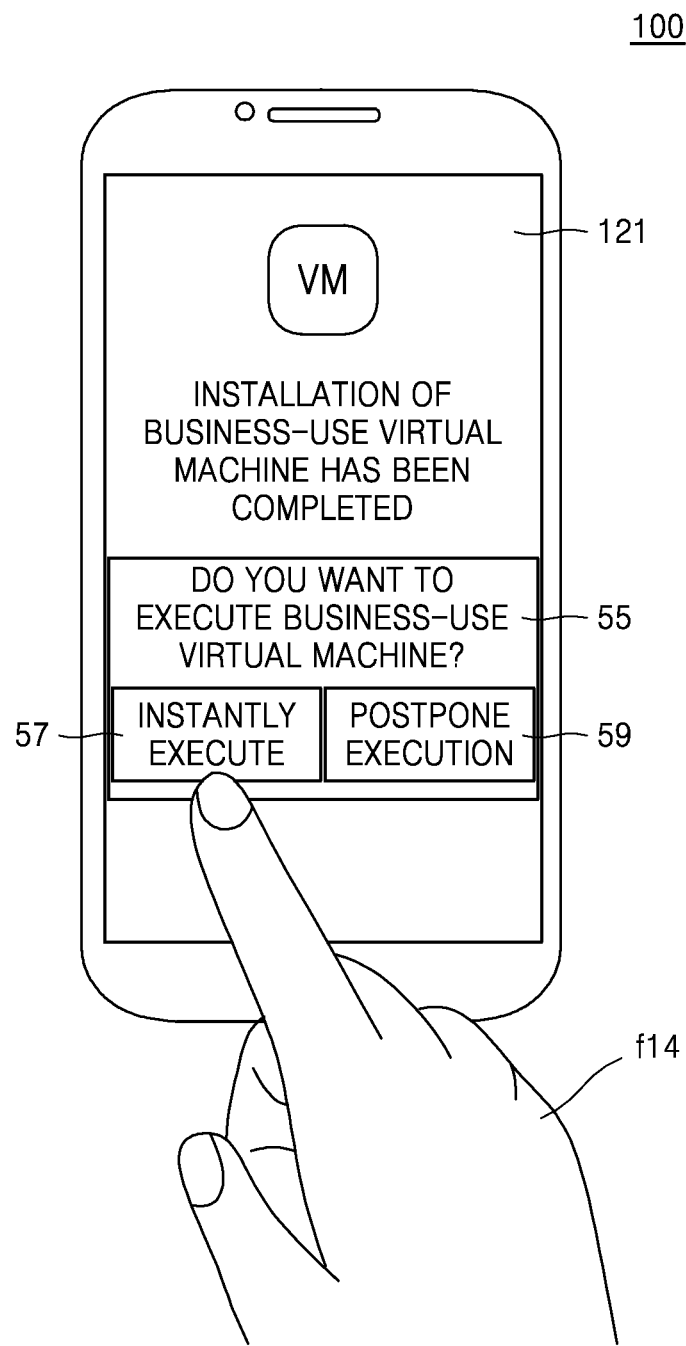
FIG. 17A illustrates a screen notifying about reception of a virtual machine, according to an exemplary embodiment.

FIG. 17A illustrates a screen notifying about reception of a virtual machine, according to an exemplary embodiment.

As illustrated in FIG. 17A, when the controller 130 completes installation of a business-use virtual machine, the controller 130 may display a screen notifying about completion of installation of a virtual machine on the display unit 121.

The controller 130 of the mobile terminal 100 according to an exemplary embodiment may display, on the display unit 121, a screen 55 for receiving a selection input for executing the virtual machine. The controller 130 may display a button 57 for instantly executing the virtual machine and a button 59 for postponing execution on the display unit 121. For example, when the controller 130 receives a touch input of selecting, by using a finger f14 of a user, etc., the button 57 for instantly executing the virtual machine, the controller 130 may drive the virtual machine.

According to an exemplary embodiment, in order for the mobile terminal 100 to receive (e.g., about 1 gigabyte (GB)) a predefined application and an OS for executing the predefined application from the server 200, for example, it may take about 80 seconds in a wireless LAN environment of 100 megabit per second (Mbps). According to an exemplary embodiment, if a download starts after the user enters a company zone, installation may be completed before the user reaches his/her desk in an office and starts work, so that the user may rapidly and conveniently use the virtual machine for work.

According to an exemplary embodiment, while the mobile terminal 100 receives the predefined application and the OS for executing the predefined application from the server 200, the mobile terminal 100 may provide content (e.g., user's business schedule information stored in the mobile terminal 100, etc.) to the display unit 121. The mobile terminal 100 may first receive, from the server 200, brief information including in-house announcements provided by a company, and may provide the brief information to the display unit 121. Accordingly, a user can catch up on company announcements during installation and a virtual machine installation time period sensed by the user may be significantly decreased.

The aforementioned exemplary embodiments should be considered in a descriptive sense only and not for purposes of limitation.

Figure 17B:
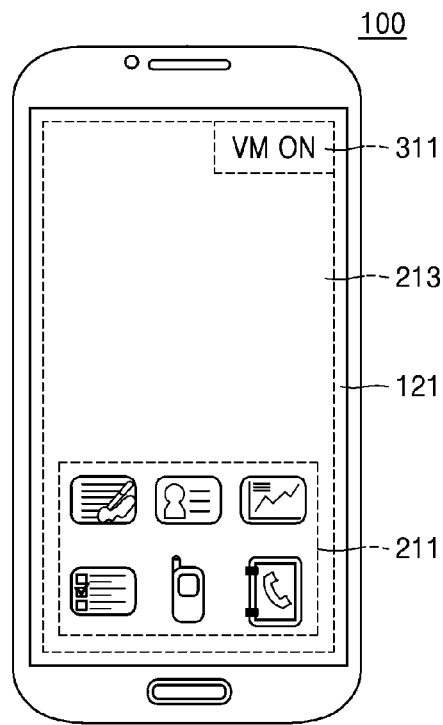
FIGS. 17B through 17D illustrate screens of the mobile terminal in which a virtual machine operates, according to exemplary embodiments.
Figure 17C:
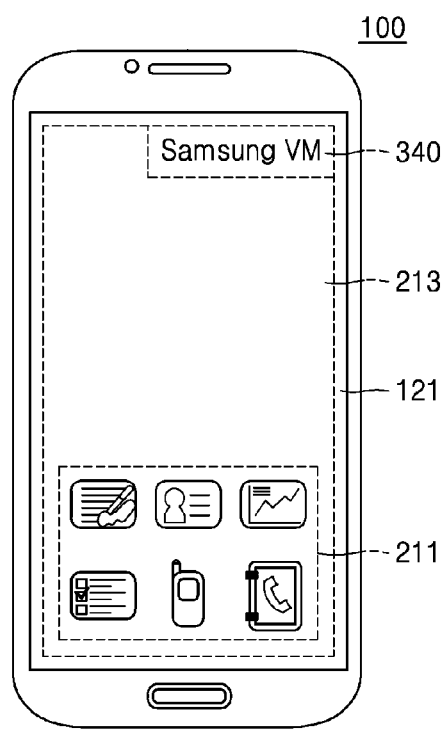
Figure 17D:
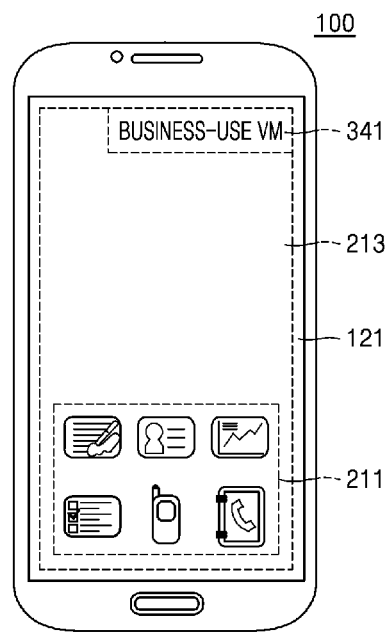

FIGS. 17B through 17D illustrate screens of the mobile terminal 100 in which a virtual machine operates, according to one or more exemplary embodiments.

The controller 130 of the mobile terminal 100 according to an exemplary embodiment may drive the virtual machine.

As illustrated in FIG. 17B, the controller 130 may display, on the display unit 121, a screen 213 illustrating the virtual machine that operates in the mobile terminal 100.

The controller 130 may display, on the display unit 121, an icon 311 indicating that the virtual machine operates in the mobile terminal 100. For example, the icon 311 may be marked as 'VM ON', but it is not limited thereto.

Referring to FIG. 17C, the controller 130 may also display a company name (e.g., 'Samsung') as a mark 340 indicating that the virtual machine is operating.

Referring to FIG. 17D, the controller 130 may display a target use of the virtual machine (e.g., 'business-use VM') as the mark 341 indicating that the virtual machine is operating.

The controller 130 may display, on the display unit 121, an icon 211 corresponding to a predefined application that is executable in the virtual machine.

For example, the business-use VM may include a document generating application, an application for browsing contact information of a staff member, a calculator application, a memo application, etc.

When a virtual machine operates in the controller 130 of the mobile terminal 100 according to an exemplary embodiment, the controller 130 of the mobile terminal 100 may execute a predefined application in an OS included in the operating virtual machine.

The OS that is driven in the operating virtual machine may be a same type of OS or a different type of OS than the OS embedded in the mobile terminal 100, or may be a same type of OS but different version. That is, the OS driven in the operating virtual machine and the OS embedded in the mobile terminal 100 may be independent from each other.

The aforementioned exemplary embodiments should be considered in a descriptive sense only and not for purposes of limitation.

FIG. 18 illustrates a screen switch when a virtual machine operates in the mobile terminal 100, according to an exemplary embodiment.

The controller 130 of the mobile terminal 100 may display, on the display unit 121, a home screen corresponding to an OS that is driven in the mobile terminal 100. The home screen may indicate a screen displayed as a default on the display unit 121 when an application is not executed in the mobile terminal 100 or is executed in the background.

Figure 18A:
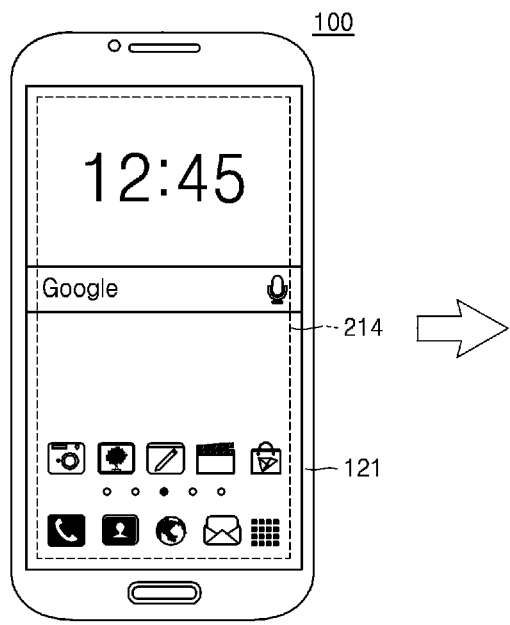
FIGS. 18A and 18B illustrate a screen switch when a virtual machine operates in the mobile terminal, according to an exemplary embodiment.

As illustrated in FIG. 18A, a home screen 214 corresponding to an OS (e.g., Android) that is driven as a default in the mobile terminal 100 may be displayed on the display unit 121.

Figure 18B:
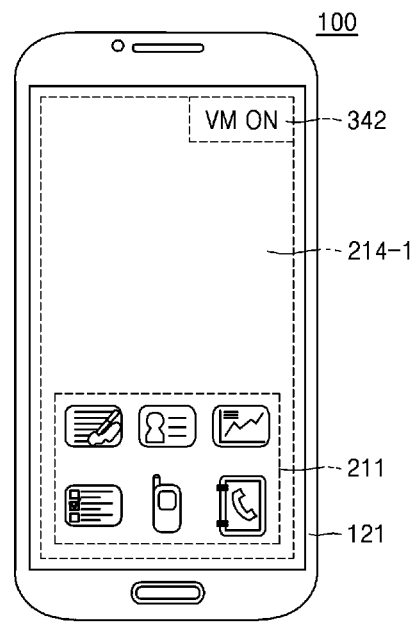

FIG. 18B illustrates an example in which, when a virtual machine (including a predefined application and an OS for executing the predefined application) received from the company server 200 is installed in the mobile terminal 100, a screen of the display unit 121 is changed to a home screen 214-1 that corresponds to the received OS. An icon 342 indicating that the virtual machine is operating may be displayed on the home screen 214-1 corresponding to the received OS.

FIG. 19 is a flowchart illustrating a controlling method performed by the server 200 and the terminal 100 that accesses data stored in the server 200, according to an exemplary embodiment.

Referring to FIG. 19, in operation S201, the server 200 according to an exemplary embodiment may have predefined data. That is, the server 200 may previously store data (e.g., a document file) required for the terminal 100 to execute a preset application.

When the server 200 transmits a virtual machine to the terminal 100 that enters a zone corresponding to the server 200, the server 200 may transmit only the virtual machine excluding the data. For example, in a case of business-use data of which the security is important, the server 200 may not transmit the data to the terminal 100 of a user.

In operation S202, based on virtual machine request information, the controller 901 of the server 200 may determine a virtual machine to be transmitted. In operation S203, the controller 901 of the server 200 may transmit the determined virtual machine to the terminal 100.

In operation S204, the controller 130 of the mobile terminal 100 may drive the virtual machine.

In operation S205, the controller 130 of the mobile terminal 100 may access the predefined data stored in the server 200. That is, in a case of the business-use data of which the security is important, the server 200 may not transmit the data to the mobile terminal 100.

The mobile terminal 100 may access the server 200 and may check access-granted data. For example, the server 200 may preset whether to permit access authority to a particular user with respect to data stored in the server 200.

In operation S206, the controller 901 of the server 200 may store data generated or changed according to execution of an application. That is, the mobile terminal 100 may access the server 200 may execute data required in executing the application, and may store the generated or changed data in the server 200.

In operation S207, the controller 901 of the server 200 may determine a zone exit of the mobile terminal 100. In operation S208, when the controller 901 determines the zone exit of the mobile terminal 100, the controller 901 may transmit a virtual machine reclaim command signal to the mobile terminal 100. In operation S209, the controller 130 of the mobile terminal 100 may transmit the virtual machine to the server 200.

That is, the mobile terminal 100 that received the virtual machine reclaim command signal may transmit the virtual machine to the server 200 via the communication unit 150. The virtual machine reclaim command signal may include a command signal for allowing the virtual machine operating in the mobile terminal 100 to be automatically transmitted to the server 200.

In operation S210, the controller 130 of the mobile terminal 100 may delete the virtual machine. The virtual machine reclaim command signal may include a command signal for allowing the virtual machine operating in the mobile terminal 100 to be automatically deleted.

That is, when the mobile terminal 100 exits the zone, the mobile terminal 100 receives a command signal programmed to delete the virtual machine used in the zone, so that the mobile terminal 100 may delete the virtual machine.

The aforementioned exemplary embodiments should be considered in a descriptive sense only and not for purposes of limitation, and are not limited to an order of the operations in the flowchart of FIG. 19. According to one or more exemplary embodiments, some operations may be skipped or added, and an order of some operations may be changed.

Figure 20:
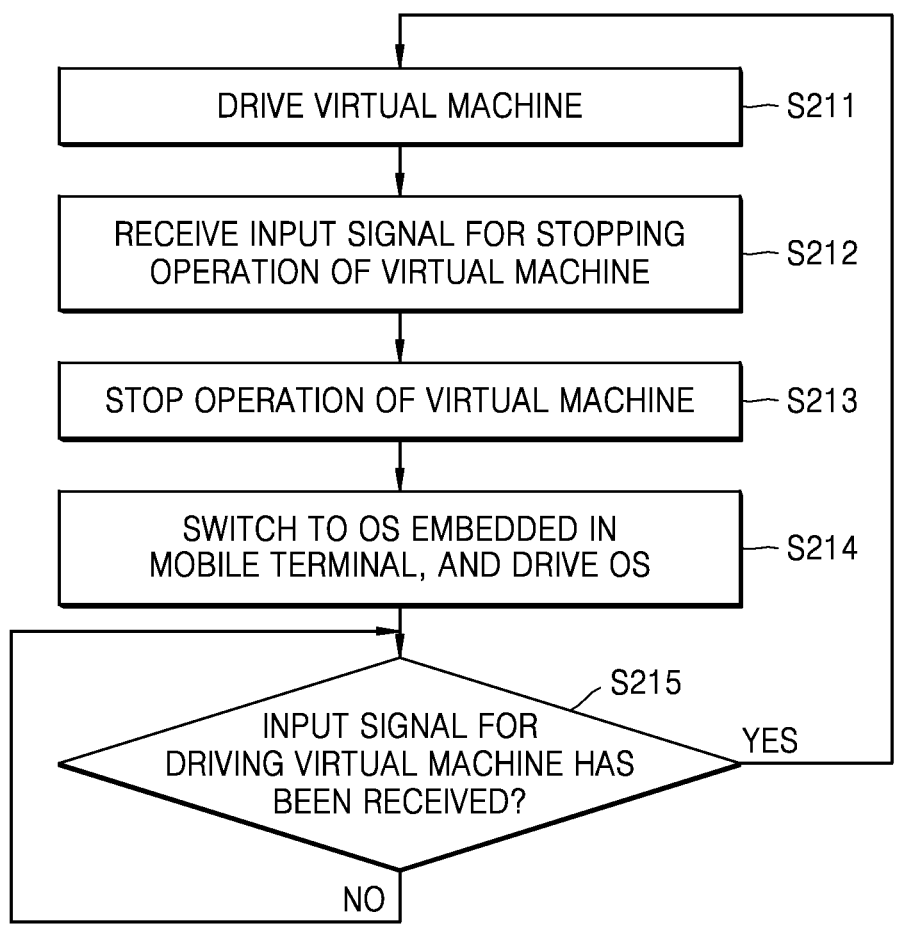
FIG. 20 is a flowchart illustrating an example of receiving an input signal for stopping an operation of a virtual machine, according to an exemplary embodiment.
Figure 21A:
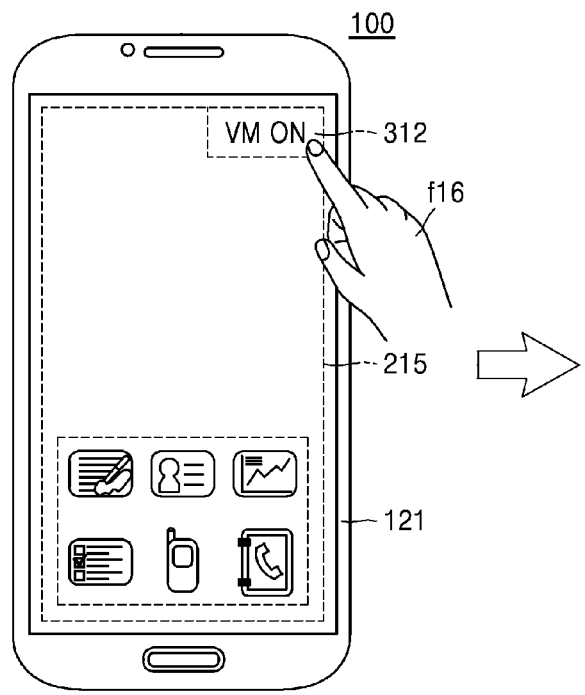
FIGS. 21A and 21B illustrate an example of receiving an input signal for stopping an operation of a virtual machine, according to an exemplary embodiment.
Figure 21B:
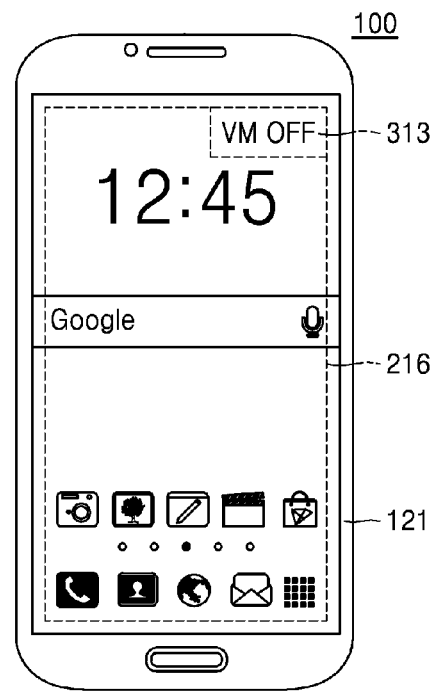
Figure 21C:
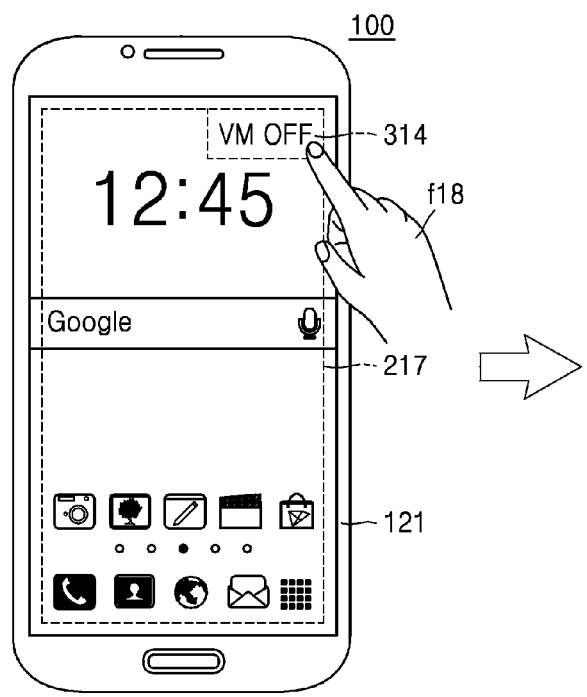
FIGS. 21C and 21D illustrate an example of receiving an input signal for operating a virtual machine, according to an exemplary embodiment.
Figure 21D:
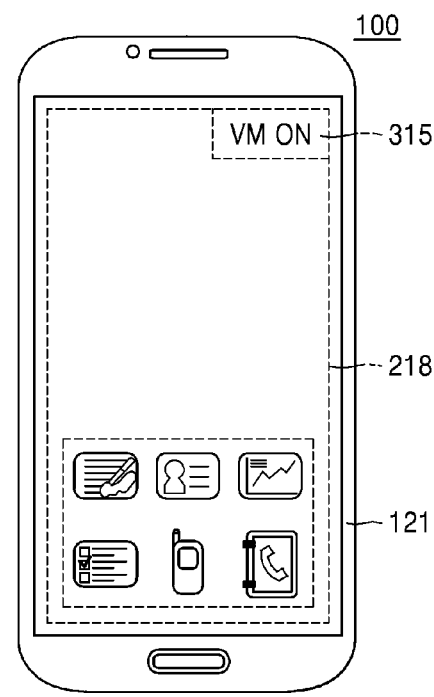

FIG. 20 is a flowchart illustrating an example of receiving an input signal for stopping an operation of a virtual machine, according to an exemplary embodiment. FIGS. 21A and 21B illustrate an example of FIG. 20 of receiving an input signal for stopping an operation of a virtual machine. FIGS. 21C and 21D illustrate an example of receiving an input signal for operating a virtual machine.

When a virtual machine including an OS is installed in the mobile terminal 100 according to an exemplary embodiment, the mobile terminal 100 may provide a computing environment in which an OS embedded in the mobile terminal 100 and the OS driving in the virtual machine are independently driven and are switched in a same device.

For example, if the mobile terminal 100 has embedded therein an Android OS, the mobile terminal 100 may drive a Windows OS in a virtual machine that is installed in the memory 170 of the mobile terminal 100. If the mobile terminal 100 has embedded therein a latest version Android OS, an OS driven by the virtual machine may be an old version Android.

According to an exemplary embodiment, the controller 130 may switch between driving an OS embedded in the mobile terminal 100 and driving an OS included in the virtual machine.

Referring to FIG. 20, in operation S211, the controller 130 of the mobile terminal 100 may drive the virtual machine.

In operation S212, the controller 130 of the mobile terminal 100 may receive an input signal for stopping an operation of the virtual machine.

For example, referring to FIG. 21A, the controller 130 may display, on the display unit 121, a screen 215 whereon the virtual machine is operating. The controller 130 may display, on the display unit 121, an icon 312 indicating that the virtual machine is operating. When the controller 130 receives a touch input of selecting, by using a finger f16 of a user, etc., the icon 312 indicating that the virtual machine is operating, the controller 130 may determine that the controller 130 received the input signal for stopping the operation of the virtual machine.

Referring to FIG. 20, in operation S213, the controller 130 of the mobile terminal 100 may stop the operation of the virtual machine.

The controller 130 may store an execution state (e.g., information about an executed application, data, etc.) of when the operation of the virtual machine is stopped.

In operation S214, the controller 130 of the mobile terminal 100 may switch to the OS embedded in the mobile terminal 100, and may drive the OS.

For example, referring to FIG. 21B, when the controller 130 receives the input signal for stopping the operation of the virtual machine, the controller 130 may switch to the OS embedded in the mobile terminal 100, and may drive the OS. The controller 130 may display, on the display unit 121, a screen 216 whereon the OS (e.g., Android) embedded in the mobile terminal 100 operates.

The controller 130 may display, on the display unit 121, an icon 313 indicating that the operation of the virtual machine is stopped.

Referring to FIG. 20, in operation S215, the controller 130 of the mobile terminal 100 may determine whether an input signal for driving a virtual machine has been received.

For example, referring to FIG. 21C, the controller 130 may display, on the display unit 121, an execution screen 217 of an OS that is embedded in the mobile terminal 100. The controller 130 may display, on the display unit 121, an icon 314 indicating that an operation of the virtual machine installed in the mobile terminal 100 is stopped.

For example, when the controller 130 receives a touch input of selecting, by using a finger f18 of a user, etc., the icon 314 indicating that the operation of the virtual machine is stopped, the controller 130 may drive the virtual machine.

That is, when the controller 130 receives the touch input of selecting the icon 314 indicating that the operation of the virtual machine is stopped, the controller 130 may determine that the controller 130 received the input signal for driving the virtual machine.

As illustrated in FIG. 21D, the controller 130 may display an operating screen 218 of the virtual machine on the display unit 121. The controller 130 may display, on the display unit 121, an icon 315 indicating that the virtual machine is operating.

The aforementioned exemplary embodiments should be considered in a descriptive sense only and not for purposes of limitation, and are not limited to an order of the operations in the flowchart of FIG. 20. According to one or more exemplary embodiments, some operations may be skipped or added, and an order of some operations may be changed.

Figure 21E:
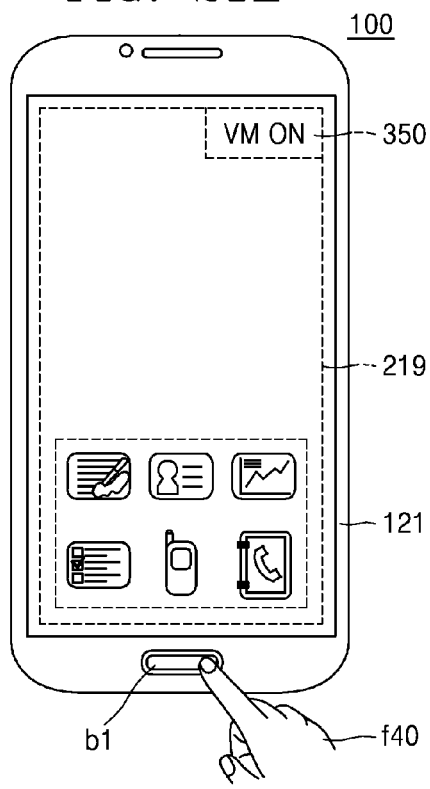
FIGS. 21E and 21F illustrate another example of receiving an input signal for stopping an operation of a virtual machine, according to an exemplary embodiment.
Figure 21F:
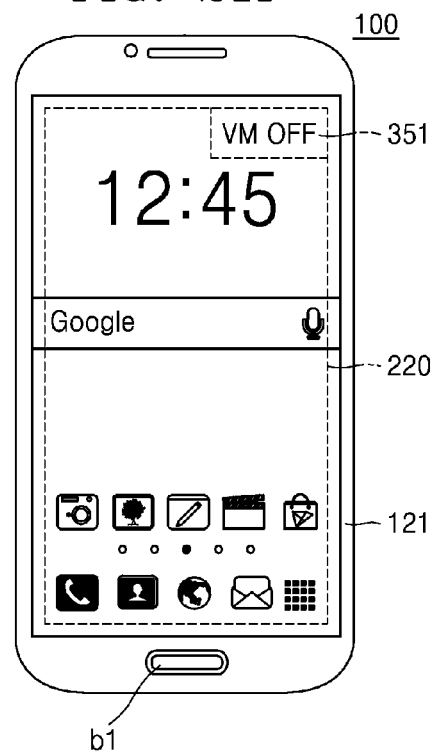

FIGS. 21E and 21F illustrate another example of receiving an input signal for stopping an operation of a virtual machine.

As illustrated in FIG. 21E, when the controller 130 receives an input (f40) of selecting a button b1 (e.g. a home button) arranged at the mobile terminal 100, the controller 130 may stop the virtual machine that is driven.

As illustrated in FIG. 21F, the controller 130 may stop the virtual machine that is driven, may switch to an OS (e.g. Android) that is embedded as a default in the mobile terminal 100, and may execute the OS (refer to a reference numeral 220).

Figure 22A:
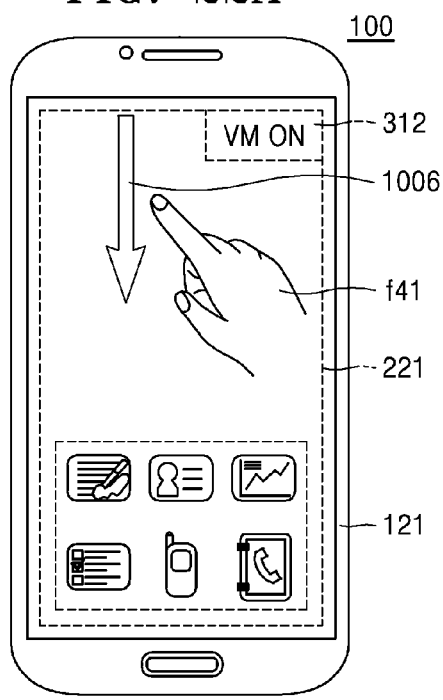
FIGS. 22A and 22B illustrate an example of receiving an input signal for switching a virtual machine, according to an exemplary embodiment.
Figure 22B:
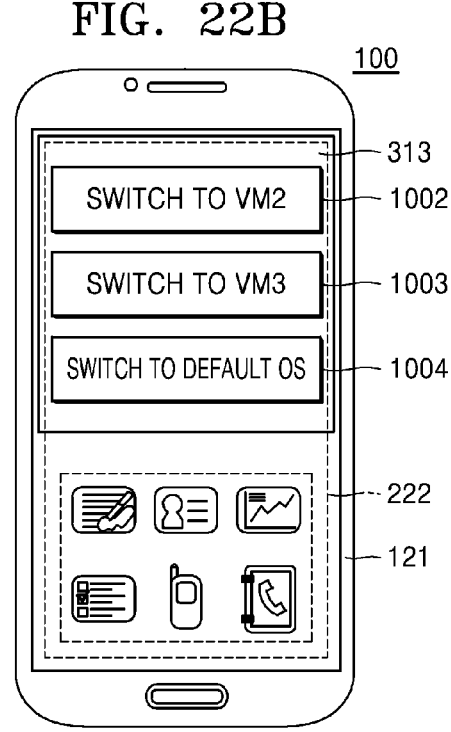

FIGS. 22A and 22B illustrate an example of receiving an input signal for switching a virtual machine, according to an exemplary embodiment.

As illustrated in FIG. 22A, the controller 130 may receive a drag input 1006 starting at a point of an end of the display unit 121 and moving in an opposite direction, via a finger f41, etc. Referring to FIG. 22B, the controller 130 may display, on the display unit 121, selection screens 1002 and 1003 for switching a currently-driven virtual machine to another virtual machine, and/or a selection window 1004 for switching the currently-driven virtual machine to an OS embedded in the mobile terminal 100.

FIGS. 21A though 22B illustrate examples of receiving a user input signal for stopping or switching the virtual machine, but the exemplary embodiments are not limited thereto.

FIGS. 23A through 26 are flowcharts illustrating a controlling method performed by the server 200 and the mobile terminal 100 that deletes a virtual machine, due to a zone exit, according to one or more exemplary embodiments.

Figure 23A:
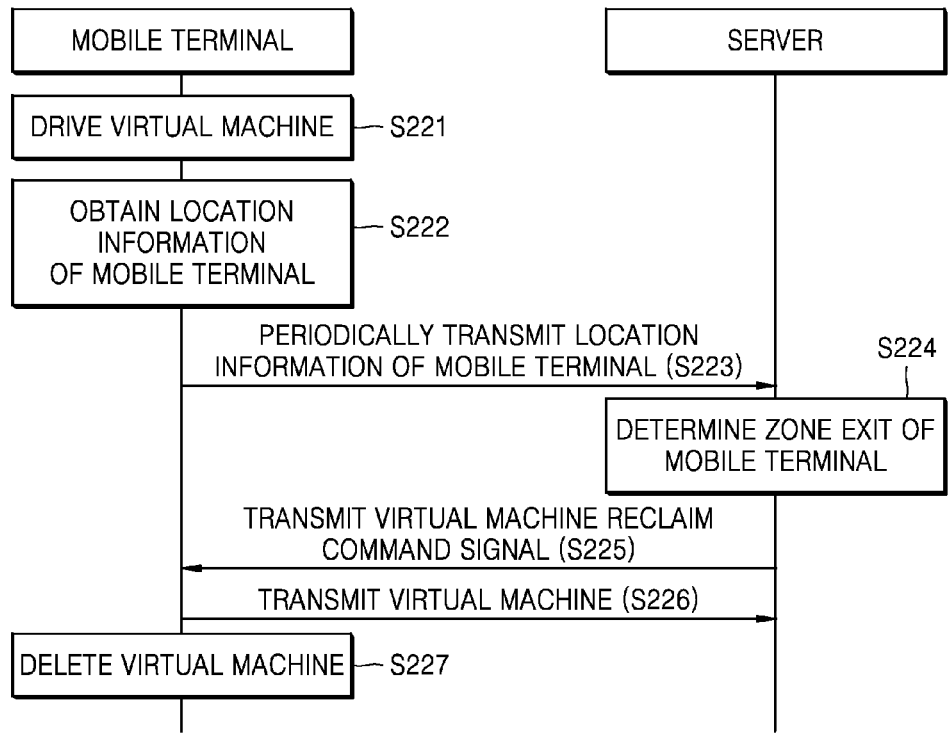
FIGS. 23A through 26 are flowcharts illustrating a controlling method performed by the server and the mobile terminal that deletes a virtual machine, due to a zone exit, according to one or more exemplary embodiments.

As illustrated in FIG. 23A, in operation S221, the controller 130 of the mobile terminal 100 may drive a virtual machine.

In operation S222, the controller 130 of the mobile terminal 100 may obtain location information of the mobile terminal 100. A method of obtaining, by the mobile terminal 100, the location information is described above with reference to FIG. 2A.

The controller 130 according to an exemplary embodiment may skip the operation of obtaining the location information. For example, as illustrated in FIG. 8, when the mobile terminal 100 receives an input signal for a virtual machine request via NFC tagging, the mobile terminal 100 may also obtain the location information.

In operation S223, the controller 130 of the mobile terminal 100 may periodically transmit the location information of the mobile terminal 100 to the server 200. That is, the controller 130 may obtain the location information of the mobile terminal 100 at preset regular intervals, and may transmit the location information to the server 200.

In operation S224, the controller 901 of the server 200 may determine a zone exit of the mobile terminal 100. That is, based on the location information of the mobile terminal 100 received from the mobile terminal 100, the controller 901 of the server 200 may determine whether the mobile terminal 100 has exited a zone that corresponds to the server 200.

In operation S225, the controller 901 of the server 200 may transmit a virtual machine reclaim command signal to the mobile terminal 100. When the controller 901 of the server 200 determines that the mobile terminal 100 has exited the zone, the controller 901 of the server 200 may transmit the virtual machine reclaim command signal to the mobile terminal 100.

In operation S226, the controller 130 of the mobile terminal 100 may transmit the virtual machine to the server 200. That is, the virtual machine reclaim command signal may include a command signal for allowing the virtual machine operating in the mobile terminal 100 to be automatically transmitted to the server 200.

In operation S227, the controller 130 of the mobile terminal 100 may delete the virtual machine. That is, the virtual machine reclaim command signal may include a command signal for allowing the virtual machine operating in the mobile terminal 100 to be automatically deleted.

The aforementioned exemplary embodiments should be considered in a descriptive sense only and not for purposes of limitation, and are not limited to an order of the operations in the flowchart of FIG. 23A. According to one or more exemplary embodiments, some operations may be skipped or added, and an order of some operations may be changed.

Figure 23B:
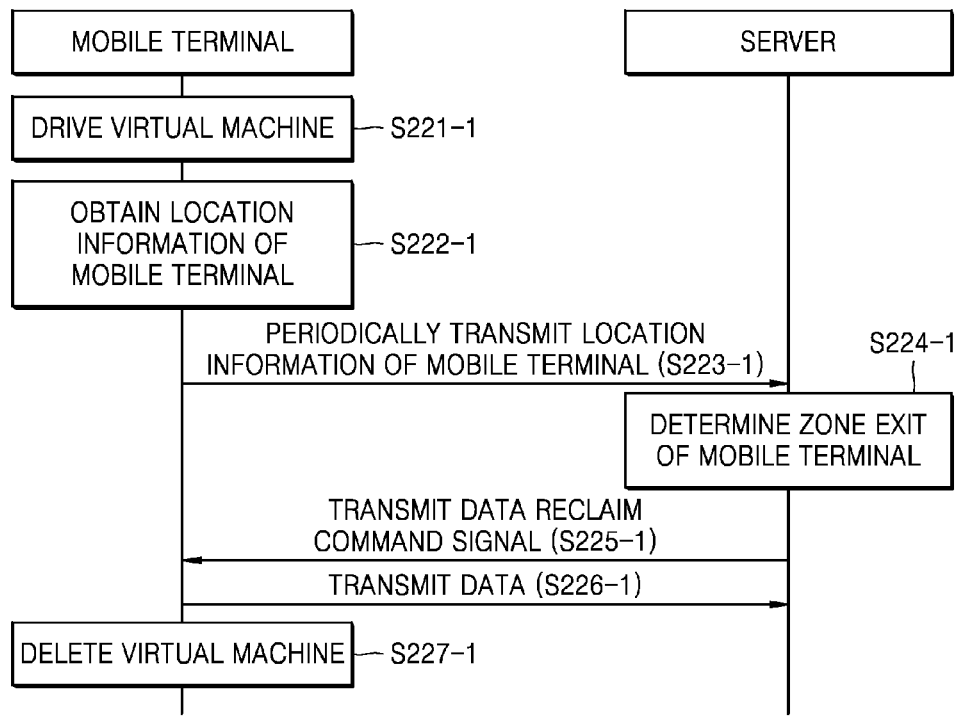

FIG. 23B is a flowchart illustrating an example in which the server 200 reclaims data, due to a zone exit of the mobile terminal 100, according to an exemplary embodiment.

As illustrated in FIG. 23B, while the controller 130 of the mobile terminal 100 drives a virtual machine (S221-1), the controller 130 of the mobile terminal 100 may obtain location information of the mobile terminal 100 (S222-1).

In operation S223-1, the controller 130 may periodically transmit the location information of the mobile terminal 100 to the server 200. In operation S224-1, based on the location information of the mobile terminal 100, the server 200 may determine whether the mobile terminal 100 has exited a zone.

In operation S225-1, when the server 200 determines that the mobile terminal 100 has exited a predefined zone, the server 200 may transmit a data reclaim command signal to the mobile terminal 100.

The data reclaim command signal may include a command signal for allowing data generated or changed while a virtual machine is driven to be transmitted to the server 200. That is, in operation S226-1, based on the data reclaim command signal, the mobile terminal 100 may transmit the data generated or changed while the virtual machine is driven to the server 200.

The data reclaim command signal may include a command signal for allowing the data generated or changed while the virtual machine is driven to be deleted from the memory 170 of the mobile terminal 100. That is, based on the data reclaim command signal, the mobile terminal 100 may transmit the data generated or changed while the virtual machine is driven to the server 200, and then may delete the generated or changed data.

In operation S227-1, based on the data reclaim command signal, the mobile terminal 100 may transmit the data to the server 200 and may delete the virtual machine.

Figure 24:
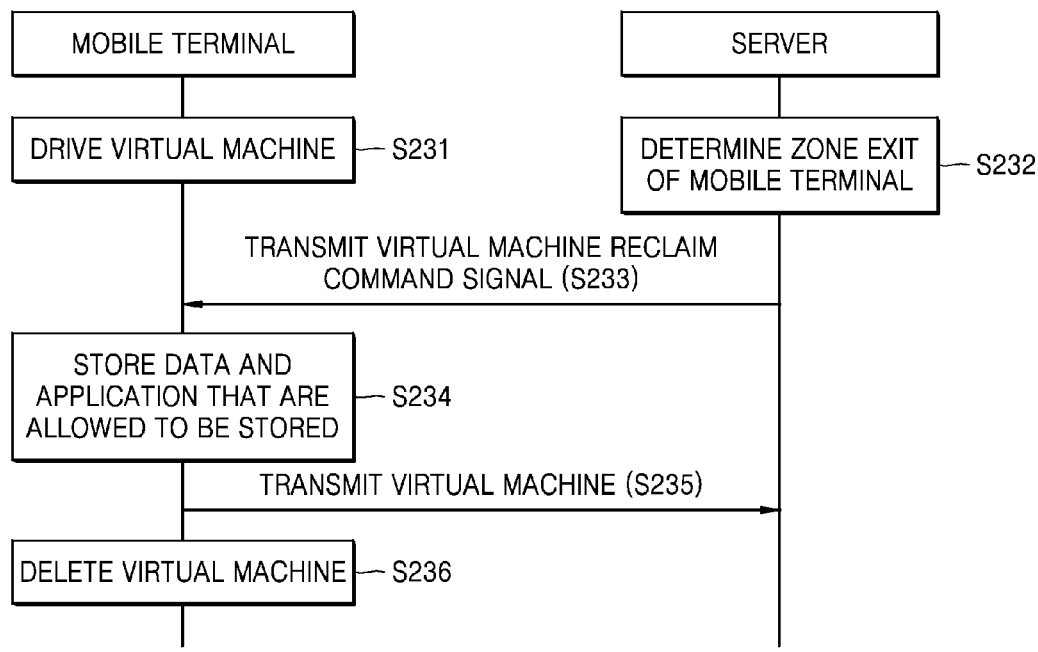

FIG. 24 is a flowchart illustrating a controlling method performed by the server 200 and the mobile terminal 100 that deletes a virtual machine, due to a zone exit, according to another exemplary embodiment.

Referring to FIG. 24, in operation S231, the controller 130 of the mobile terminal 100 may drive a virtual machine.

In operation S232, the controller 901 of the server 200 may determine a zone exit of the mobile terminal 100. In operation S233, the controller 901 of the server 200 may transmit a virtual machine reclaim command signal to the mobile terminal 100. That is, if the server 200 determines that the mobile terminal 100 that is a virtual machine receiving terminal has exited a zone corresponding to the server 200, the server 200 may transmit the virtual machine reclaim command signal to the mobile terminal 100.

The virtual machine reclaim command signal may include information about data or an application that is allowed to be stored. For example, the server 200 may include, in the virtual machine reclaim command signal, information for allowing the mobile terminal 100 that is the virtual machine receiving terminal to store the application or the data, and may transmit the virtual machine reclaim command signal.

In operation S234, the controller 130 of the mobile terminal 100 may store, in the memory 170, the data and the application that are allowed to be stored (S234).

For example, a company server may grant authority to store data or an application that is not related to a company business and thus has a low security level, to a personal mobile terminal of a user.

The controller 130 of the mobile terminal 100 according to an exemplary embodiment may transmit the virtual machine (S235). That is, the virtual machine reclaim command signal may include a command signal for allowing the controller 130 of the mobile terminal 100 to automatically transmit the virtual machine to the server 200.

In operation S236, the controller 130 of the mobile terminal 100 may delete the virtual machine. That is, the virtual machine reclaim command signal may include a command signal for allowing the controller 130 of the mobile terminal 100 to automatically delete the virtual machine.

The aforementioned exemplary embodiments should be considered in a descriptive sense only and not for purposes of limitation, and are not limited to an order of the operations in the flowchart of FIG. 24. According to one or more exemplary embodiments, some operations may be skipped or added, and an order of some operations may be changed.

Figure 25:
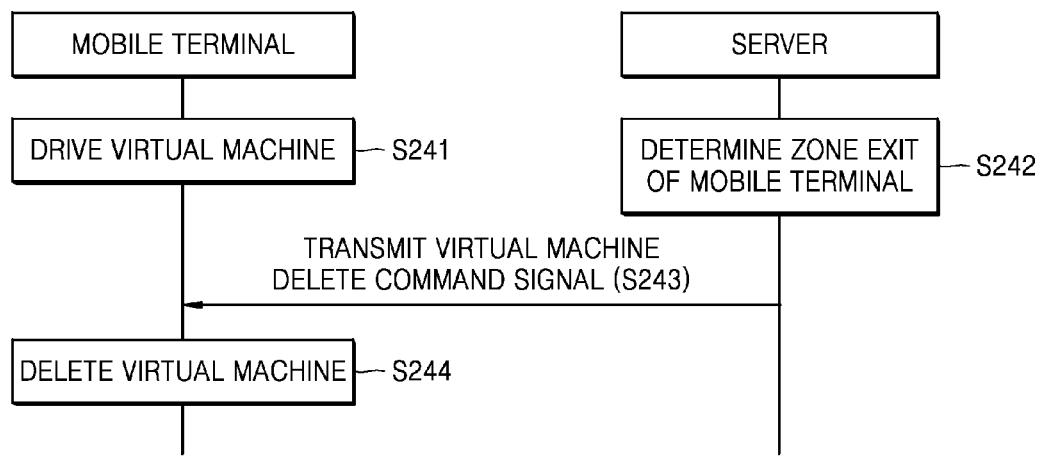

FIG. 25 is a flowchart illustrating a controlling method performed by the server 200 and the mobile terminal 100 that deletes a virtual machine, due to a zone exit, according to another exemplary embodiment.

Referring to FIG. 25, in operation S251, the controller 130 of the mobile terminal 100 may drive a virtual machine.

In operation S242, the controller 901 of the server 200 may determine a zone exit of the mobile terminal 100. In operation S243, the controller 901 of the server 200 may transmit a virtual machine delete command signal to the mobile terminal 100. That is, if the server 200 determines that the mobile terminal 100 that is a virtual machine receiving terminal has exited a zone corresponding to the server 200, the server 200 may transmit the virtual machine delete command signal to the mobile terminal 100.

In operation S244, the controller 130 of the mobile terminal 100 may delete the virtual machine. That is, the virtual machine delete command signal may include a command signal for allowing the mobile terminal 100 to delete the virtual machine.

That is, the server 200 according to an exemplary embodiment may not transmit a virtual machine reclaim command signal to the mobile terminal 100 that is the virtual machine receiving terminal.

The aforementioned exemplary embodiments should be considered in a descriptive sense only and not for purposes of limitation, and are not limited to an order of the operations in the flowchart of FIG. 25. According to one or more exemplary embodiments, some operations may be skipped or added, and an order of some operations may be changed.

Figure 26:
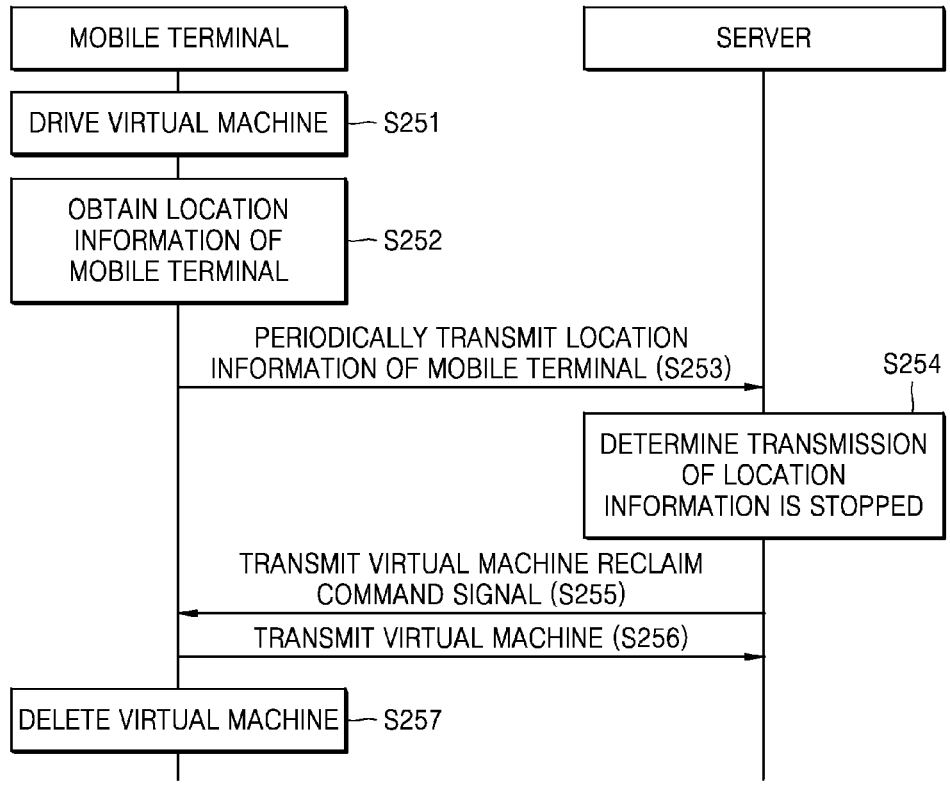

FIG. 26 is a flowchart illustrating a controlling method performed by the server 200 and the mobile terminal 100 that deletes a virtual machine, due to a zone exit, according to another exemplary embodiment.

Referring to FIG. 26, in operation S251, the controller 130 of the mobile terminal 100 according to an exemplary embodiment may drive a virtual machine.

In operation S252, the controller 130 may obtain location information of the mobile terminal 100. In operation S253, the controller 130 may periodically transmit the location information of the mobile terminal 100 to the server 200. That is, the controller 130 may obtain the location information of the mobile terminal 100 at preset regular intervals, and may transmit the location information to the server 200.

In operation S254, the controller 901 of the server 200 may determine that transmission of the location information is stopped. In operation S255, the controller 901 of the server 200 may transmit a virtual machine reclaim command signal to the mobile terminal 100.

That is, the controller 901 of the server 200 may perform a determination at preset regular intervals, and if the controller 901 of the server 200 determines that the transmission of the location information of the mobile terminal 100 is stopped, the controller 901 of the server 200 may transmit the virtual machine reclaim command signal to the mobile terminal 100.

For example, when a GPS sensor operating in the mobile terminal 100 is turned off, the transmission of the location information of the mobile terminal 100 may be stopped. That is, when a user of the mobile terminal 100 exits a corresponding zone, and intentionally turns off the GPS sensor, the server 200 may transmit the virtual machine reclaim command signal to the mobile terminal 100.

In operation S256, the controller 130 of the mobile terminal 100 may transmit the virtual machine to the server

200. In operation S257, the controller 130 of the mobile terminal 100 may delete the virtual machine. That is, the virtual machine reclaim command signal may include a command signal for allowing the virtual machine to be automatically transmitted to the server 200. The virtual machine reclaim command signal may include a command signal for allowing the virtual machine to be automatically deleted.

The aforementioned exemplary embodiments should be considered in a descriptive sense only and not for purposes of limitation, and are not limited to an order of the operations in the flowcharts of FIGS. 23 through 26. According to one or more exemplary embodiments, some operations may be skipped or added, and an order of some operations may be changed.

Figure 27:
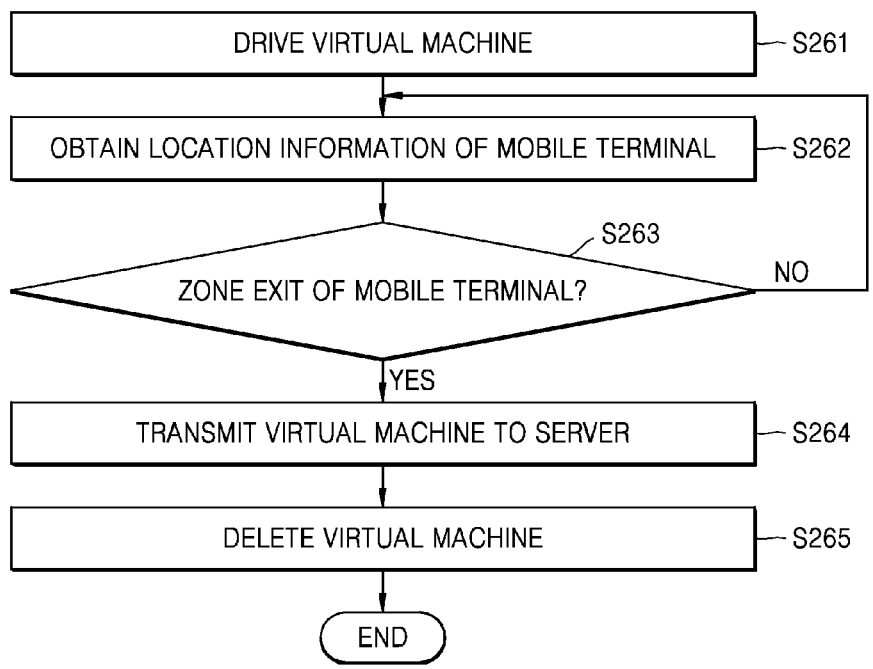
FIG. 27 is a flowchart illustrating a controlling method performed by the mobile terminal 100 that deletes a virtual machine, due to a zone exit, according to another exemplary embodiment.

FIG. 27 is a flowchart illustrating a controlling method performed by the mobile terminal 100 that deletes a virtual machine, due to a zone exit, according to another exemplary embodiment.

Referring to FIG. 27, in operation S261, the controller 130 of the mobile terminal 100 according to an exemplary embodiment may drive a virtual machine.

In operation S262, the controller 130 of the mobile terminal 100 may obtain location information of the mobile terminal 100. A method of obtaining, by the mobile terminal 100, the location information is described above with reference to FIG. 2A.

In operation S263, the controller 130 may determine whether the mobile terminal 100 has exited a zone.

Based on the location information of the mobile terminal 100, the controller 130 may determine whether the mobile terminal 100 has exited a zone that corresponds to the virtual machine operating in the mobile terminal 100.

In operation S263, if the controller 130 determines that the mobile terminal 100 did not exit the zone, the controller 130 may obtain the location information of the mobile terminal 100 at preset regular intervals (S262).

In operation S264, if the controller 130 determines that the mobile terminal 100 has exited the zone, the controller 130 may transmit the virtual machine to the server 200. That is, the virtual machine operating in the mobile terminal 100 may include a command signal for allowing the virtual machine itself to be automatically transmitted to the server 200, when the virtual machine exits a particular zone.

In operation S265, if the controller 130 determines that the mobile terminal 100 has exited the zone, the controller 130 may delete the virtual machine. That is, the virtual machine operating in the mobile terminal 100 may include a command signal for allowing the virtual machine itself to be automatically deleted from the mobile terminal 100, when the virtual machine exits a particular zone.

The aforementioned exemplary embodiments should be considered in a descriptive sense only and not for purposes of limitation, and are not limited to an order of the operations in the flowchart of FIG. 27. According to one or more exemplary embodiments, some operations may be skipped or added, and an order of some operations may be changed.

Figure 28A:
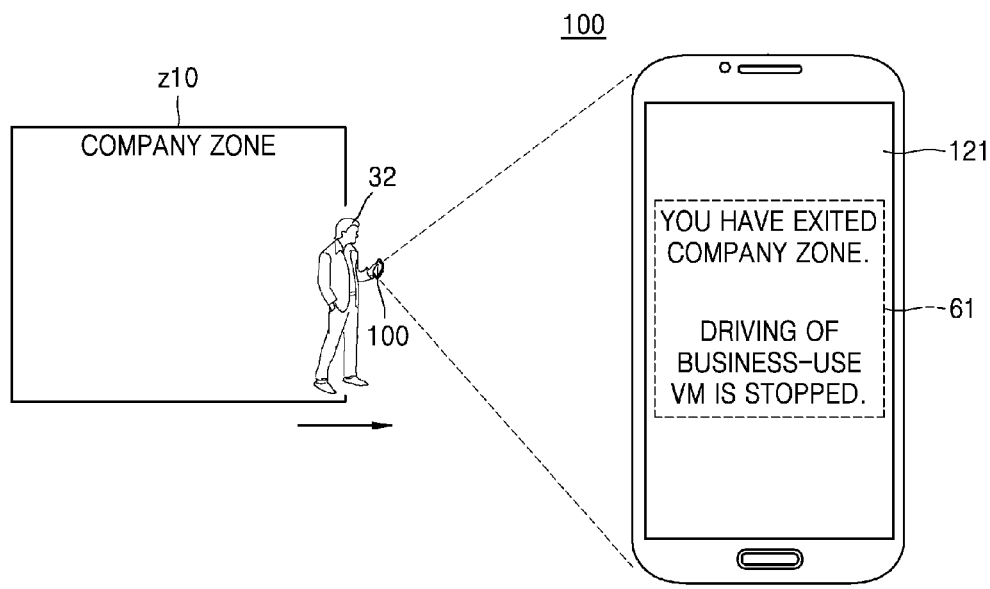
FIG. 28A illustrates an example of stopping an operation of a virtual machine, due to a zone exit, according to an exemplary embodiment.

FIG. 28A illustrates an example of stopping an operation of a virtual machine, due to a zone exit, according to an exemplary embodiment.

As illustrated in FIG. 28A, when a user 32 of the mobile terminal 100 exits a company zone z10, the controller 130 may display, on the display unit 121, a screen 61 indicating that an operation of a business-use virtual machine driven in the company zone z10 is stopped.

That is, since the business-use virtual machine driven in the mobile terminal 100 is automatically deleted, the controller 130 may display, on the display unit 121, the screen 61 indicating that the operation of the business-use virtual machine is stopped.

The aforementioned exemplary embodiments should be considered in a descriptive sense only and not for purposes of limitation.

Figure 28B:
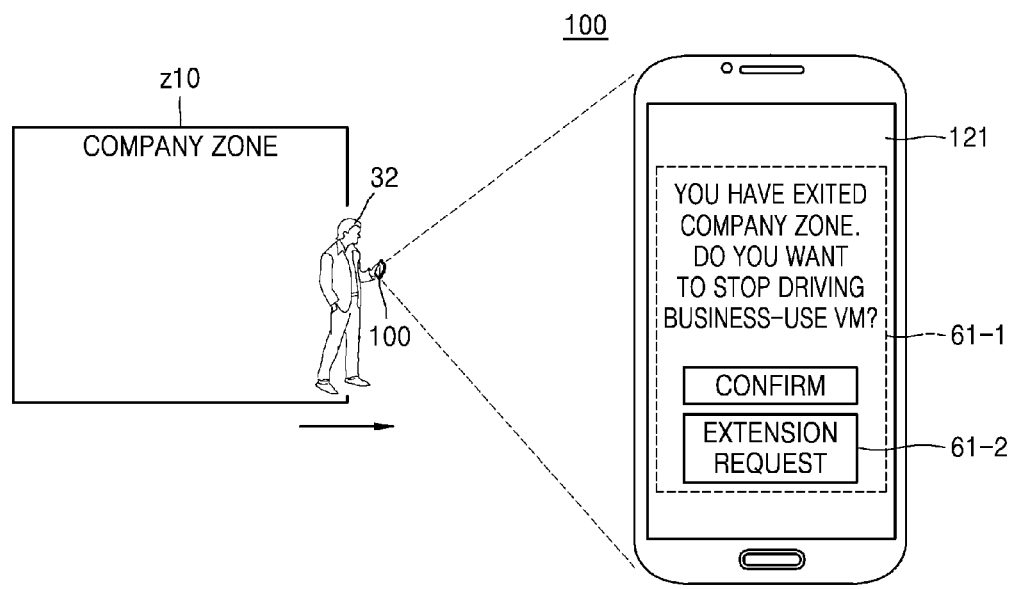
FIG. 28B illustrates an example of confirming a zone exit, according to an exemplary embodiment.

FIG. 28B illustrates an example of confirming a zone exit, according to an exemplary embodiment.

As illustrated in FIG. 28B, when a user 32 of the mobile terminal 100 exits a company zone z10, the controller 130 may display, on the display unit 121, a message window 61-1 for requesting confirmation about whether a user has exited a company zone.

For example, due to malfunction of a GPS sensor of the mobile terminal 100, the mobile terminal 100 may have an error in determining the zone exit, so that the mobile terminal 100 may display the confirmation request message 61-1 on the display unit 121.

The controller 130 of the mobile terminal 100 may display an extension request button 61-2 with respect to using the virtual machine on the display unit 121. When the controller 130 receives an input of selecting the extension request button 61-2, the controller 130 may request extension of use of the virtual machine by transmitting location information of the mobile terminal 100 to the server 200. When the server 200 receives a request signal for extending the use of the virtual machine from the mobile terminal 100, the server 200 may check the location information of the mobile terminal 100 and may determine whether to reclaim the virtual machine.

The aforementioned exemplary embodiments should be considered in a descriptive sense only and not for purposes of limitation.

Figure 29:
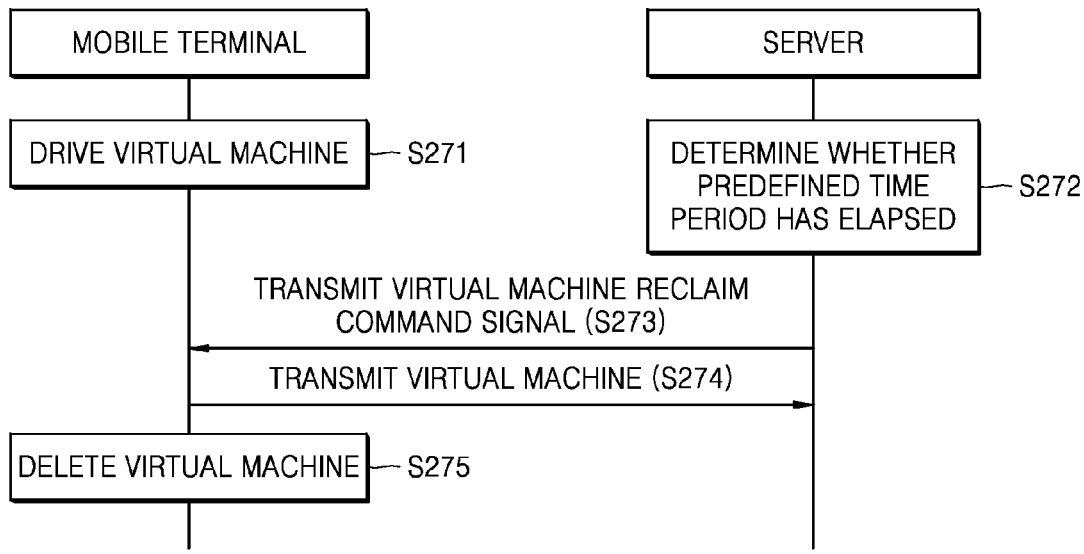
FIG. 29 is a flowchart illustrating a controlling method performed by the server and the mobile terminal that stops an operation of a virtual machine due to an elapse of a time period, according to an exemplary embodiment.
Figure 30:
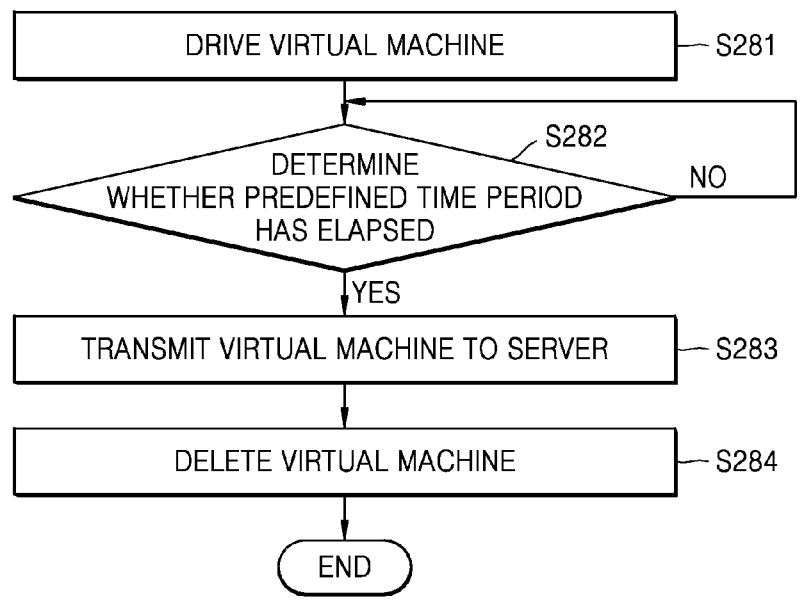
FIG. 30 is a flowchart illustrating a controlling method performed by the mobile terminal that stops an operation of a virtual machine due to an elapse of a time period, according to an exemplary embodiment.
Figure 31:
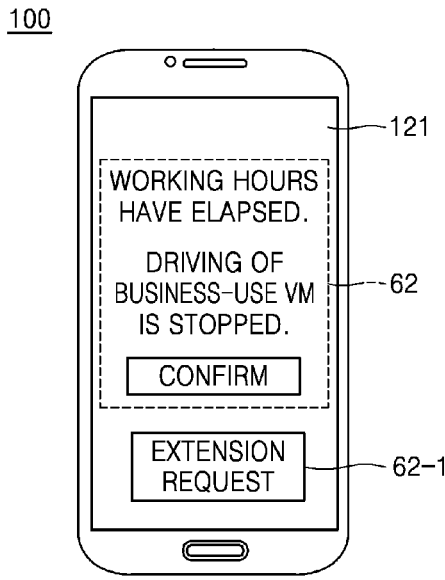
FIG. 31 illustrates a screen of the mobile terminal that stops an operation of a virtual machine due to an elapse of a time period, according to an exemplary embodiment.

FIG. 29 is a flowchart illustrating a controlling method performed by the server 200 and the mobile terminal 100 that stops an operation of a virtual machine due to an elapse of a time period, according to an exemplary embodiment. FIG. 30 is a flowchart illustrating a controlling method performed by the mobile terminal 100 that stops an operation of a virtual machine due to a time period elapsing, according to an exemplary embodiment. FIG. 31 illustrates a screen of the mobile terminal 100 that stops an operation of a virtual machine due to a time period elapsing.

Referring to FIG. 29, in operation S271, the controller 130 of the mobile terminal 100 may drive a virtual machine.

In operation S272, the controller 901 of the server 200 may determine whether a predefined time period has elapsed. For example, the server 200 may limit a virtual machine receiving terminal to a predefined time period for executing the virtual machine.

In operation S273, when the controller 901 of the server 200 determines that the predefined time period has elapsed, the controller 901 of the server 200 may transmit a virtual machine reclaim command signal to the mobile terminal 100.

In operation S274, the controller 130 of the mobile terminal 100 may transmit the virtual machine to the server 200. That is, the virtual machine reclaim command signal may include a command signal for allowing the mobile terminal 100 to automatically transmit the virtual machine to the server 200.

In operation S275, the controller 130 of the mobile terminal 100 may delete the virtual machine. That is, the virtual machine reclaim command signal may include a command signal for allowing the virtual machine to be automatically deleted.

Referring to FIG. 30, in operation S281, the controller 130 of the mobile terminal 100 may drive a virtual machine. In operation S282, the controller 130 may determine whether a predefined time period has elapsed. That is, the mobile terminal 100 that drives the virtual machine may determine whether the predefined time period, during which the virtual machine can be driven, has elapsed.

For example, the virtual machine may include a command signal for making the virtual machine inexecutable after a particular time is reached.

In operation S283, the controller 130 of the mobile terminal 100 may transmit the virtual machine to the server 200. In operation S284, the controller 130 of the mobile terminal 100 may delete the virtual machine.

That is, when the controller 130 determines that the predefined time period has elapsed, the controller 130 may automatically transmit the virtual machine to the server 200. When the controller 130 determines that the predefined time period has elapsed, the controller 130 may automatically delete the virtual machine.

Referring to FIG. 31, the controller 130 may display, on the display unit 121, a screen 62 indicating that an operation of a business-use virtual machine is stopped due to an elapse of a predefined time period.

For example, the business-use virtual machine may be set to be automatically deleted when a predefined time period elapses after a driving start time of the business-use virtual machine. The business-use virtual machine may be set to be automatically deleted when a particular closing time comes.

The controller 130 may display, on the display unit 121, a button 62-1 for requesting extension of use of a virtual machine after an elapse of the predefined time period.

When the controller 130 receives an input of selecting the button 62-1 for requesting extension of use of the virtual machine, the controller 130 may request extension of use of the virtual machine by transmitting location information of the mobile terminal 100 to the server 200. The server 200 may check location information of the mobile terminal 100 and may determine whether to reclaim the virtual machine. That is, when the mobile terminal 100 is located within a company zone, the server 200 may permit extension of use of the business-use virtual machine.

For example, in a case in which a user attempts to further use the business-use virtual machine in a company after an elapse of working hours, the user may request extension of use of the business-use virtual machine.

The aforementioned exemplary embodiments should be considered in a descriptive sense only and not for purposes of limitation, and are not limited to an order of the operations in the flowcharts of FIGS. 29 and 30. According to one or more exemplary embodiments, some operations may be skipped or added, and an order of some operations may be changed.

Figure 32A:
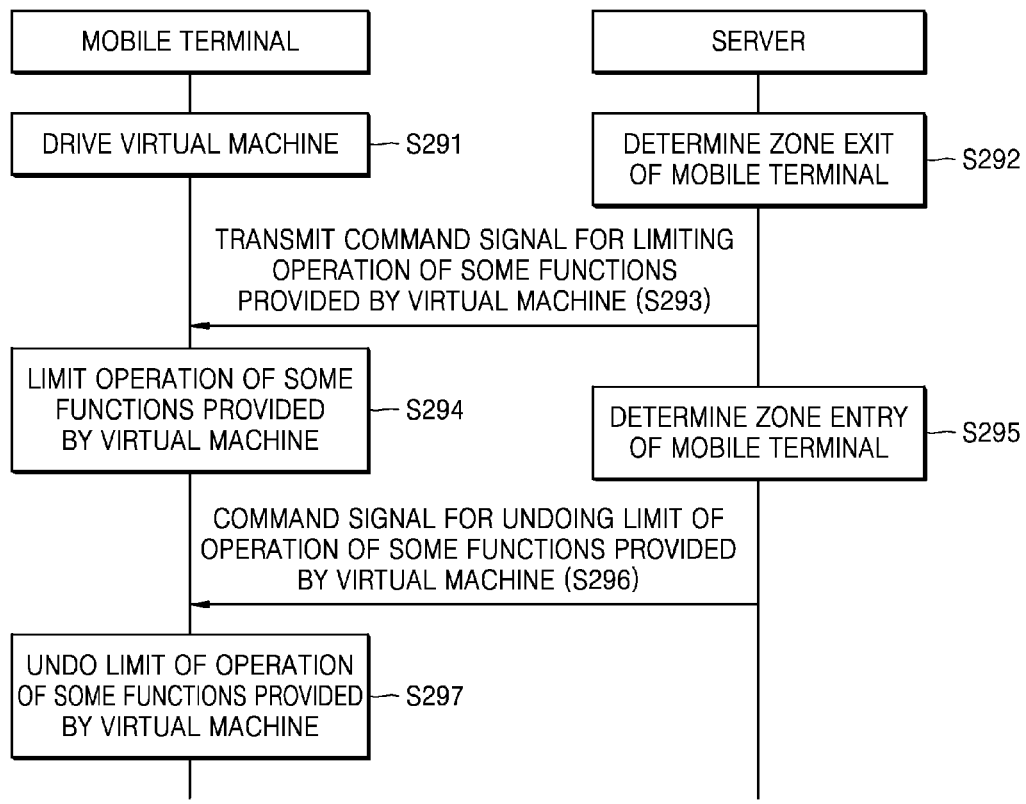
FIG. 32A is a flowchart illustrating a controlling method performed by the server and the mobile terminal in which an operation of some functions of a virtual machine is limited due to a zone exit, according to an exemplary embodiment.
Figure 32B:
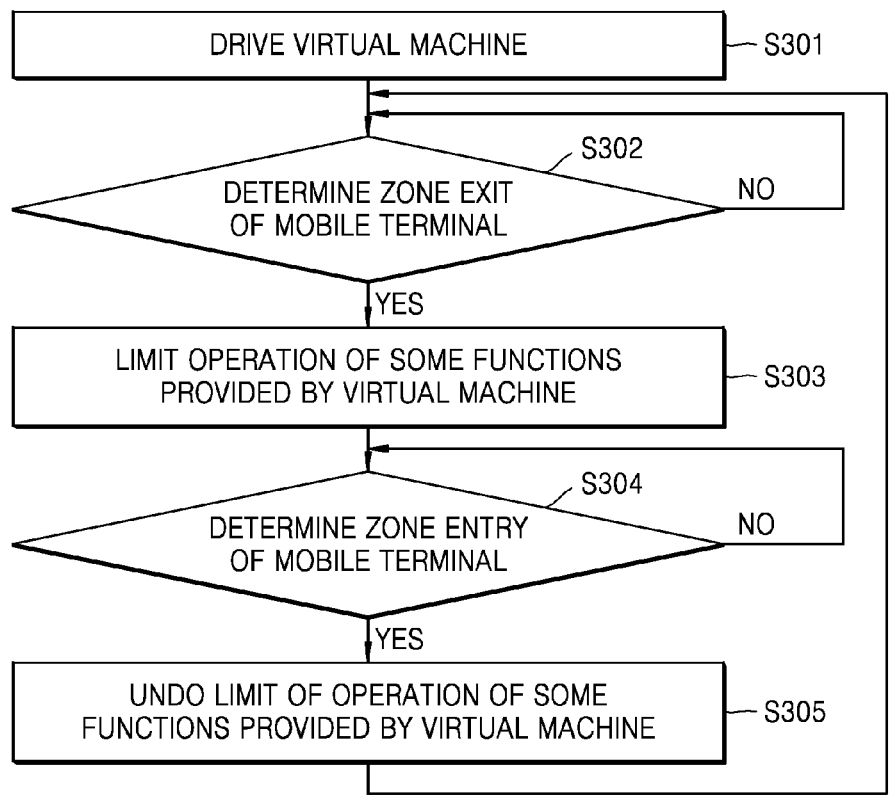
FIG. 32B is a flowchart illustrating a controlling method performed by the mobile terminal 100 in which an operation of some functions of a virtual machine is limited due to a zone exit, according to an exemplary embodiment.
Figure 33:
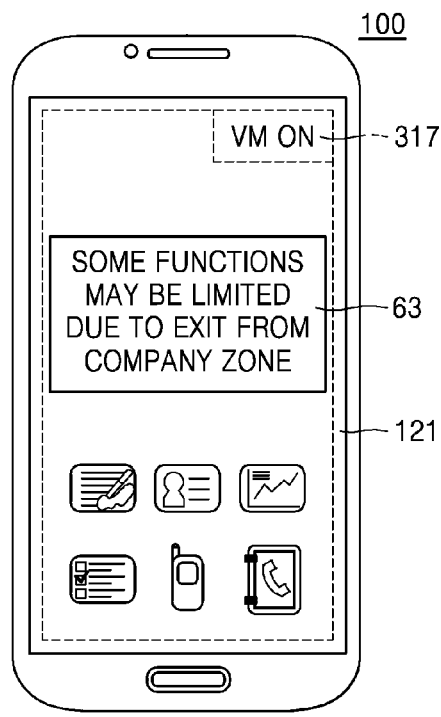
FIG. 33 illustrates a screen of the mobile terminal in which an operation of some functions of a virtual machine is limited due to a zone exit, according to an exemplary embodiment.

FIG. 32A is a flowchart illustrating a controlling method performed by the server 200 and the mobile terminal 100 in which an operation of some functions of a virtual machine is limited due to a zone exit, according to an exemplary embodiment. FIG. 32B is a flowchart illustrating a controlling method performed by the mobile terminal 100 in which an operation of some functions of a virtual machine is limited due to a zone exit, according to an exemplary embodiment. FIG. 33 illustrates a screen of the mobile terminal 100 in which an operation of some functions of a virtual machine is limited due to a zone exit, according to an exemplary embodiment.

As illustrated in FIG. 32A, in operation S291, the controller 130 of the mobile terminal 100 may drive a virtual machine.

In operation S292, the controller 901 of the server 200 may determine whether the mobile terminal 100 driving the virtual machine has exited a zone that corresponds to the virtual machine.

In operation S293, the controller 901 of the server 200 may transmit a command signal for limiting an operation of some functions provided by the virtual machine. That is, if the server 200 determines that the mobile terminal 100 has exited the zone, the server 200 may transmit, to the mobile terminal 100, the command signal for limiting the operation of some functions provided by the virtual machine.

In operation S294, the controller 130 of the mobile terminal 100 may limit the operation of some functions provided by the virtual machine.

That is, the command signal for limiting the operation of some functions provided by the virtual machine may include a command signal for automatically setting a limit in using a particular application or data from among functions provided by the virtual machine.

In operation S295, the controller 901 of the server 200 may determine a zone entry of the mobile terminal 100. In operation S296, when the controller 901 of the server 200 determines that the mobile terminal 100 has re-entered the zone, the controller 901 of the server 200 may transmit a command signal for undoing a limit of the operation of some functions provided by the virtual machine.

In operation S297, the controller 130 of the mobile terminal 100 may undo the limit of the operation of some functions provided by the virtual machine.

That is, the command signal for undoing the limit of the operation may include a command signal for setting some functions to be operable, wherein the operation of some functions was limited based on the command signal for limiting the operation.

The server 200 according to an exemplary embodiment may receive location information of the mobile terminal 100 from the mobile terminal 100 at preset regular intervals. Based on the location information, the server 200 may determine whether the mobile terminal 100 has exited the zone.

Methods of determining the zone exit of the mobile terminal 100, the methods performed by the server 200, are not limited to this.

As illustrated in FIG. 32B, in operation S301, the controller 130 of the mobile terminal 100 may drive a virtual machine.

In operation S302, the controller 130 of the mobile terminal 100 may determine a zone exit of the mobile terminal 100. In operation S303, the controller 130 of the mobile terminal 100 may limit an operation of some functions provided by the virtual machine. That is, when the controller 130 of the mobile terminal 100 determines that the mobile terminal 100 has exited a zone corresponding to the virtual machine that is driven, the controller 130 of the mobile terminal 100 may limit the operation of some functions provided by the virtual machine.

For example, the virtual machine may include a command signal set to automatically limit an operation of some functions of an application and data provided by the virtual machine, when the virtual machine exits a particular zone.

In operation S304, the controller 130 of the mobile terminal 100 may determine zone entry of the mobile terminal 100. In operation S305, the controller 130 of the mobile terminal 100 may undo the limit of the operation of some functions provided by the virtual machine. That is, when the controller 130 of the mobile terminal 100 determines that the mobile terminal 100 re-enters the zone that the mobile terminal 100 exited, the controller 130 of the mobile terminal 100 may undo the limit.

For example, the virtual machine may include a command signal set to automatically undo the limit of the operation of some functions of the application and the data provided by the virtual machine, in a case in which the virtual machine re-enters a particular zone after the virtual machine has exited the particular zone.

Referring to FIG. 33, even if the mobile terminal 100 exits a company zone, the controller 130 may not stop an operation of a virtual machine but may maintain the operation. The controller 130 may display, on the display unit 121, an icon 317 indicating that the virtual machine is operating.

That is, even if the mobile terminal 100, according to an exemplary embodiment, exits the company zone, the mobile terminal 100 may limit an operation of some functions provided by the virtual machine while the mobile terminal 100 maintains the operation of the virtual machine. If the mobile terminal 100 exits the company zone, the controller 130 may display, on the display unit 121, a screen 63 notifying a user that the operation of some functions may be limited.

For example, a business-use virtual machine that is being driven in the mobile terminal 100 that has exited the company zone may be limited in operating an application related to work data. For example, the business-use virtual machine that is being driven in the mobile terminal 100 that has exited the company zone may operate a user's personal schedule management application having a low security level.

The aforementioned exemplary embodiments should be considered in a descriptive sense only and not for purposes of limitation, and are not limited to an order of the operations in the flowcharts of FIGS. 32A and 32B. According to one or more exemplary embodiments, some operations may be skipped or added, and an order of some operations may be changed.

Figure 34:
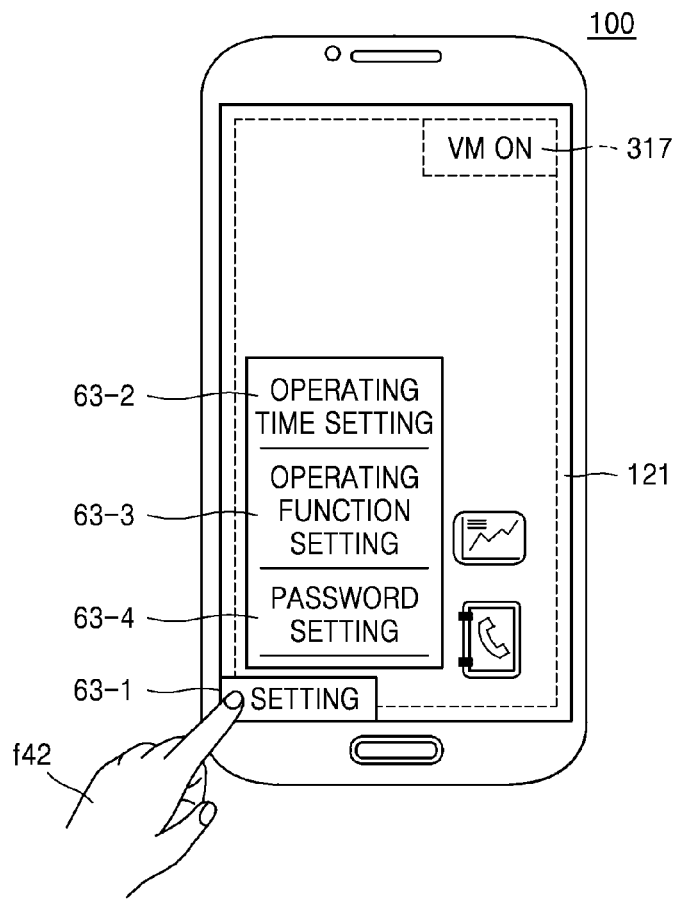
FIG. 34 illustrates an example of use setting of a virtual machine, according to an exemplary embodiment.

FIG. 34 illustrates an example of use setting of a virtual machine, according to an exemplary embodiment.

The controller 130 of the mobile terminal 100 according to an exemplary embodiment may receive an input selection for a setting of the virtual machine from a user. For example, when the controller 130 receives an input of selecting a setting menu 63-1 by using a finger f42, etc., the controller 130 may display an operating time setting menu 63-2, an operating function setting menu 63-3, a password setting menu 63-4, and the like, on the display unit 121.

That is, the controller 130 may receive a user input about driving time setting of the virtual machine via the operating time setting menu 63-2.

The controller 130 may receive a user input of limiting an operation of some functions provided by the virtual machine via the operating function setting menu 63-3.

The controller 130 may receive, via the password setting menu 63-4, an input of setting a password required to use an application and the like included in the virtual machine.

That is, the controller 130 may set an operating time, a limit of a function, the password, etc., of the virtual machine via a user input.

Figure 35:
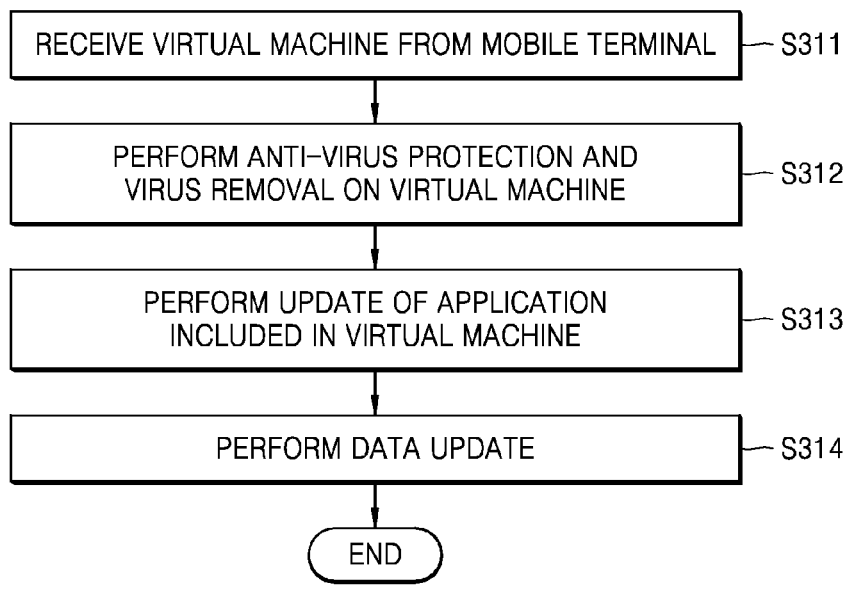
FIG. 35 is a flowchart illustrating operations of the server, according to an exemplary embodiment.

FIG. 35 is a flowchart for describing operations of the server 200, according to an exemplary embodiment.

In operation S311, the controller 901 of the server 200 may receive a virtual machine from the mobile terminal 100. For example, when the controller 901 of the server 200 determines that a virtual machine receiving terminal has exited a zone where the virtual machine is executable, the controller 901 of the server 200 may receive the virtual machine from the mobile terminal 100, according to a predefined command signal.

In operation S312, the controller 901 of the server 200 may perform anti-virus protection and virus removal on the virtual machine. For example, when the server 200 receives the virtual machine from the mobile terminal 100, the server 200 may perform anti-virus protection and virus removal on an application and the like included in the virtual machine.

In operation S313, the controller 901 of the server 200 may perform an update of an application. That is, the server 200 may perform an update of the application included in the virtual machine.

In operation S314, the controller 901 of the server 200 may perform a data update. That is, the server 200 may perform an update of data stored in the server 200 or data included in the virtual machine.

The aforementioned exemplary embodiments should be considered in a descriptive sense only and not for purposes of limitation, and are not limited to an order of the operations in the flowchart of FIG. 35. According to one or more exemplary embodiments, some operations may be skipped or added, and an order of some operations may be changed.

Figure 36A:
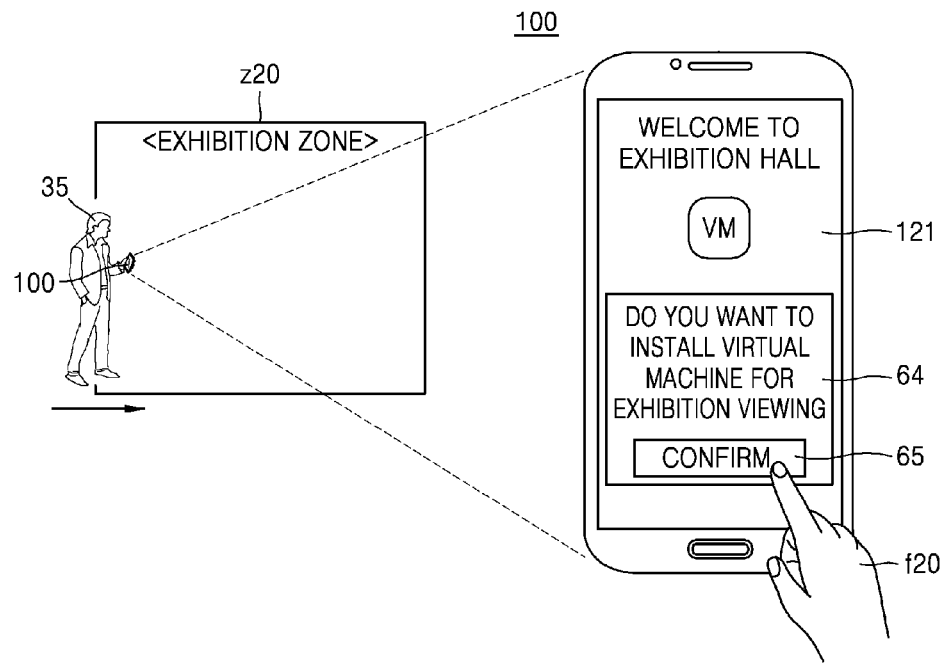
FIGS. 36A and 36B illustrate an example of receiving an input signal for a virtual machine request, according to an exemplary embodiment.
Figure 36B:
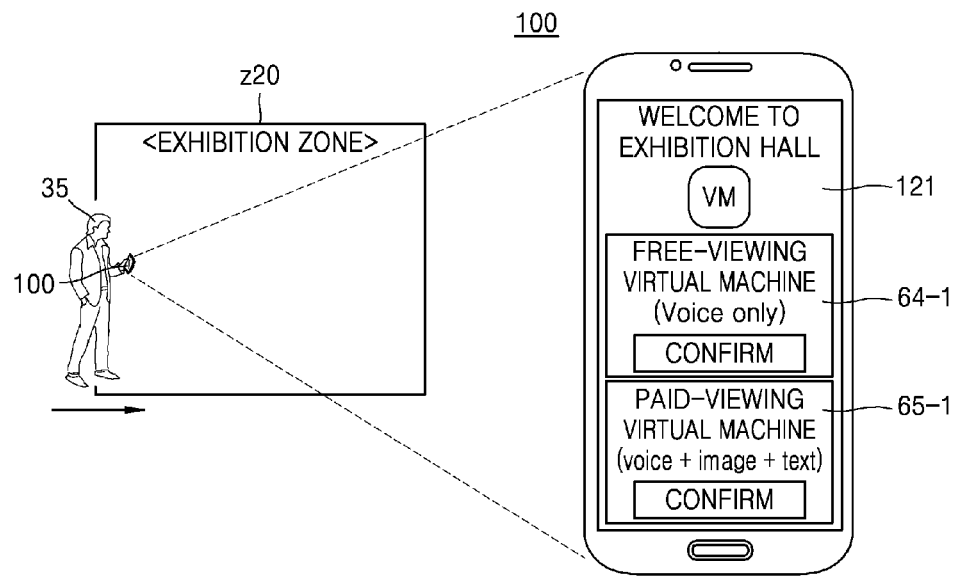

FIGS. 36A and 36B illustrate an example of receiving an input signal for a virtual machine request, according to an exemplary embodiment.

As illustrated in FIG. 36A, when the mobile terminal 100 according to an exemplary embodiment enters an exhibition zone, the mobile terminal 100 may install a virtual machine for exhibition viewing. For example, a user terminal may receive a virtual machine that is usable in an art exhibition, a photo exhibition, a museum, a theater, etc., from a corresponding place and may use the virtual machine, and if the user terminal exits the corresponding place, the user terminal may delete the virtual machine.

By doing so, the user terminal may receive the virtual machine so as to be provided a service that is temporarily required only in a particular place and may use the service, and when the user terminal exits the particular place, the user terminal may delete the virtual machine.

A server of an exhibition center and the like may provide a particular service only to the user terminal that visits the exhibition center. The server of the exhibition center and the like may provide different services according to users, based on whether users purchased a ticket etc.

Figure 37A:
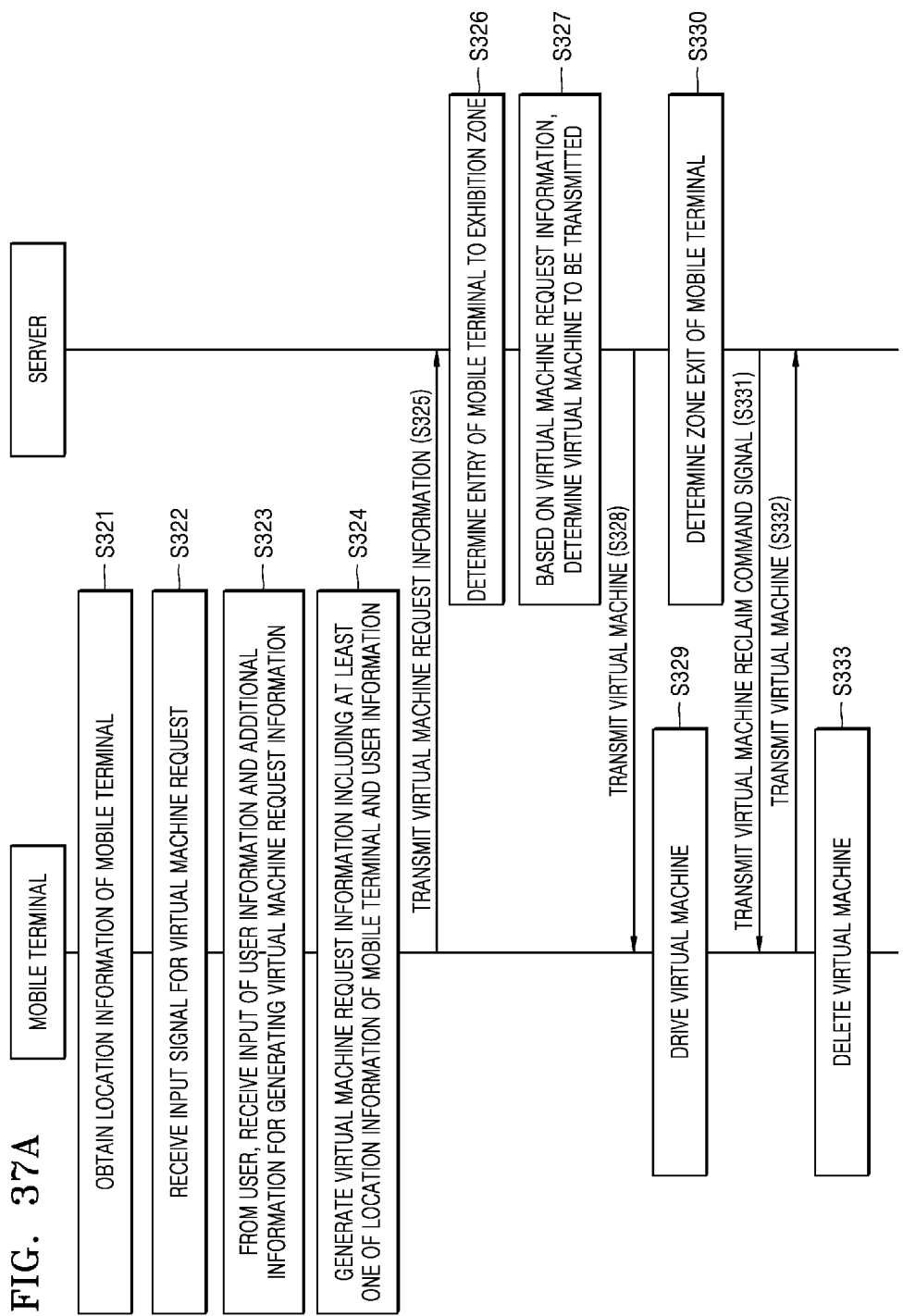
FIGS. 37A and 37B are flowcharts illustrating a controlling method performed by the mobile terminal and the server, according to an exemplary embodiment.
Figure 37B:
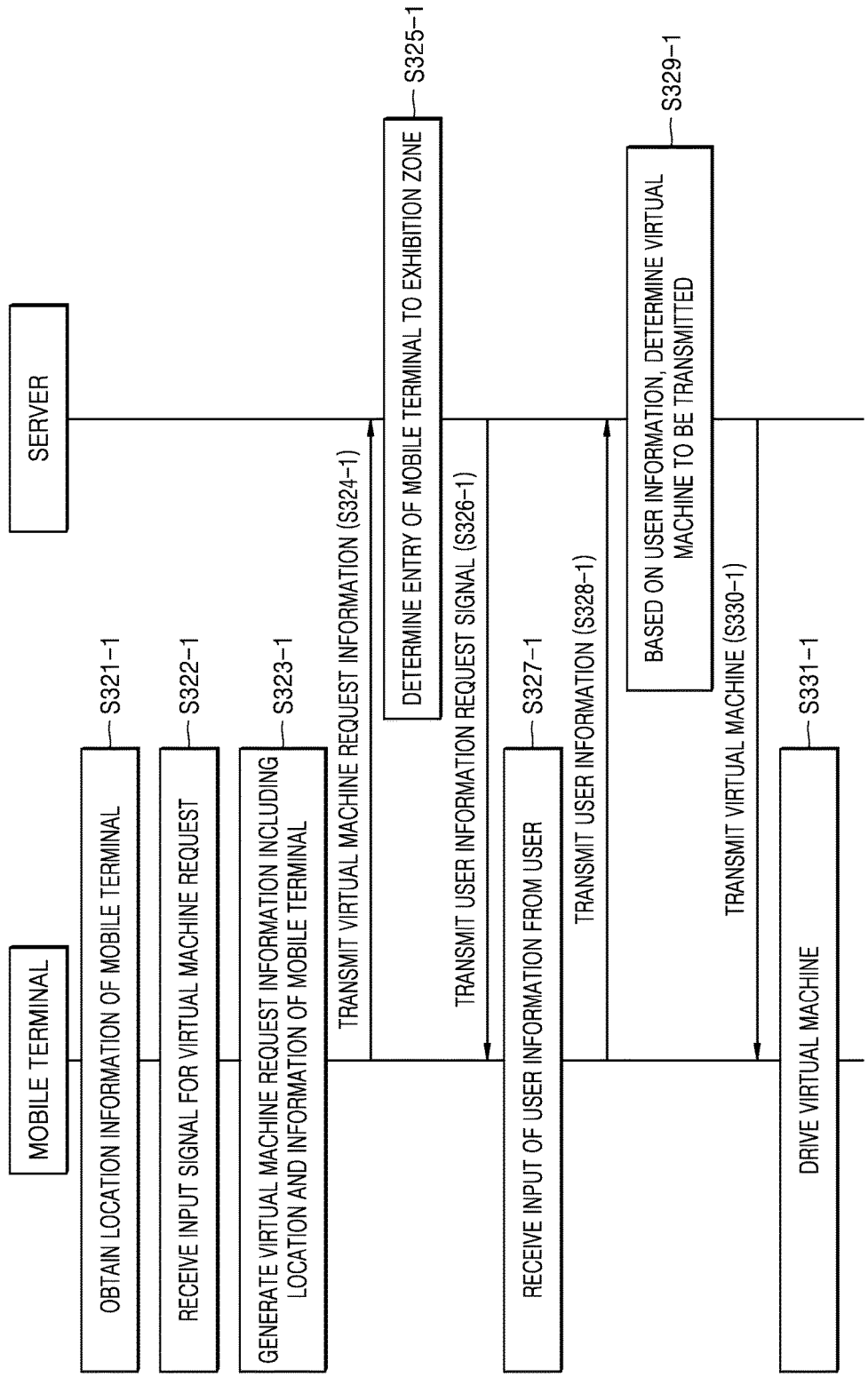
Figure 38:
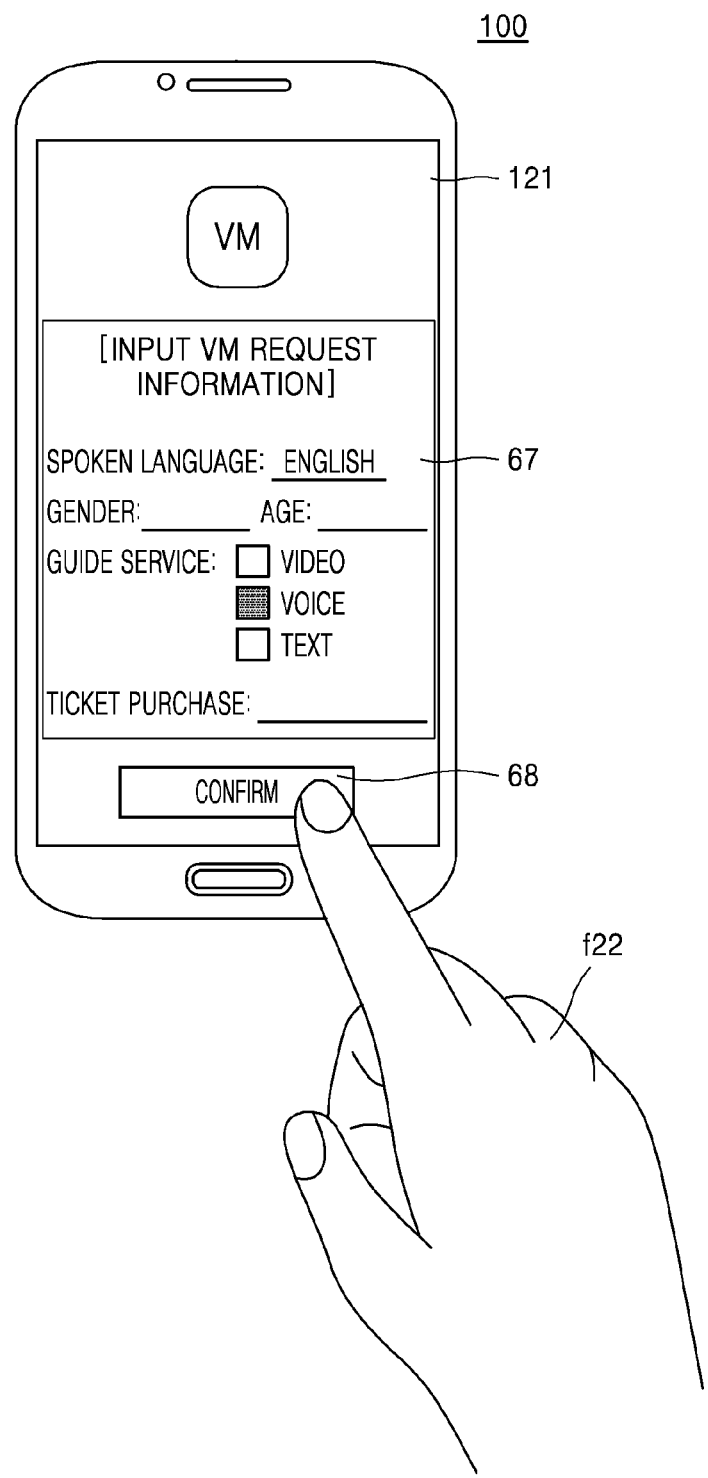
FIG. 38 illustrates a screen for obtaining user information for generating virtual machine request information, according to an exemplary embodiment.
Figure 40A:
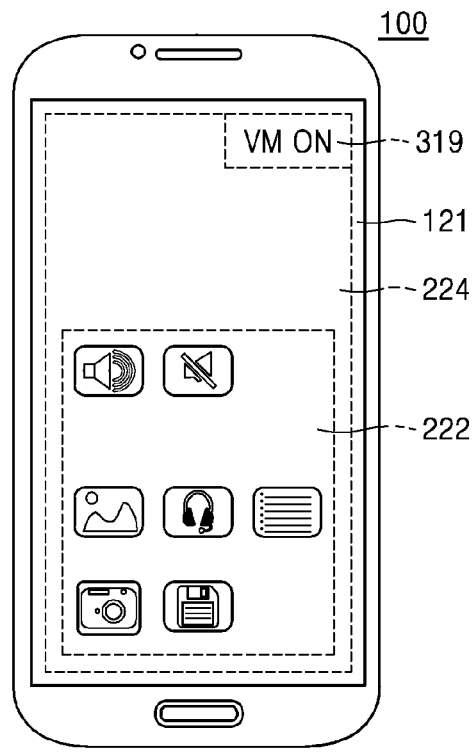
FIGS. 40A through 40C illustrate screens of the mobile terminal in which a virtual machine operates, according to an exemplary embodiment.
Figure 40B:
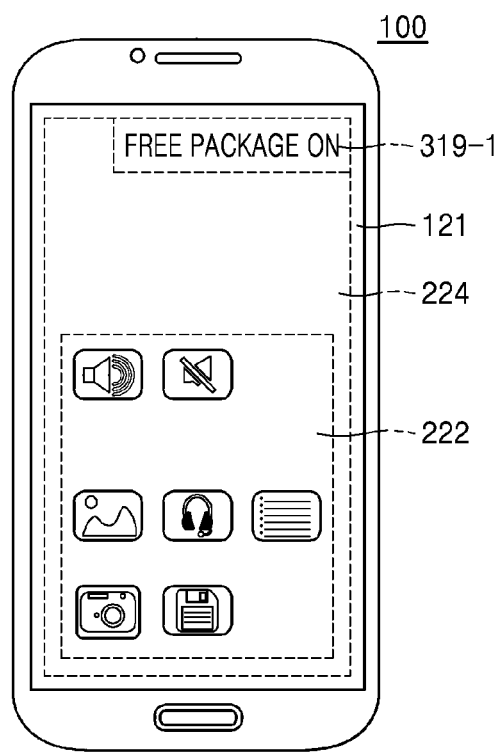
Figure 40C:
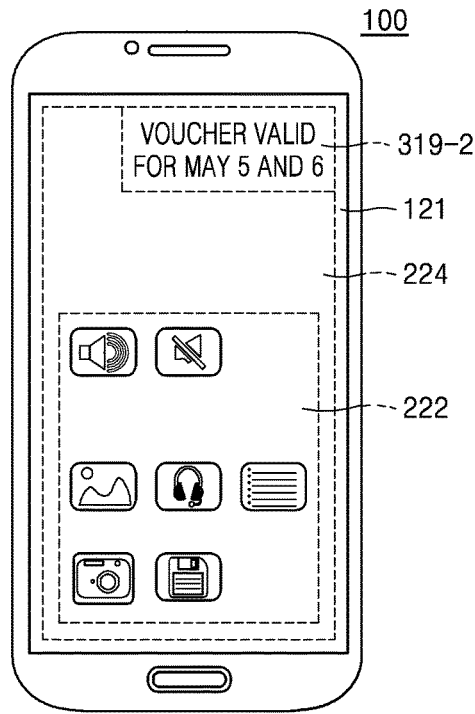

FIGS. 37A and 37B are flowcharts illustrating a controlling method performed by the mobile terminal 100 and the server 200, according to an exemplary embodiment. FIG. 38 illustrates a screen for obtaining user information for generating virtual machine request information, according to an exemplary embodiment. FIG. 39 illustrates a table showing examples of information included in the virtual machine request information, according to an exemplary embodiment. FIGS. 40A through 40C illustrate screens of the mobile terminal 100 in which a virtual machine operates, according to one or more exemplary embodiments.

As illustrated in FIG. 37A, in operation S321, the controller 130 of the mobile terminal 100 may obtain location information of the mobile terminal 100. A method of obtaining, by the mobile terminal 100, the location information is described above with reference to FIG. 2A.

In operation S322, the controller 130 of the mobile terminal 100 may receive a virtual machine request signal from a user.

For example, referring to FIG. 36A, when the controller 130 of the mobile terminal 100 of a user 35 determines, by using a location sensor, that the mobile terminal 100 enters a particular exhibition zone z20, the controller 130 may display a screen notifying about exhibition entry on the display unit 121.

The controller 130 may display, on the display unit 121, a notification screen 64 for recommending installation of a virtual machine for exhibition viewing. When the controller 130 receives a touch input of selecting, by using a finger f20 of the user 35, etc., a button 65 for confirming installation of the virtual machine, the controller 130 may determine that a virtual machine request signal has been received from the user 35.

Referring to FIG. 36B, the controller 130 may display, on the display unit 121, windows 64-1 and 65-1 for selecting a plurality of installable virtual machines.

For example, the controller 130 may display, on the display unit 121, a window 64-1 for receiving an input of selecting a free-viewing virtual machine that provides only a voice guide service, and a window 65-1 for receiving an input of selecting a paid-viewing virtual machine that provides all of voice, image, and text guide services.

Referring to FIG. 37A, the controller 130 of the mobile terminal 100 according to an exemplary embodiment may receive an input of user information and additional information for generating the virtual machine request information, from the user (S323).

For example, referring to FIG. 38, the controller 130 may receive, from the user, information about a language spoken by the user, a gender, an age, a type of a guide service, and whether the user purchased a ticket.

In operation S324 of FIG. 37A, the controller 130 of the mobile terminal 100 may generate the virtual machine request information including at least one of location information of the mobile terminal 100 and the user information. That is, the virtual machine request information may include at least one of the user information, the additional information, and the location information of the mobile terminal 100.

For example, referring to FIG. 38, when the controller 130 receives the virtual machine request information from the user and then receives a touch input of selecting a confirm button 68 by using a finger f22, and the like, the controller 130 may generate virtual machine request information including the input user information, the input additional information, and the like.

In operation S325 of FIG. 37A, the controller 130 of the mobile terminal 100 may transmit the virtual machine request information to the server 200. That is, the controller 130 may transmit the generated virtual machine request information to the server 200 that corresponds to a location of the mobile terminal 100.

As illustrated in FIG. 39, virtual machine request information 810 according to an exemplary embodiment may include user information 811, terminal location information 812, and additional information 813.

The user information 811 may include age information, gender information, spoken language information, nationality, residence information, and points of interest about a user, terminal performance information, and the like.

The terminal location information 812 may include a building, a floor level, and exhibition room information of a current location, information about entering a distance range from a particular work of art, and the like.

The additional information 813 may include authority information (e.g., information about whether the user purchased the ticket (paid viewing or free viewing), viewing authority with respect to a particular exhibition room, and authority during a particular time period) that the user pre-obtained, information about viewing-allowed sections depending on ticket types, admission time information, expected exit time information, desired service information about an image, a voice, a text, and the like.

In operation S326 of FIG. 37A, the controller 901 of the server 200 may determine zone entry of the mobile terminal 100.

The controller 901 of the server according to an exemplary embodiment may determine whether the mobile terminal 100 has entered an exhibition zone. For example, based on the location information of the mobile terminal 100 included in the virtual machine request information, the controller 901 may determine that the mobile terminal 100 has entered a predefined exhibition zone.

In operation S327, the controller 901 of the server 200 may determine a transmission target virtual machine, based on the virtual machine request information.

For example, based on the information about whether the user purchased the ticket, a type of the purchased ticket, an admission time of the user, the spoken language information, and the like, the controller 901 of the server 200 may determine a virtual machine that provides a service to be provided to the user.

In operation S328, the controller 901 of the server 200 may transmit the determined virtual machine to the mobile terminal 100.

In operation S329, the controller 130 of the mobile terminal 100 may drive the virtual machine.

Referring to FIG. 40A, the mobile terminal 100 of the user 35 that entered the exhibition zone z20 may drive the virtual machine. The controller 130 may display an execution screen 224 of the virtual machine on the display unit 121.

The controller 130 may display an icon 319 indicating that the virtual machine is operating on the display unit 121. For example, the icon 319 may be marked with 'VM ON,' but is not limited thereto.

Referring to FIG. 40B, as a mark 319-1 for indicating that the virtual machine is operating, the controller 130 may display whether it is paid or free (e.g., 'free package').

Referring to FIG. 40C, as a mark 319-2 for indicating that the virtual machine is operating, the controller 130 may display a time period and date (e.g., 'voucher valid for May 5 and 6') in which the virtual machine is usable.

In a case of the virtual machine for exhibition viewing, the controller 130 may include a predefined application that is usable in an exhibition hall. For example, the controller 130 may display, on the display unit 121, icons 222 that correspond to an application related to an image or voice guide service, an application capable of obtaining detail information about articles on exhibition, and the like.

As illustrated in FIG. 37A, in operation S330, the controller 901 of the server 200 may determine a zone exit of the mobile terminal 100. In operation S331, when the controller 901 determines that the mobile terminal 100 has exited the predefined exhibition zone, the controller 901 may transmit a virtual machine reclaim command signal to the mobile terminal 100.

In operation S332, the controller 130 of the mobile terminal 100 may transmit the virtual machine to the server 200. That is, the virtual machine reclaim command signal may include a command signal for allowing the virtual machine to be automatically transmitted to the server 200.

In operation S333, the controller 130 of the mobile terminal 100 may delete the virtual machine. That is, the virtual machine reclaim command signal may include a command signal for allowing the virtual machine to be automatically deleted.

FIG. 37B illustrates an example in which, when a user of the mobile terminal 100 enters an exhibition zone, the mobile terminal 100 receives a virtual machine for exhibition viewing from the server 200 and drives the virtual machine.

In operation S321-1, the controller 130 of the mobile terminal 100 may obtain location information of the mobile terminal 100. A method of obtaining, by the mobile terminal 100, the location information is described above with reference to FIG. 2A.

In operation S322-1, the controller 130 of the mobile terminal 100 may receive a user input signal for a virtual machine request. The controller 130 may generate virtual machine request information including the location information of the mobile terminal 100. In operation S324-1, the controller 130 may transmit the generated virtual machine request information to the server 200.

In operation S325-1, the controller 901 of the server 200 may determine whether the mobile terminal 100 has entered the exhibition zone. That is, based on the virtual machine request information, the controller 901 may determine whether the mobile terminal 100 has entered a predefined exhibition zone.

In operation S326-1, the controller 901 of the server 200 may transmit a user information request signal to the mobile terminal 100. That is, in order to select and transmit an appropriate virtual machine to the mobile terminal 100 that requested a virtual machine, the server 200 may request the mobile terminal 100 for user information.

In operation S327-1, the controller 130 of the mobile terminal 100 may receive an input of the user information from the user. In operation S328-1, the controller 130 may transmit the user information received in the operation S327-1 to the server 200.

In operation S329-1, the controller 901 of the server 200 may determine a transmission target virtual machine, based on the user information received from the mobile terminal 100. In operation S330-1, the controller 901 of the server 200 may transmit the virtual machine determined in the operation S329-1 to the mobile terminal 100.

In operation S331-1, the controller 130 of the mobile terminal 100 may drive the received virtual machine.

The aforementioned exemplary embodiments should be considered in a descriptive sense only and not for purposes of limitation, and are not limited to an order of the operations in the flowcharts of FIGS. 37A and 37B. According to one or more exemplary embodiments, some operations may be skipped or added, and an order of some operations may be changed.

Figure 41A:
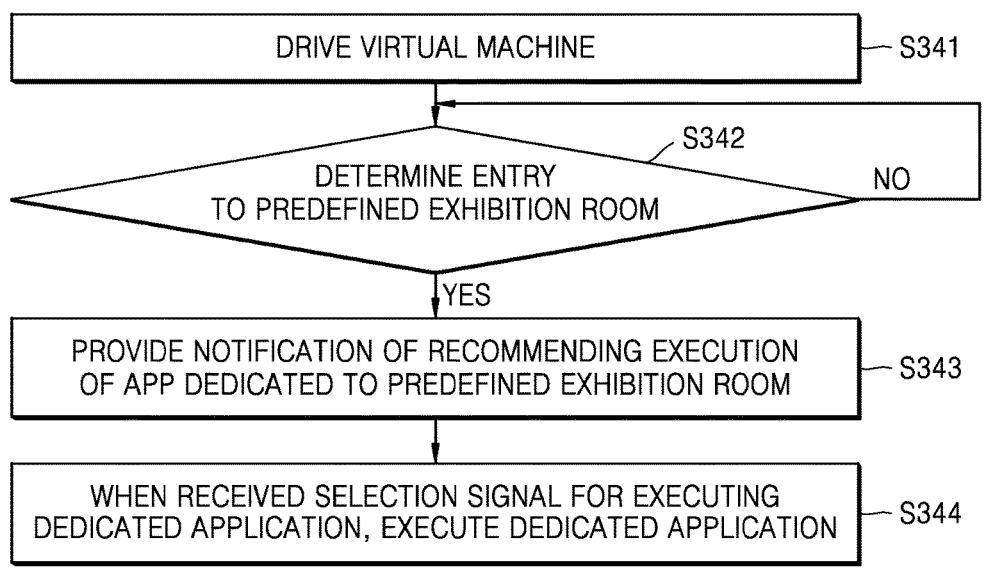
FIG. 41A is a flowchart illustrating an example of recommending execution of an application according to entry to a particular place, according to an exemplary embodiment.
Figure 41B:
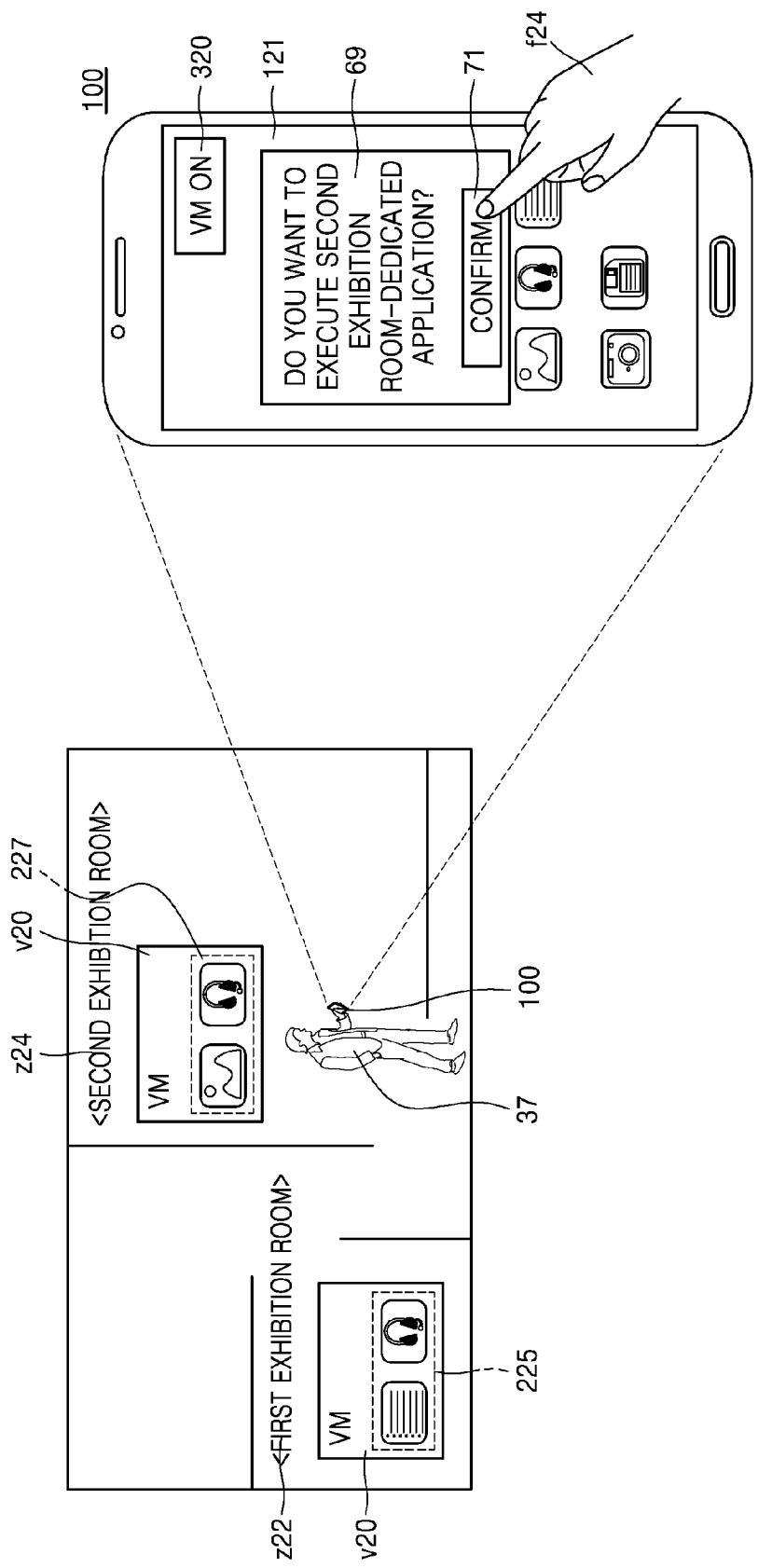
FIG. 41B illustrates the example of FIG. 41A of recommending execution of an application according to entry to a particular place, according to an exemplary embodiment.

FIG. 41A is a flowchart illustrating an example of recommending execution of an application according to entry to a particular place, according to an exemplary embodiment. FIG. 41B illustrates an example of recommending execution of an application according to entry to a particular place, according to an exemplary embodiment.

Referring to FIG. 41B, a virtual machine for exhibition viewing v20 may include an application that is executable only in a particular exhibition room of an exhibition hall. For example, the virtual machine for exhibition viewing v20 may include a first exhibition room-dedicated application 225 that is executable only in a first exhibition room z22 and provides a text and voice guide service.

The virtual machine for exhibition viewing v20 may include a second exhibition room-dedicated application 227 that is executable only in a second exhibition room z24 and provides a voice and image guide service.

As illustrated in FIG. 41A, in operation S341, the controller 130 of the mobile terminal 100 may drive a virtual machine for exhibition viewing. In operation S342, the controller 130 of the mobile terminal 100 may determine entry to a predefined exhibition room. That is, based on location information of the mobile terminal 100 that is obtained by using a location sensor and the like, the controller 130 may determine entry to a particular exhibition room in an exhibition hall.

In operation S343, when the controller 130 of the mobile terminal 100 determines that the mobile terminal 100 has entered the predefined exhibition room, the controller 130 of the mobile terminal 100 may provide notification of recommending execution of an application dedicated to the predefined exhibition room.

As illustrated in FIG. 41B, the controller 130 may display, on the display unit 121, an icon 320 indicating that the virtual machine for exhibition viewing is operating.

While the controller 130 drives the virtual machine for exhibition viewing, if the controller 130 determines that the mobile terminal 100 of a user 37 has entered the second exhibition room z24, the controller 130 may display, on the display unit 121, a notification screen 69 for recommending execution of the second exhibition room-dedicated application 227.

As illustrated in FIG. 41A, in operation S344, when the controller 130 of the mobile terminal 100 receives a selection signal for executing the dedicated application, the controller 130 of the mobile terminal 100 may execute the dedicated application.

For example, as illustrated in FIG. 41B, when the controller 130 receives a touch input of selecting a confirm button 71 by using a finger f24 of the user 37, and the like, the controller 130 may execute the second exhibition room-dedicated application 227.

The aforementioned exemplary embodiments should be considered in a descriptive sense only and not for purposes of limitation, and are not limited to an order of the operations in the flowchart of FIG. 41A. According to one or more exemplary embodiments, some operations may be skipped or added, and an order of some operations may be changed.

Figure 42A:
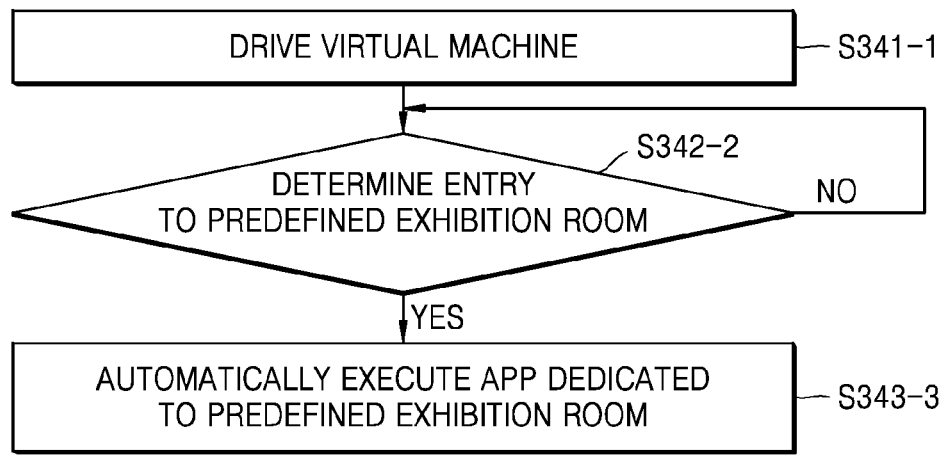
FIG. 42A is a flowchart illustrating an example of automatically executing a dedicated application according to entry to a particular place, according to an exemplary embodiment.
Figure 42B:
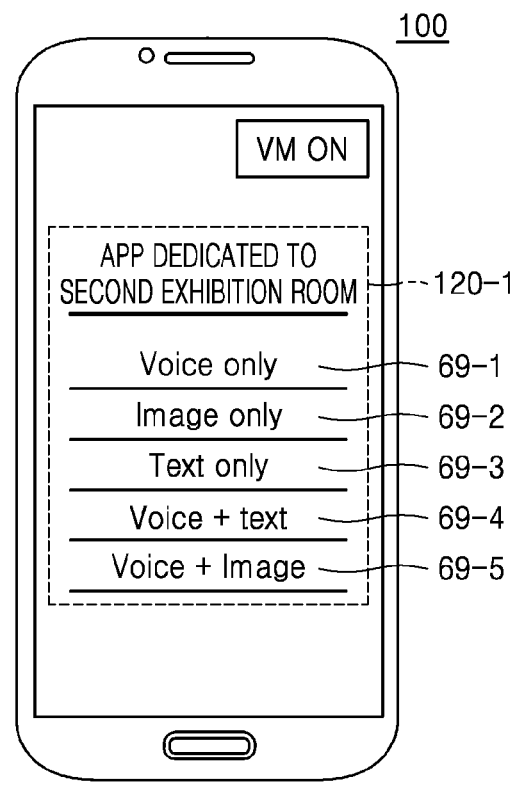
FIG. 42B illustrates the example of FIG. 42A of automatically executing a dedicated application according to entry to a particular place, according to an exemplary embodiment.

FIG. 42A is a flowchart illustrating an example of automatically executing a dedicated application according to entry to a particular place, according to an exemplary embodiment. FIG. 42B illustrates the example of automatically executing a dedicated application according to entry to a particular place, according to an exemplary embodiment.

Referring to FIG. 42A, in operation S341-1, the controller 130 of the mobile terminal 100 may drive a virtual machine for exhibition viewing. In operation S342-2, the controller 130 of the mobile terminal 100 may determine entry to a predefined exhibition room. That is, based on location information of the mobile terminal 100 that is obtained by using a location sensor and the like, the controller 130 may determine entry to a particular exhibition room in an exhibition hall.

In operation S343-3, when the controller 130 of the mobile terminal 100 determines that the mobile terminal 100 has entered the predefined exhibition room, the controller 130 of the mobile terminal 100 may automatically execute an application dedicated to the predefined exhibition room.

Referring to FIG. 42B, when the controller 130 of the mobile terminal 100 determines that the mobile terminal 100 has entered the predefined exhibition room, the controller 130 of the mobile terminal 100 may display, on the display unit 121, a screen 120-1 for receiving an input of selecting a service type so as to execute the application dedicated to the predefined exhibition room.

When the controller 130 of the mobile terminal 100 executes a particular exhibition room-dedicated application, based on a user input signal, the controller 130 of the mobile terminal 100 may display the screen 120-1 for receiving an input of selecting a service type as shown in FIG. 42B.

For example, the controller 130 may display, on the display unit 121, a voice only service 69-1 providing only a voice guide, an image only service 69-2 providing only an image guide, a text only service 69-3 providing only a text guide, a voice+text service 69-4 providing a voice and text guide, and a voice+image service 69-5 providing a voice and image guide.

Figure 43A:
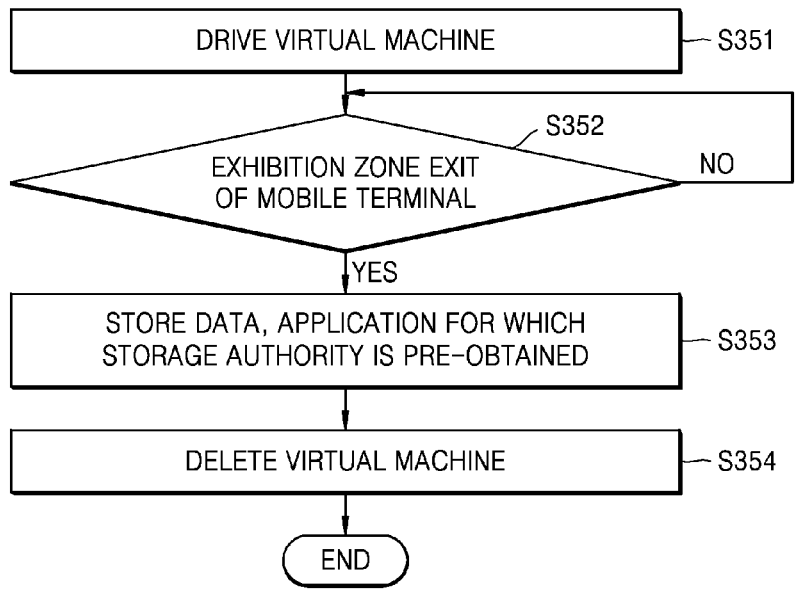
FIG. 43A is a flowchart illustrating a controlling method performed by the mobile terminal that stores data, according to an exemplary embodiment.

FIG. 43A is a flowchart illustrating a controlling method performed by the mobile terminal 100 that stores data, according to an exemplary embodiment.

In operation S351, the controller 130 of the mobile terminal 100 may drive a virtual machine. In operation S352, the controller 130 of the mobile terminal 100 may determine whether the mobile terminal 100 has exited a predefined exhibition hall zone. That is, based on location information of the mobile terminal 100 that is obtained by using a location sensor and the like, the controller 130 of the mobile terminal 100 may determine whether the mobile terminal 100 has exited the predefined exhibition hall zone.

In operation S353, the controller 130 of the mobile terminal 100 may store, in the memory 170, data and an application for which storage authority is pre-obtained by the mobile terminal 100. That is, when the controller 130 determines that the mobile terminal 100 has exited the predefined exhibition hall, the controller 130 may store predefined data and application included in the operating virtual machine, in the memory 170 of the mobile terminal 100.

For example, based on exhibition ticket purchase information, pamphlet purchase information, photo purchase information, music purchase information, etc., included in virtual machine request information, the server 200 may transmit the virtual machine including information about data or application for which storage authority is granted to the mobile terminal 100.

In operation S354, the controller 130 of the mobile terminal 100 may delete the virtual machine. That is, the controller 130 of the mobile terminal 100 may delete the virtual machine, except for the data or application for which storage authority was obtained.

That is, the virtual machine for exhibition viewing may include a command signal for allowing the virtual machine to be automatically deleted, when the mobile terminal 100 exits the predefined exhibition hall zone.

The aforementioned exemplary embodiments should be considered in a descriptive sense only and not for purposes of limitation, and are not limited to an order of the operations in the flowchart of FIG. 43A. According to one or more exemplary embodiments, some operations may be skipped or added, and an order of some operations may be changed.

Figure 43B:
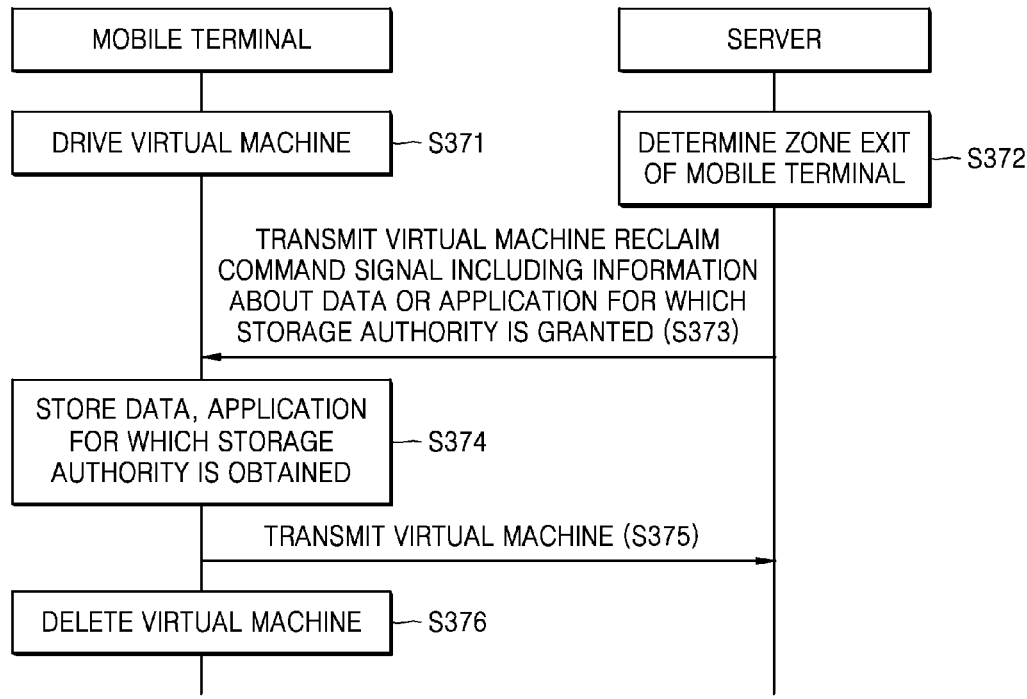
FIG. 43B is a flowchart illustrating a controlling method performed by the server and the mobile terminal that stores data, according to an exemplary embodiment.

FIG. 43B is a flowchart illustrating a controlling method performed by the server 200 and the mobile terminal 100 that stores data, according to an exemplary embodiment.

In operation S371, the controller 130 of the mobile terminal 100 may drive a virtual machine. For example, the mobile terminal 100 having entered an exhibition hall zone may drive a virtual machine for exhibition viewing.

In operation S372, the controller 901 of the server 200 may determine a zone exit of the mobile terminal 100. For example, based on location information of the mobile terminal 100 that is periodically received from the mobile terminal 100, the server 200 may determine whether the mobile terminal 100 has exited a predefined exhibition hall zone.

In operation S373, the controller 901 of the server 200 may transmit, to the mobile terminal 100, a virtual machine reclaim command signal including information about data or application for which storage authority is granted. That is, when the controller 901 of the server 200 determines that the mobile terminal 100 has exited the predefined exhibition hall, the controller 901 of the server 200 may transmit the virtual machine reclaim command signal to the mobile terminal 100. The virtual machine reclaim command signal may include information about the data or application for which storage authority is granted to the mobile terminal 100.

In operation S374, the controller 130 of the mobile terminal 100 may store at least one of the data and the application for which storage authority is obtained by the server 200.

For example, when a user of the mobile terminal 100 purchased a pamphlet, a photo, music, etc, authority to store data or an application on the pamphlet, the photo, the music, etc., in the memory 170 may be granted to the mobile terminal 100.

In operation S375, the controller 130 of the mobile terminal 100 may transmit the virtual machine. That is, the virtual machine reclaim command signal may include a command signal for allowing the mobile terminal 100 to automatically transmit the virtual machine to the server 200.

In operation S376, the controller 130 of the mobile terminal 100 may delete the virtual machine. That is, the virtual machine reclaim command signal may include a command signal for allowing the mobile terminal 100 to automatically delete the virtual machine.

The aforementioned exemplary embodiments should be considered in a descriptive sense only and not for purposes of limitation, and are not limited to an order of the operations in the flowchart of FIG. 43B. According to one or more exemplary embodiments, some operations may be skipped or added, and an order of some operations may be changed.

Figure 44:
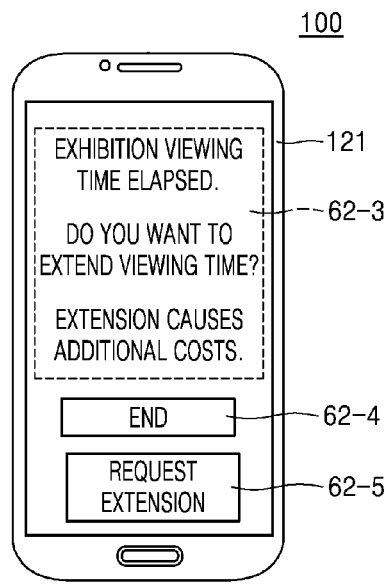
FIG. 44 illustrates an example of a screen of the mobile terminal in which an operation of a virtual machine is stopped due to an elapse of a time period, according to an exemplary embodiment.

FIG. 44 illustrates an example of a screen of the mobile terminal 100 in which an operation of a virtual machine is stopped due to an elapse of a time period, according to an exemplary embodiment.

Referring to FIG. 44, the controller 130 may display, on the display unit 121, a screen 62-3 notifying that an operation of a virtual machine for exhibition viewing is stopped due to an elapse of a predefine time period.

For example, the virtual machine for exhibition viewing may be set to be automatically deleted when a predefined time period elapses after a driving start time of the virtual machine for exhibition viewing. The virtual machine for exhibition viewing may be set to be automatically deleted when a particular closing time of an exhibition hall comes.

The controller 130 may display, on the display unit 121, a button 62-5 for requesting extension of use of the virtual machine after the elapse of the predefined time period.

When the controller 130 receives an input of selecting the button 62-5 for requesting extension of use of the virtual machine, the controller 130 may request extension of use of the virtual machine by transmitting location information of the mobile terminal 100 to the server 200. The server 200 may check the location information of the mobile terminal 100 and may determine whether to reclaim the virtual machine. That is, if the mobile terminal 100 is located within the exhibition zone, the server 200 may permit extension of use of the virtual machine for exhibition viewing.

When the server 200 receives the extension request, the server 200 may transmit a payment request for charging additional costs to the user.

The aforementioned exemplary embodiments should be considered in a descriptive sense only and not for purposes of limitation.

Figure 45:
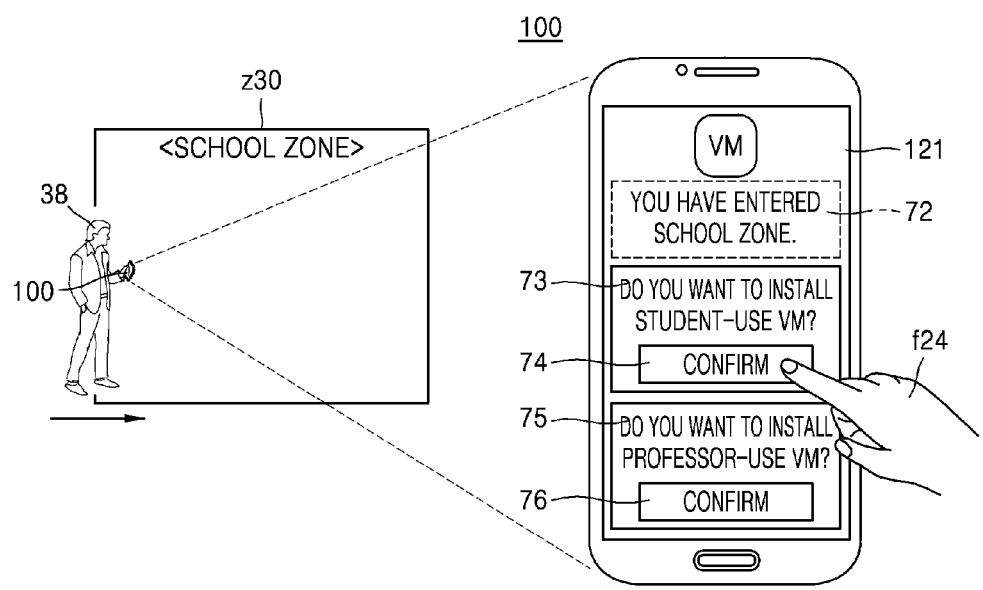
FIG. 45 illustrates an example of receiving an input signal for a virtual machine request, according to an exemplary embodiment.
Figure 46:
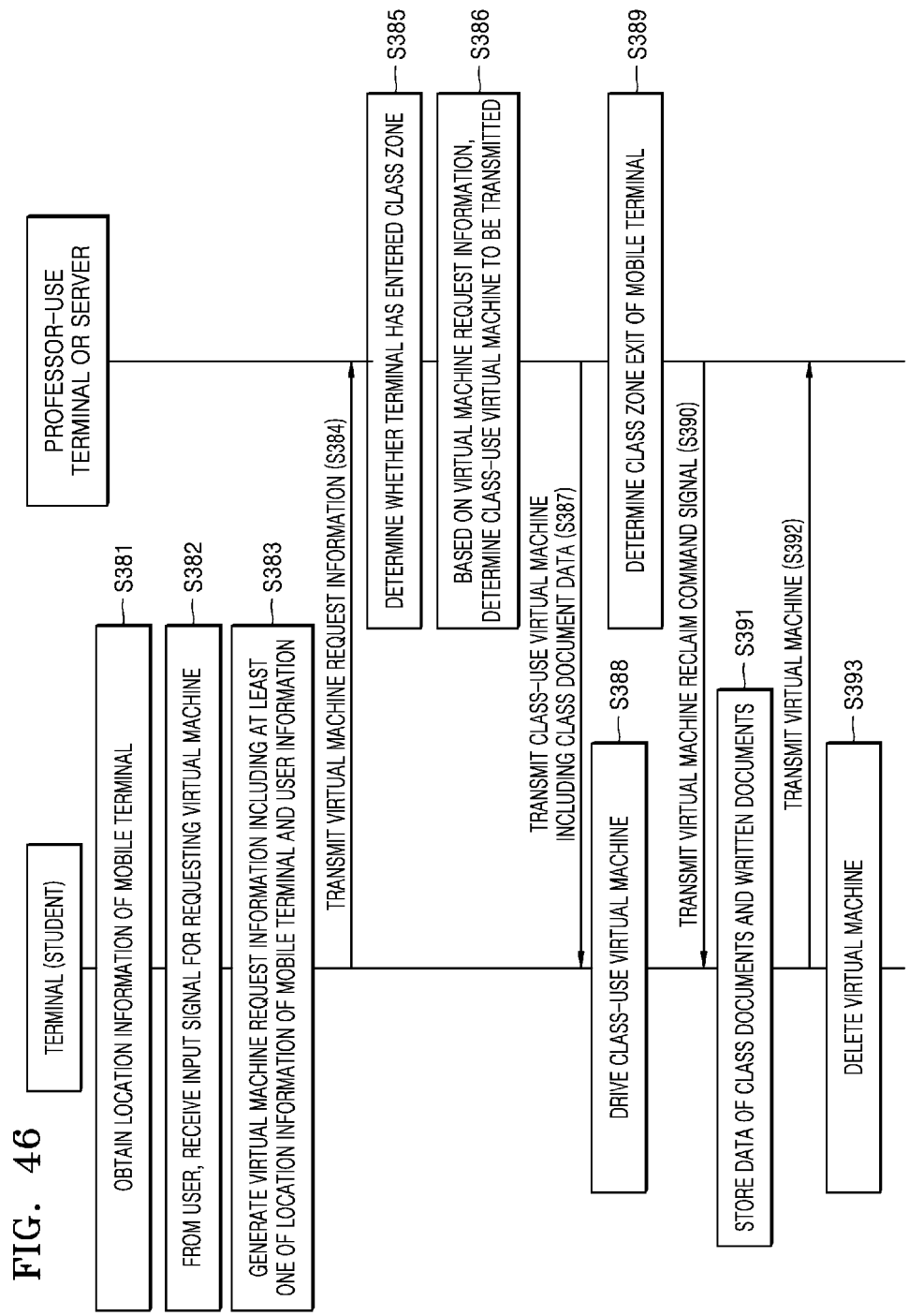
FIG. 46 is a flowchart illustrating a controlling method performed by the mobile terminal and the server, according to an exemplary embodiment.

FIG. 45 illustrates an example of receiving an input signal for a virtual machine request, according to an exemplary embodiment. FIG. 46 is a flowchart illustrating a controlling method performed by the mobile terminal 100 and the server 200, according to an exemplary embodiment. FIG. 47 illustrates a table showing examples of information included in virtual machine request information according to an exemplary embodiment. FIG. 48 illustrates a screen of the mobile terminal 100 in which a virtual machine operates, according to an exemplary embodiment.

As illustrated in FIG. 45, when a user 38 of the mobile terminal 100 enters a school zone z30, the controller 130 may display a screen 72 notifying about the entry to the school zone z30 on the display unit 121. The controller 130 may display, on the display unit 121, screens 73 and 75 for recommending virtual machines including applications that are required in the school zone z30.

For example, when a student or a professor operates a virtual machine of the mobile terminal 100 that includes class document data required in a school, the student or the professor may conveniently use data required in the school.

Referring to FIG. 46, the mobile terminal 100 may be a student's terminal, and operations performed by the server 200 may be performed by a professor-use terminal.

In operation S381, the controller 130 of the mobile terminal 100 may obtain location information of the mobile terminal 100. A method of obtaining, by the mobile terminal 100, the location information is described above with reference to FIG. 2A.

In operation S382, the controller 130 of the mobile terminal 100 may receive an input signal for requesting a virtual machine from a user.

For example, referring to FIG. 45, the controller 130 may display, on the display unit 121, the screen 73 for recommending installation of a student-use virtual machine, a button 74 for installing the student-use virtual machine, the screen 75 for recommending installation of a professor-use virtual machine, and a button 76 for installing the professor-use virtual machine. When the controller 130 receives a touch input of selecting, by using a finger f24 of the user, etc., the button 74 for installing the student-use virtual machine, the controller 130 may determine that the controller 130 received the input signal for requesting the virtual machine.

In operation S383, the controller 130 of the mobile terminal 100 may generate virtual machine request information including at least one of location information of the mobile terminal 100 and user information. The controller 130 may receive the user information from the user or may retrieve the user information pre-stored in the memory 170.

Referring to FIG. 47, virtual machine request information 820 according to an exemplary embodiment may include user information 821, terminal location information 822, and additional information 823.

The user information 821, if the user is a student, may include student identification (ID) information, a student ID card number, a student ID number, a user ID, a user name, contact information, grade-level information, gender information, etc.

The user information 821, if the user is a professor, may include professor ID information, an employee number, a user ID, a user name, contact information, teaching class information, teaching subject information, career information, position information, etc.

The terminal location information 822 may include building information, class room information, professor's office information, school examination site information, restaurant information, playground information, etc.

The additional information 823 may include registered subject information, progress information for each subject, registered-subjects summary information, selected professor information, etc. The additional information 823 may include examination subject information, examination level information, etc. The additional information 823 may include attendance and tardiness confirmation information, etc.

As illustrated in FIG. 46, the controller 130 of the mobile terminal 100 according to an exemplary embodiment may transmit the virtual machine request information to the server 200 (S384). That is, the controller 130 may transmit the virtual machine request information generated in the operation S383 to the server 200 via the communication unit 150.

The controller 901 of the server 200 according to an exemplary embodiment may determine whether the mobile terminal 100 has entered a class zone (S385). For example, based on the location information of the mobile terminal 100 included in the virtual machine request information, the controller 901 of the server 200 may determine whether the mobile terminal 100 has entered a predefined class zone.

The controller 901 of the server 200 according to an exemplary embodiment may determine a class-use virtual machine to be transmitted, based on the virtual machine request information (S386). For example, the controller 901 may determine a class-use virtual machine to be transmitted to the mobile terminal 100 of a student, based on the student ID number information, the registered subject information, and the like of the user.

The controller 901 of the server 200 according to an exemplary embodiment may transmit the class-use virtual machine including class document data to the mobile terminal 100 (S387).

The controller 130 of the mobile terminal 100 according to an exemplary embodiment may drive the class-use virtual machine (S388).

For example, the student who takes the class in the school may drive the class-use virtual machine in the mobile terminal 100, and thus may use class documents, written document data, etc., provided by the school in his/her mobile terminal 100.

Referring to FIG. 48A, the controller 130 of the mobile terminal 100 may display, on the display unit 121, a screen 228 whereon the class-use virtual machine is operating.

The controller 130 may display, on the display unit 121, an icon 323 indicating that the class-use virtual machine is operating. For example, the icon 323 may be marked as 'VM ON,' but it is not limited thereto.

Figure 48B:
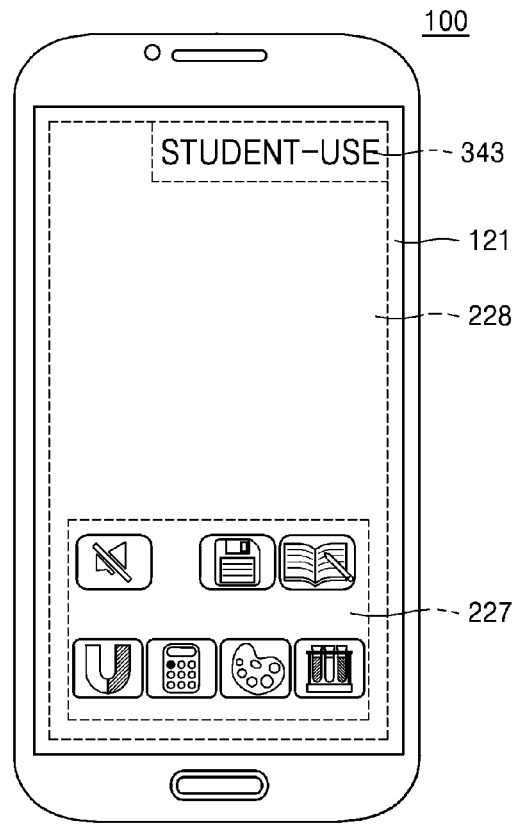

Referring to FIG. 48B, the controller 130 may display a user category (e.g., 'student-use') as a mark 343 indicating that the virtual machine is operating.

Figure 48C:
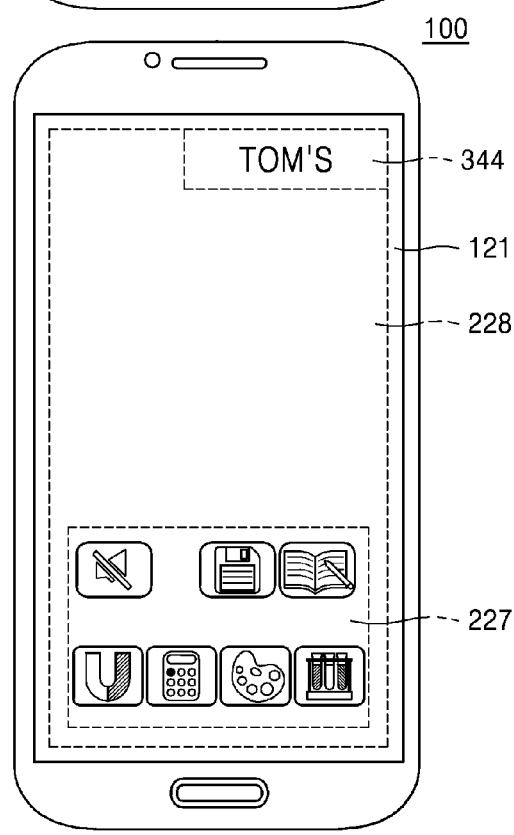

Referring to FIG. 48C, the controller 130 may display a user-set title (e.g., 'TOM'S') as a mark 344 indicating that the virtual machine is operating.

The controller 130 may display, on the display unit 121, icons 227 that correspond to preset applications that are included in the class-use virtual machine and are usable in the school.

Referring to FIG. 46, in operation S389, the controller 901 of the server 200 may determine a class zone exit of the mobile terminal 100. In operation S390, when the controller 901 of the server 200 determines that the mobile terminal 100 has exited the class zone, the controller 901 of the server 200 may transmit a virtual machine reclaim command signal to the mobile terminal 100.

In operation S391, the controller 130 of the mobile terminal 100 may store data of class documents and written documents. That is, the virtual machine reclaim command signal may include information about authority of the mobile terminal 100 to store the data of class documents, written documents, and the like.

In operation S392, the controller 130 of the mobile terminal 100 may transmit the virtual machine to the server 200. That is, the virtual machine reclaim command signal may include a command signal for allowing the virtual machine to be automatically transmitted to the server 200.

In operation S393, the controller 130 of the mobile terminal 100 may delete the virtual machine. That is, the virtual machine reclaim command signal may include a command signal for allowing the virtual machine to be automatically deleted from the mobile terminal 100.

The aforementioned exemplary embodiments should be considered in a descriptive sense only and not for purposes of limitation, and are not limited to an order of the operations in the flowchart of FIG. 46. According to one or more exemplary embodiments, some operations may be skipped or added, and an order of some operations may be changed.

Figure 49A:
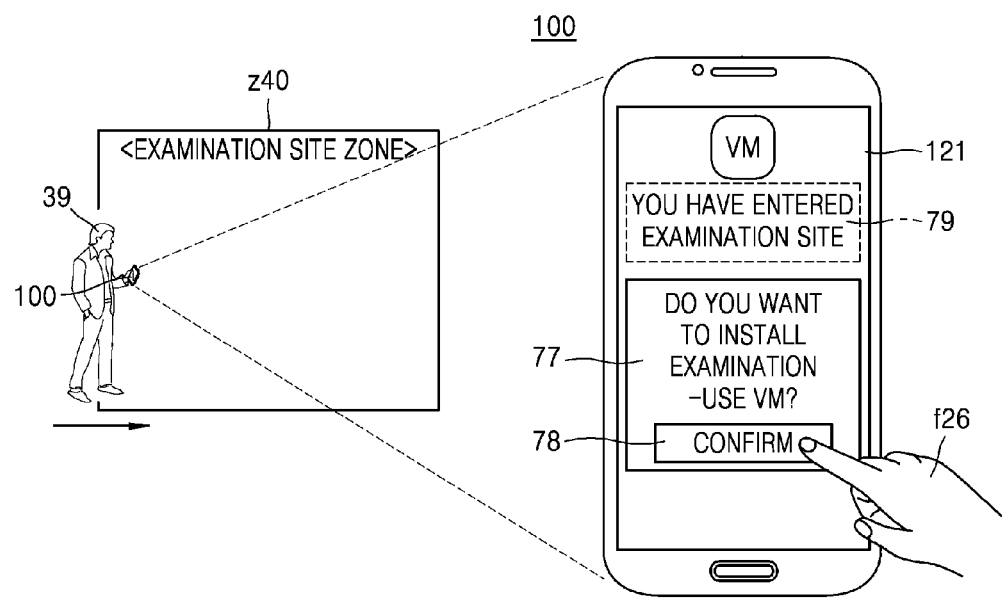
FIGS. 49A and 49B illustrate an example of receiving an input signal for a virtual machine request, according to an exemplary embodiment.
Figure 49B:
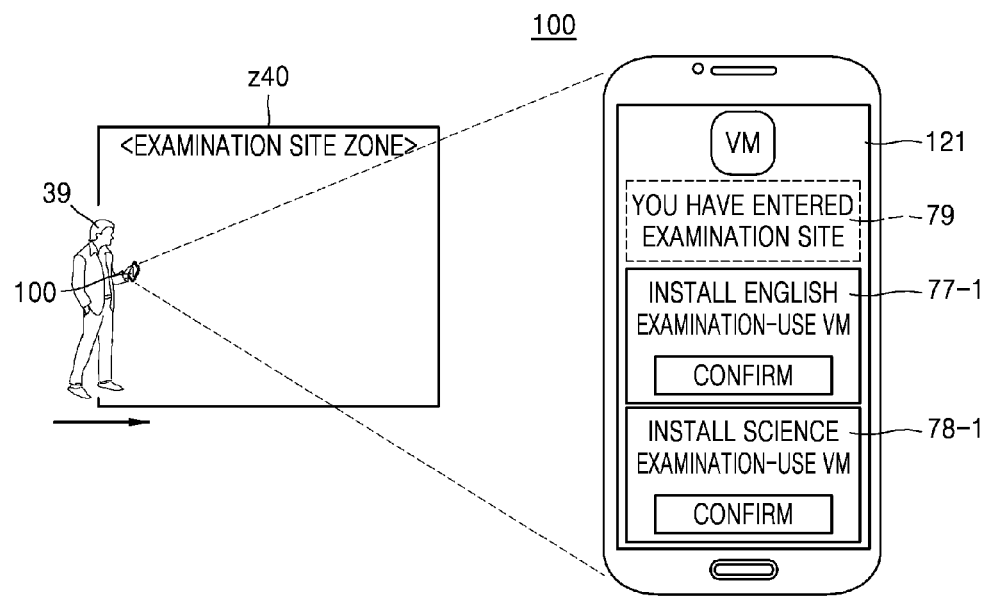
Figure 50:
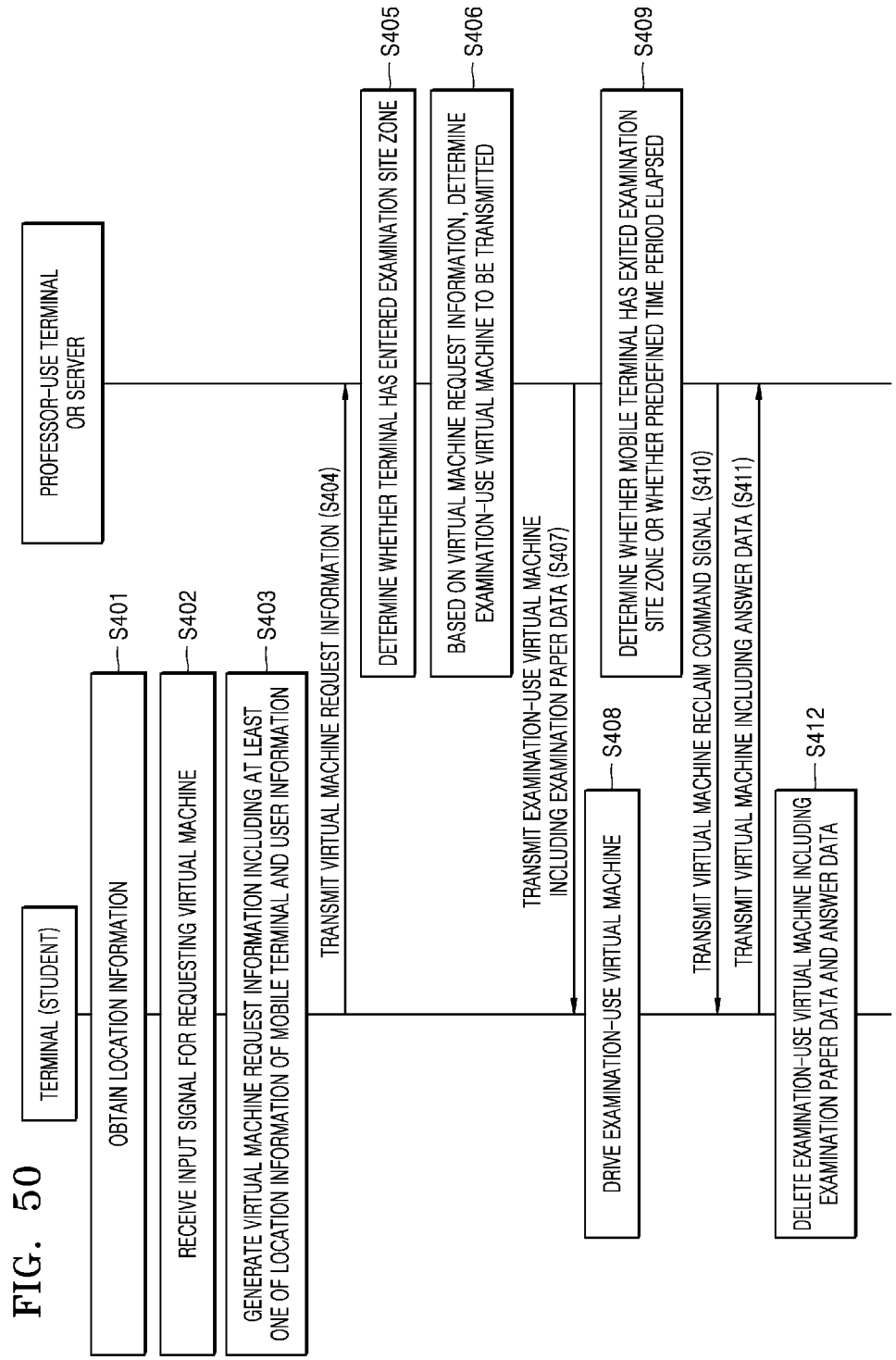
FIG. 50 is a flowchart illustrating a controlling method performed by the mobile terminal and the server, according to an exemplary embodiment.

FIGS. 49A and 49B illustrate an example of receiving an input signal for a virtual machine request, according to an exemplary embodiment. FIG. 50 is a flowchart illustrating a controlling method performed by the mobile terminal 100 and the server 200, according to an exemplary embodiment. Referring to FIG. 50, the mobile terminal 100 may be a student's terminal, and operations performed by the server 200 may be performed by an examination site-use terminal.

As illustrated in FIG. 49A, when a user 39 of the mobile terminal 100 enters an examination site zone z40, the controller 130 may display a screen 79 notifying about the entry to the examination site zone z40 on the display unit 121. The controller 130 may display, on the display unit 121, a screen 77 for recommending a virtual machine including examination data or an application that is executable in the examination site zone z40.

For example, when the student 39 who uses the mobile terminal 100 enters the examination site zone z40, an examination-use virtual machine may be driven in the mobile terminal 100 of the student 39, and when the student 39 who uses the mobile terminal 100 exits the examination site zone z40, the examination-use virtual machine may be automatically deleted. By doing so, students may conveniently take an examination by using his/her mobile terminal 100.

Referring to FIG. 49B, the controller 130 may display, on the display unit 121, windows 77-1 and 78-1 for selecting a plurality of installable virtual machines.

For example, the controller 130 may display, on the display unit 121, the window 77-1 for selecting a virtual machine for an examination of an English subject, and the window 78-1 for selecting a virtual machine for an examination of a science subject.

As illustrated in FIG. 50, the controller 130 of the mobile terminal 100 according to an exemplary embodiment may obtain location information of the mobile terminal 100 (S401). A method of obtaining, by the mobile terminal 100, the location information is described above with reference to FIG. 2A.

The controller 130 of the mobile terminal 100 according to an exemplary embodiment may receive an input signal for requesting a virtual machine from a user (S402).

For example, referring to FIG. 49A, the controller 130 may display, on the display unit 121, the screen 77 for recommending installation of the examination-use virtual machine. When the controller 130 receives a touch input of selecting, by using a finger f26 of the user, etc., a button 78 for installing the examination-use virtual machine, the controller 130 may determine that the controller 130 received the input signal for requesting the virtual machine.

Referring to FIG. 50, the controller 130 of the mobile terminal 100 according to an exemplary embodiment may generate virtual machine request information including at least one of location information of the mobile terminal 100 and user information (S403). The controller 130 may receive an input of the user information from the user or it may retrieve the user information pre-stored in the memory 170.

The controller 130 of the mobile terminal 100 according to an exemplary embodiment may transmit the virtual machine request information to the server 200 (S404).

The controller 901 of the server 200 according to an exemplary embodiment may determine entry of the mobile terminal 100 to an examination site zone (S405). For example, based on the location information of the mobile terminal 100 included in the virtual machine request information, the controller 901 may determine whether the mobile terminal 100 has entered a predefined examination site zone.

Based on the virtual machine request information, the controller 901 of the server 200 according to an exemplary embodiment may determine an examination-use virtual machine to be transmitted (S406). For example, based on a name of an examination subject, examination level information, etc., the controller 901 of the server 200 may determine the examination-use virtual machine to be transmitted.

The controller 901 of the server 200 according to an exemplary embodiment may transmit the examination-use virtual machine including examination paper data to the mobile terminal 100 (S407).

The controller 130 of the mobile terminal 100 according to an exemplary embodiment may drive the examination-use virtual machine (S408).

The controller 901 of the server 200 according to an exemplary embodiment may determine whether the mobile terminal 100 has exited the predefined examination site zone or whether a predefined time period elapsed (S409).

The controller 901 of the server 200 according to an exemplary embodiment may transmit a virtual machine reclaim command signal to the mobile terminal 100 (S410). For example, the controller 901 of the server 200 determines that the mobile terminal 100 of a student has exited the predefined examination site zone, the controller 901 of the server 200 may transmit the virtual machine reclaim command signal to the mobile terminal 100 of the student. When the predefined time period that was set as an examination time has elapsed, the controller 901 of the server 200 may transmit the virtual machine reclaim command signal to the mobile terminal 100 of the student.

The controller 130 of the mobile terminal 100 according to an exemplary embodiment may transmit a virtual machine including answer data to the server 200 (S411).

That is, the virtual machine reclaim command signal may include a command signal for allowing the answer data generated in the mobile terminal 100 to be automatically transmitted to the sever 200. The mobile terminal 100 may transmit the answer data to the server 200, according to a user input signal.

The controller 130 of the mobile terminal 100 according to an exemplary embodiment may delete the examination-use virtual machine including the examination paper data and the answer data (S412). That is, the virtual machine reclaim command signal may include a command signal for allowing the examination-use virtual machine including the examination paper data and the answer data generated in the mobile terminal 100 to be automatically deleted.

The aforementioned exemplary embodiments should be considered in a descriptive sense only and not for purposes of limitation, and are not limited to an order of the operations in the flowchart of FIG. 50. According to one or more exemplary embodiments, some operations may be skipped or added, and an order of some operations may be changed.

Figure 51A:
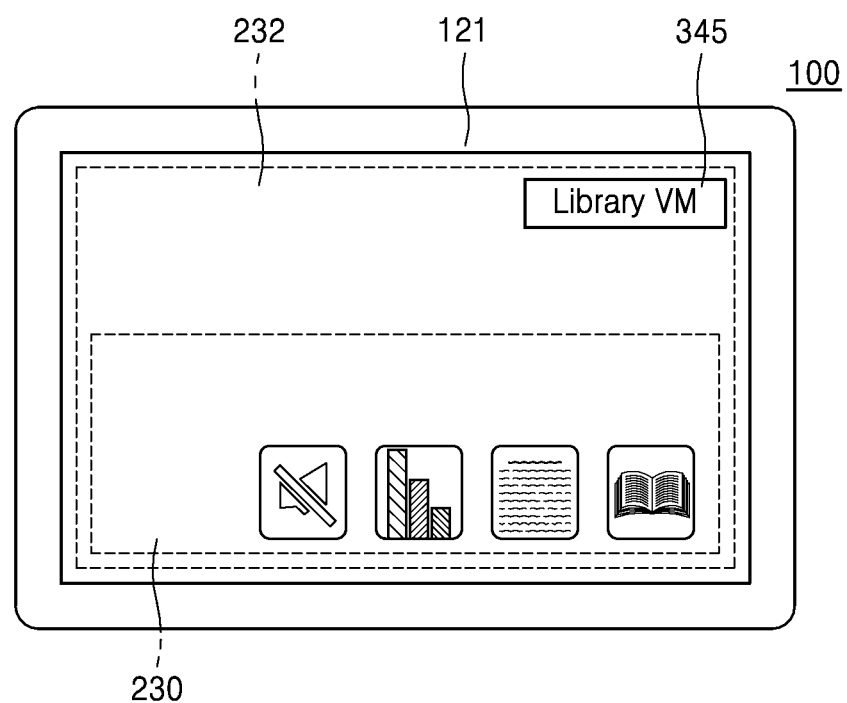
FIG. 51A illustrates a screen whereon a virtual machine is operating in the mobile terminal, according to an exemplary embodiment.
Figure 51B:
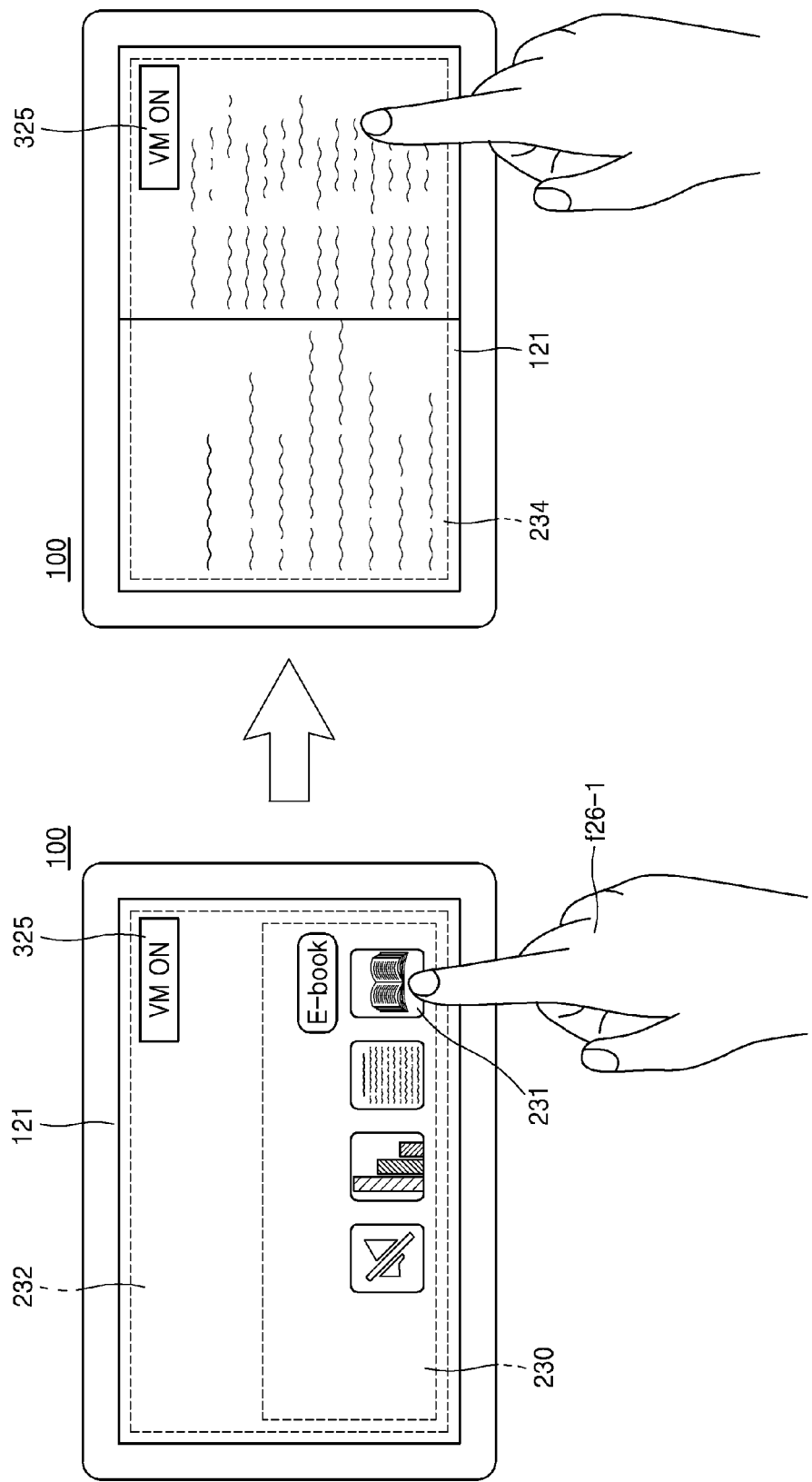
FIG. 51B illustrates an example of using the virtual machine in the mobile terminal, according to an exemplary embodiment.
Figure 52A:
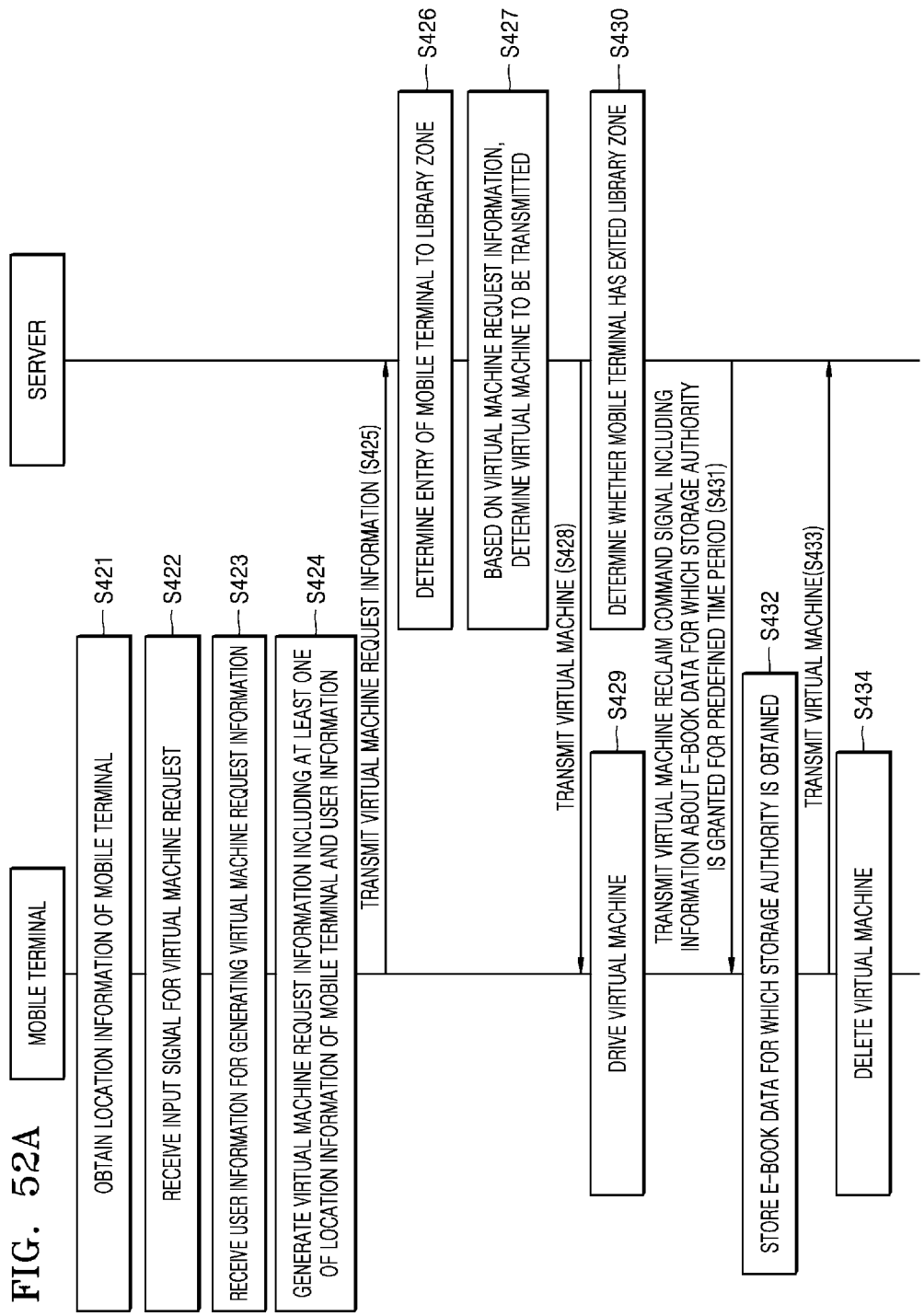
FIGS. 52A and 52B are flowcharts illustrating an example of storing data in the mobile terminal, according to an exemplary embodiment.
Figure 52B:
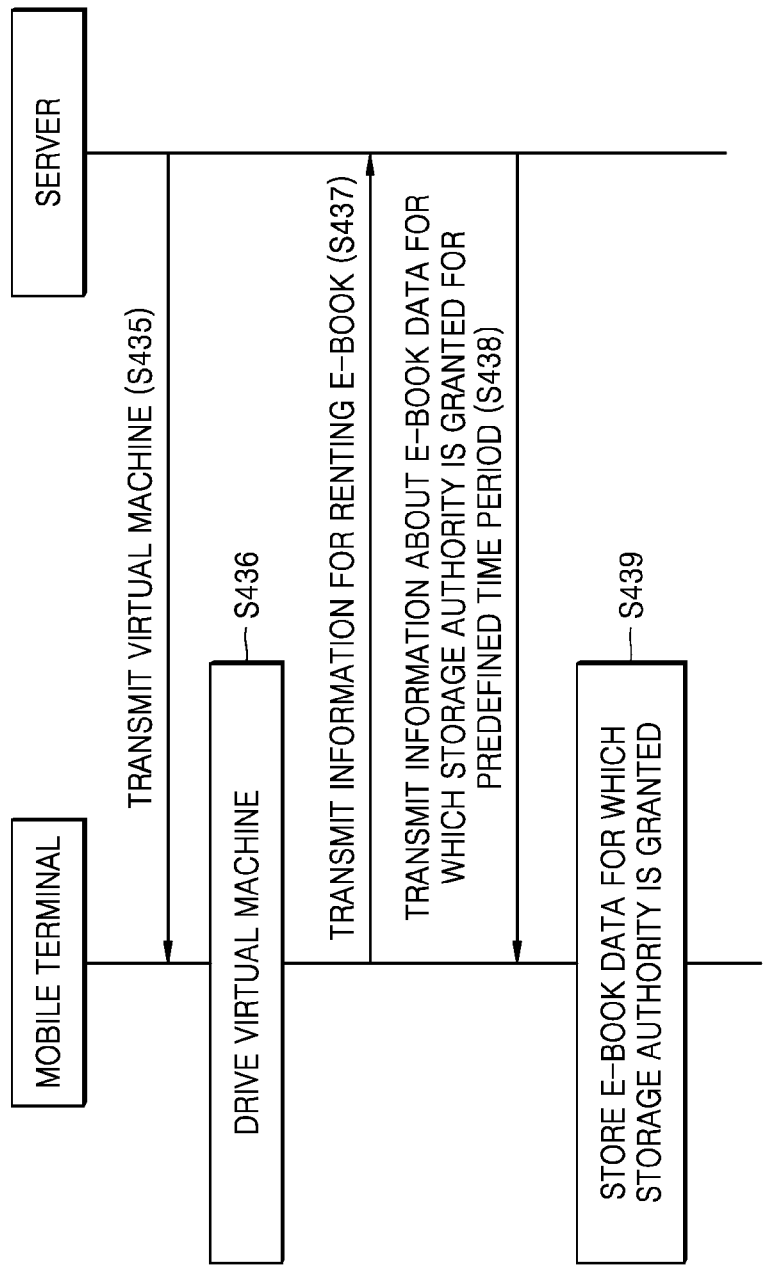
Figure 52C:
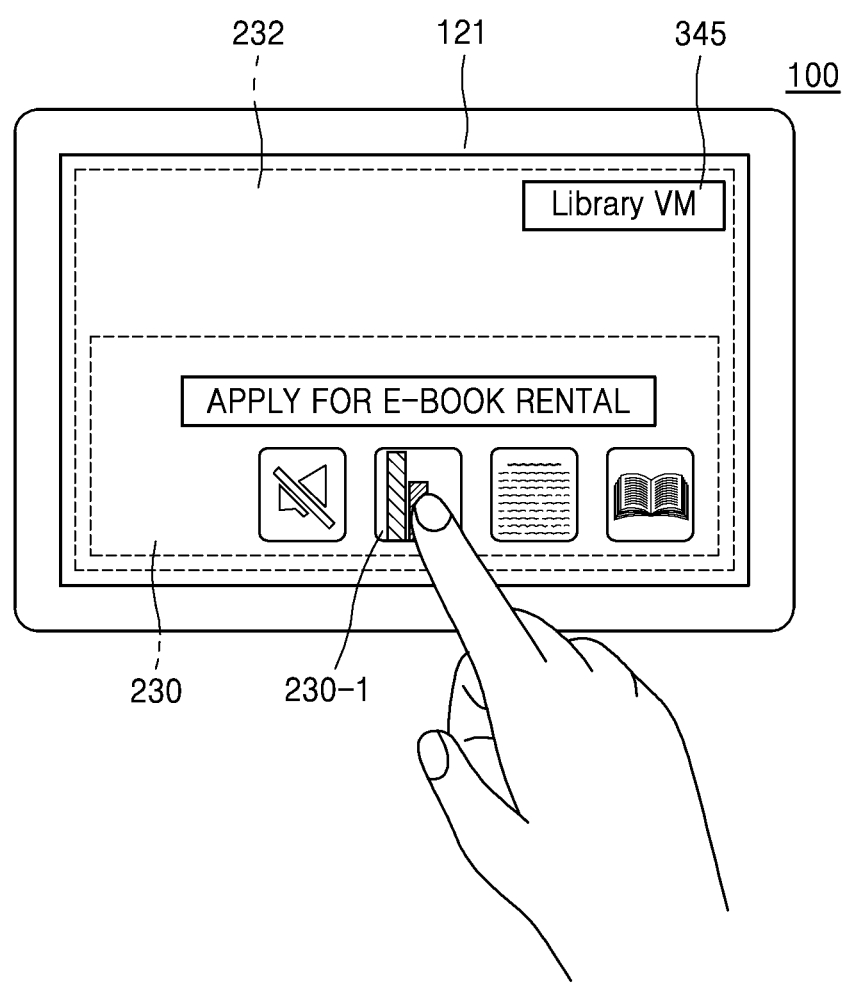
FIG. 52C illustrates the example of FIGS. 52A and 52B of storing data in the mobile terminal, according to an exemplary embodiment.

FIG. 51A illustrates a screen whereon a virtual machine is operating in the mobile terminal 100, according to an exemplary embodiment. FIG. 51B illustrates an example of using the virtual machine in the mobile terminal 100, according to an exemplary embodiment. FIGS. 52A and 52B are flowcharts illustrating an example of storing data in the mobile terminal 100, according to an exemplary embodiment. FIG. 52C illustrates the example of storing data in the mobile terminal 100, according to an exemplary embodiment.

When the mobile terminal 100 according to an exemplary embodiment enters a library zone, the mobile terminal 100 may drive, in the mobile terminal 100, a virtual machine including an application that is usable in a library.

Referring to FIG. 52A, in operation S421, the controller 130 of the mobile terminal 100 may obtain location information of the mobile terminal 100. In operation S422, the controller 130 of the mobile terminal 100 may receive an input signal for a virtual machine request.

In operation S423, the controller 130 of the mobile terminal 100 may receive user information for generating virtual machine request information. In operation S424, the controller 130 may generate the virtual machine request information including at least one of the location information of the mobile terminal 100 obtained in the operation S421 and the user information received in the operation S423.

In operation S425, the controller 130 of the mobile terminal 100 may transmit the virtual machine request information generated in the operation S424 to the server 200.

In operation S426, the controller 901 of the server 200 may determine entry of the mobile terminal to the library zone. That is, based on the received location information of the mobile terminal 100, the controller 901 may determine whether the mobile terminal 100 has entered the predefined library zone.

In operation S427, based on the virtual machine request information, the controller 901 of the server 200 may determine a virtual machine to be transmitted. In operation S428, the controller 901 of the server 200 may transmit the virtual machine, which was determined in the operation S427, to the mobile terminal 100.

In operation S429, the controller 130 of the mobile terminal 100 may drive, in the mobile terminal 100, the virtual machine that was received in the operation S428.

Referring to FIG. 51A, the controller 130 may display, on the display unit 121, a screen 232 whereon a library-use virtual machine is operating. The controller 130 may display, on the display unit 121, an icon 345 indicating that the virtual machine is operating. For example, a place of use of the virtual machine (e.g., 'Library') may be displayed on the icon 345, but exemplary embodiments are not limited thereto.

Referring to FIG. 51B, the controller 130 may display an icon 325 (e.g., 'VM ON') indicating that the virtual machine is operating.

The controller 130 may display, on the display unit 121, icons 230 that correspond to applications for browsing books in a library, retrieving a location of a book in the library, reading a book in the library, etc.

Referring to the left side of FIG. 51B, when the controller 130 receives a touch input of selecting, by using a finger f26-1 of a user, etc., an icon 231 corresponding to the application for reading a book, the controller 130 may display an E-book 234 on the display unit 121 (refer to right side of FIG. 51B). That is, the user of the mobile terminal 100 who entered the library may read books in the form of E-books by using the mobile terminal 100.

The controller 901 of the server 200 according to an exemplary embodiment may determine whether the mobile terminal 100 has exited the library zone (S430).

In operation S431, when the controller 901 of the server 200 determines that the mobile terminal 100 has exited the library zone, the controller 901 of the server 200 may transmit a virtual machine reclaim command signal to the mobile terminal 100. The virtual machine reclaim command signal may include information about E-book data for which storage authority is granted for a predefined time period.

That is, when the mobile terminal 100 has exited the library zone, the server 200 may include information about the E-book data for which storage authority is granted for the predefined time period in the virtual machine reclaim command signal, and may transmit the virtual machine reclaim command signal to the mobile terminal 100.

In operation S432, the controller 130 of the mobile terminal 100 may store, in the memory 170, the E-book data for which storage authority is obtained.

In operation S433, the controller 130 of the mobile terminal 100 may transmit the virtual machine. That is, the virtual machine reclaim command signal may include a command signal for allowing the virtual machine to be automatically transmitted to the server 200.

In operation S434, the controller 130 of the mobile terminal 100 may delete the virtual machine. That is, the virtual machine reclaim command signal may include a command signal for allowing the virtual machine to be automatically deleted.

The user of the mobile terminal 100 according to an exemplary embodiment may read books in the form of E-books in the library zone by using the mobile terminal 100.

When the mobile terminal 100 exits the library zone, the mobile terminal 100 may store predefined E-book data in the mobile terminal only for a predefined time period. By doing so, it is possible to achieve an effect of renting a book for the predefined time period.

Referring to FIG. 52B, in operation S435, the server 200 may transmit a virtual machine to the mobile terminal 100.

Referring to FIG. 52B, in operation S436, the mobile terminal 100 may drive the virtual machine received from the server 200 in the operation S435. In operation S437, the controller 130 of the mobile terminal 100 may transmit information for renting an E-book to the server 200. That is, the controller 130 may request the server 200 for authority to read the E-book for a predefined time period.

For example, as illustrated in FIG. 52C, when the controller 130 receives an input of selecting an icon 230-1 for applying for E-book rental, the controller 130 may transmit information for the E-book rental to the server 200.

In operation S438, the serve 200 may transmit, to the mobile terminal 100, information about E-book data for which storage authority is granted for a predefined time period. That is, based on the information for the E-book rental received from the mobile terminal 100, the server 200 may transmit storage authority information about the E-book data to the mobile terminal 100.

In operation S439, the mobile terminal 100 may store, in the memory 170, the E-book data for which storage authority is granted.

That is, according to a request of a user of the mobile terminal 100, the E-book data may be stored in the mobile terminal 100 for the predefined time period. Thus, it is possible to achieve an effect of renting an E-book.

The aforementioned exemplary embodiments should be considered in a descriptive sense only and not for purposes of limitation, and are not limited to an order of the operations in the flowcharts of FIGS. 52A and 52B. According to one or more exemplary embodiments, some operations may be skipped or added, and an order of some operations may be changed.

Figure 53A:
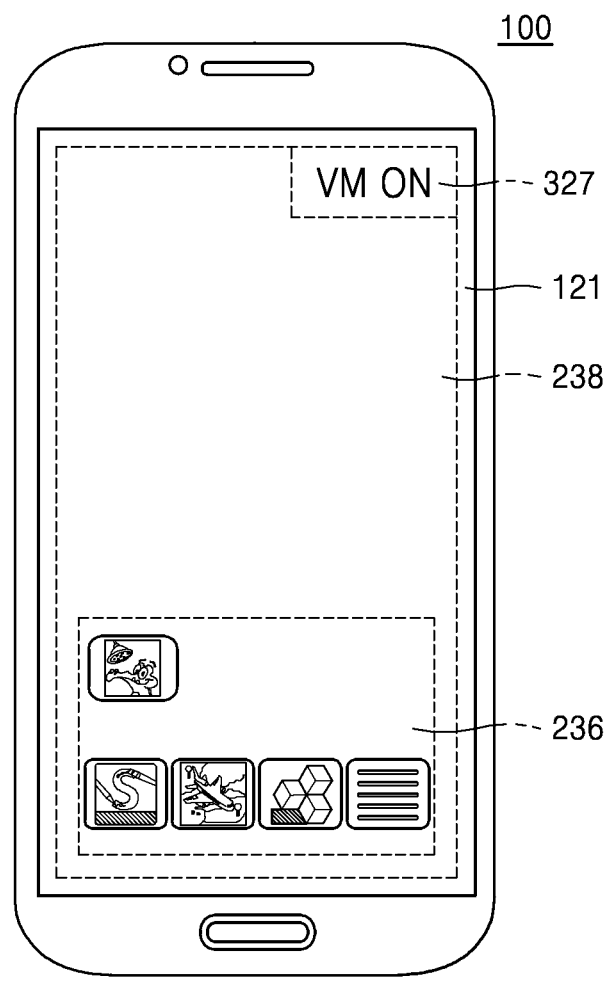
FIGS. 53A through 53C illustrate screens whereon a virtual machine is operating in the mobile terminal, according to an exemplary embodiment.
Figure 53B:
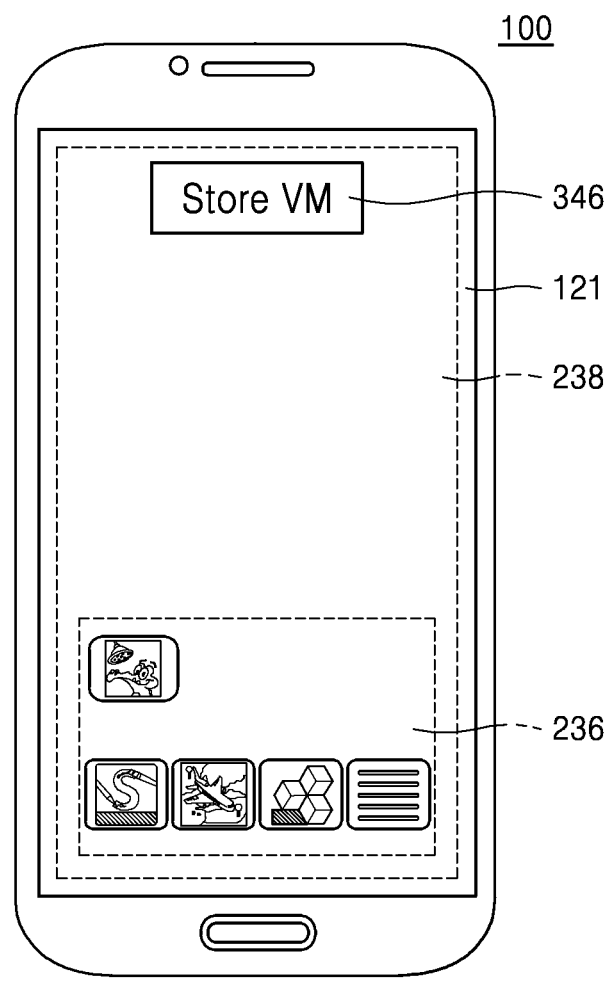
Figure 53C:
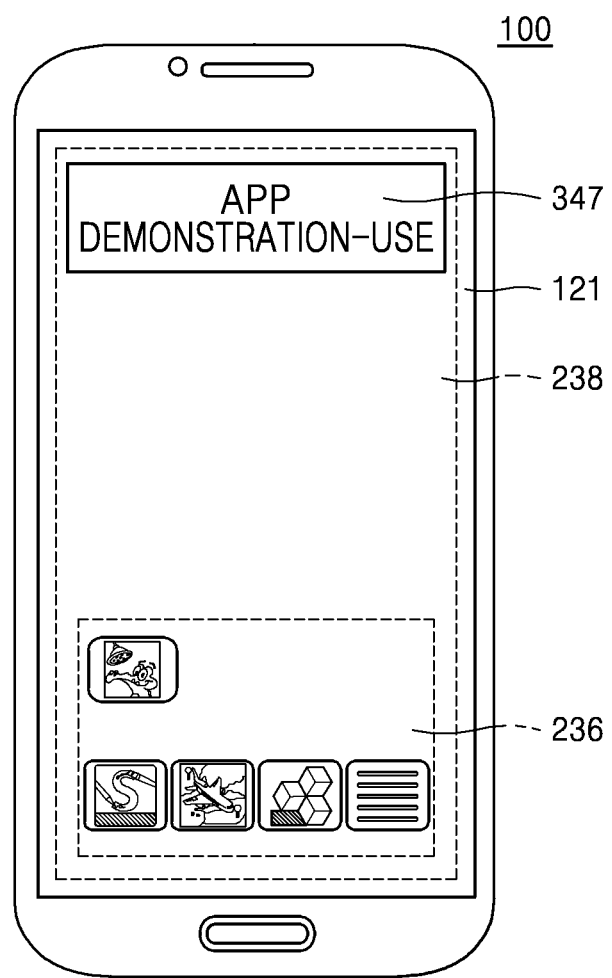
Figure 54B:
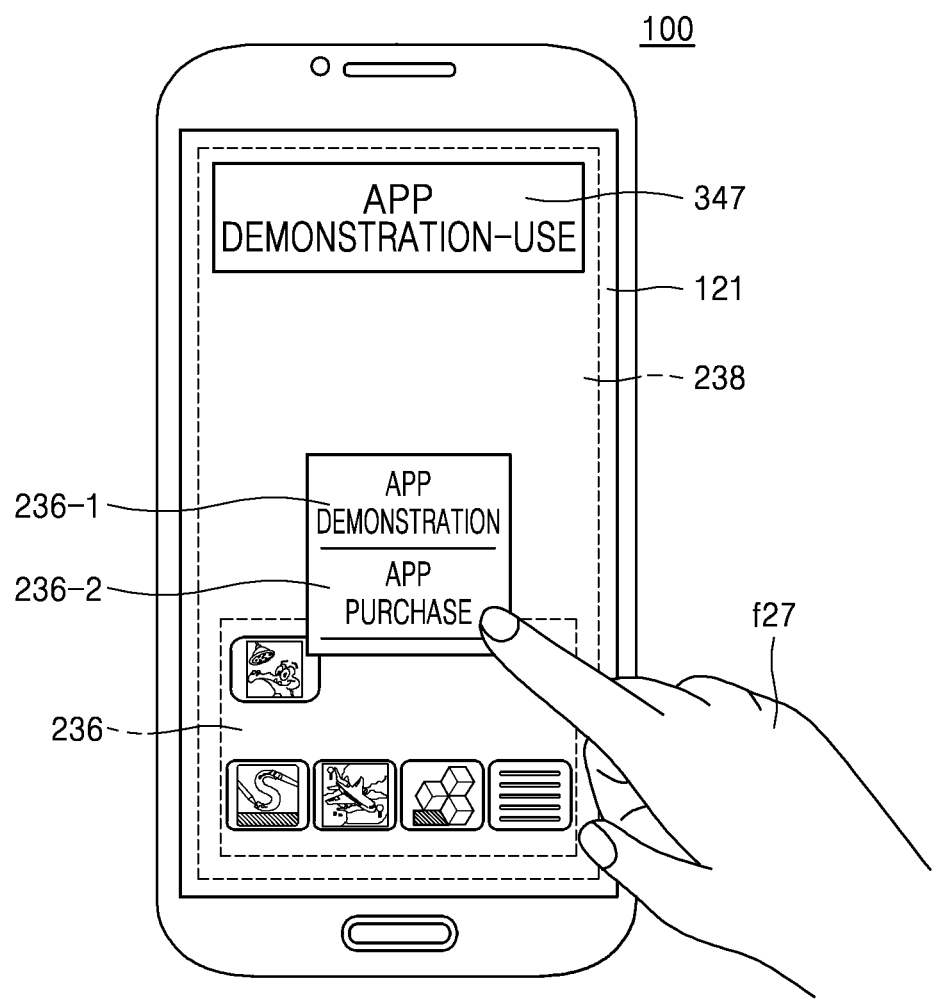
FIGS. 54B and 54C illustrate an example of using a virtual machine in the mobile terminal, according to an exemplary embodiment.
Figure 54C:
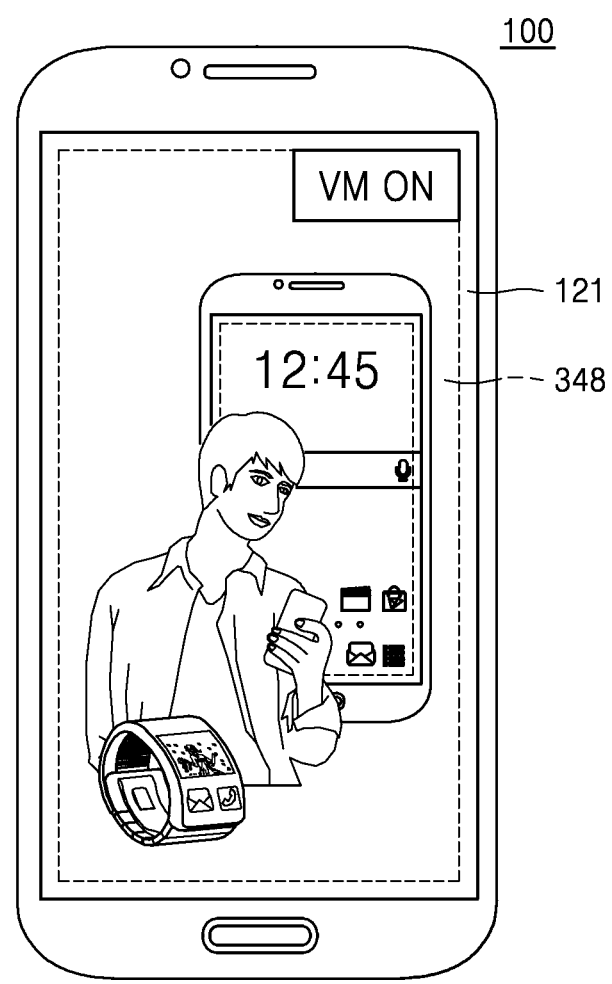

FIGS. 53A through 53C illustrate screens whereon a virtual machine is operating in the mobile terminal 100, according to an exemplary embodiment. FIG. 54A is a flowchart illustrating a controlling method performed by the terminal 100 and the server 200, according to an exemplary embodiment. FIGS. 54B and 54C illustrate an example of using a virtual machine in the mobile terminal 100, according to an exemplary embodiment.

When the mobile terminal 100 according to an exemplary embodiment enters a preset store, the mobile terminal 100 may drive, in the mobile terminal 100, a virtual machine including demonstration-use applications, so that a user of the mobile terminal 100 may try a predefined application in the mobile terminal 100.

As illustrated in FIG. 54A, in operation S441, the controller 130 of the mobile terminal 100 may obtain location information of the mobile terminal 100. In operation S442, the controller 130 of the mobile terminal 100 may receive an input signal for a virtual machine request.

In operation S443, the controller 130 of the mobile terminal 100 may generate virtual machine request information including the location information of the mobile terminal 100 obtained in the operation S441. In operation S444, the controller 130 may transmit the virtual machine request information generated in the operation S443 to the server 200.

In operation S445, the controller 901 of the server 200 may determine entry of the mobile terminal 100 to a store zone. In operation S446, based on the virtual machine request information, the controller 901 of the server 200 may determine a virtual machine to be transmitted.

In operation S447, the controller 901 of the server 200 may transmit the virtual machine including a demonstration-use application to the mobile terminal 100.

In operation S448, the controller 130 of the mobile terminal 100 may drive the virtual machine.

Referring to FIG. 53A, the controller 130 may display, on the display unit 121, a screen 238 whereon the virtual machine is operating. The controller 130 may display, on the display unit 121, an icon 327 indicating that the virtual machine is operating. For example, the icon 327 may be marked as 'VM ON', but is not limited thereto.

Referring to FIG. 53B, as a mark 346 indicating that the virtual machine is operating, the controller 130 may display a place of use of the virtual machine (e.g., 'STORE').

Referring to FIG. 53C, as a mark 347 indicating that the virtual machine is operating, the controller 130 may display a target use of the virtual machine (e.g., 'App demonstration-use').

The controller 130 may display, on the display unit 121, icons 236 that correspond to demonstration-use applications provided by the store that the mobile terminal 100 has entered.

Referring to FIG. 54A, in operation S449, the controller 130 of the mobile terminal 100 may execute an application. That is, the mobile terminal 100 may execute the demonstration-use application.

In operation S450, the controller 130 of the mobile terminal 100 may transmit application storage request information to the server 200.

The application storage request information may include information for purchasing an application. For example, when the user of the mobile terminal 100 executes the demonstration-use application and then attempts to purchase an actual application of the demonstration-use application, the mobile terminal 100 may transmit payment information, etc. to the server 200.

For example, referring to FIG. 54B, when the controller 130 receives an input of selecting an App demonstration icon 236-1, the controller 130 may execute the demonstration-use application.

When the controller 130 receives an input of selecting an App purchase icon 236-2 by using a finger f27, etc., the controller 130 may transmit the application storage request information to the server 200.

Referring to FIG. 54A, in operation S451, the controller 901 of the server 200 may transmit information for granting authority to store the application to the mobile terminal 100. For example, when an approval for payment is completed based on the payment information, the server 200 may transmit, to the mobile terminal 100, the information for granting authority to the mobile terminal 100 to store the application purchased by the mobile terminal 100.

In operation S452, the mobile terminal 100 may store, in the memory 170, the application for which storage authority is obtained (S452).

In operation S453, the controller 901 of the server 200 may determine whether the mobile terminal 100 has exited the store zone. In operation S454, if the controller 901 of the server 200 determines that the mobile terminal 100 has exited the store zone, the controller 901 of the server 200 may transmit a virtual machine reclaim command signal to the mobile terminal 100.

In operation S455, the mobile terminal 100 may transmit the virtual terminal to the server 200. That is, the virtual machine reclaim command signal may include a command signal for allowing the virtual machine to be automatically transmitted to the server 200.

In operation S456, the controller 130 of the mobile terminal 100 may delete the virtual machine. That is, the virtual machine reclaim command signal may include a command signal for allowing the virtual machine to be automatically deleted.

Referring to FIG. 54C, when the controller 130 of the mobile terminal 100 according to an exemplary embodiment drives a virtual machine in a particular store, the controller 130 of the mobile terminal 100 may display an advertisement video of the particular store, on the display unit 121.

That is, a virtual machine that is usable in a particular store may also include an advertisement video about products of the store, and thus may be used for marketing.

The aforementioned exemplary embodiments should be considered in a descriptive sense only and not for purposes of limitation, and are not limited to an order of the operations in the flowchart of FIG. 54A. According to one or more exemplary embodiments, some operations may be skipped or added, and an order of some operations may be changed.

Figure 55:
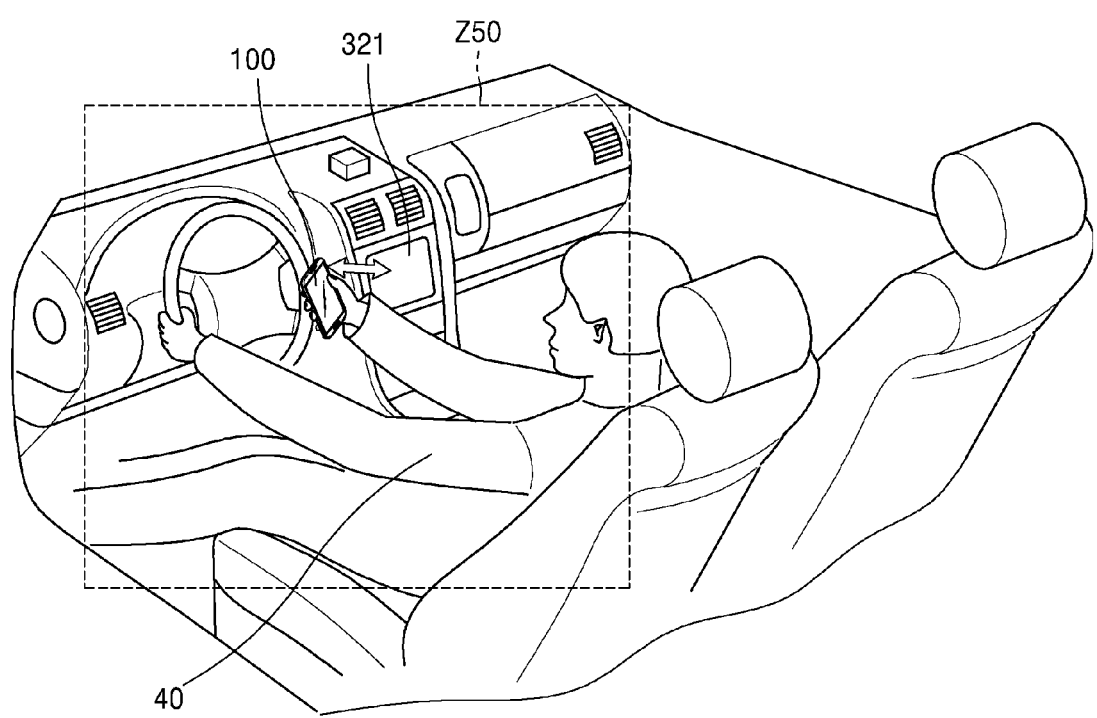
FIG. 55 illustrates migration of a virtual machine between the mobile terminal and a vehicle system, according to an exemplary embodiment.

FIG. 55 illustrates migration of a virtual machine between the mobile terminal 100 and a vehicle system, according to an exemplary embodiment.

As illustrated in FIG. 55, when a user 40 of the mobile terminal 100 according to an exemplary embodiment is within a vehicle zone z50, the mobile terminal 100 may receive a vehicle control-use virtual machine from the vehicle system.

After the mobile terminal 100 has entered the vehicle zone z50, the mobile terminal 100 may transmit a virtual machine that is operating in the mobile terminal 100 to the vehicle system.

Figure 56:
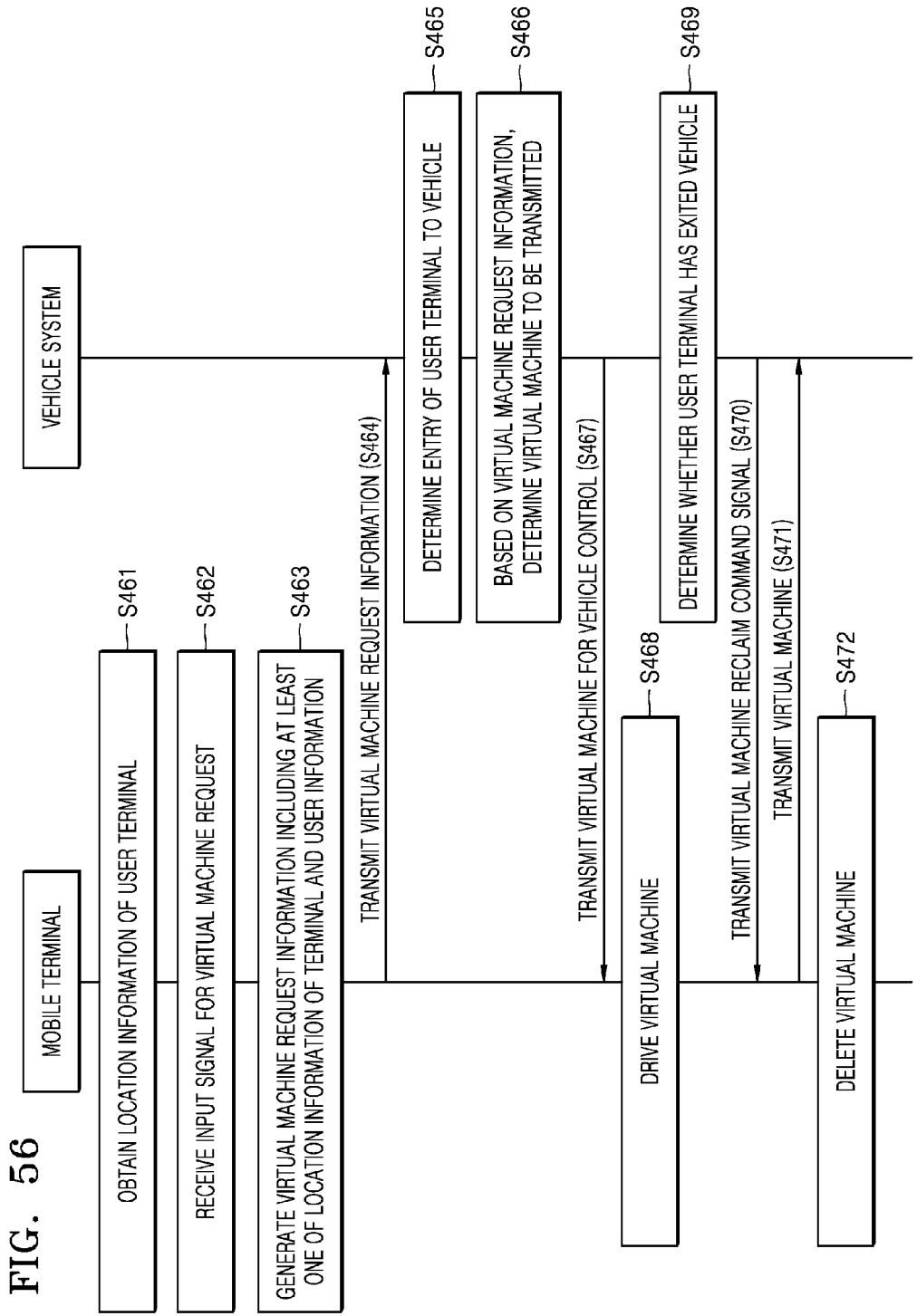
FIG. 56 is a flowchart illustrating an example in which a virtual machine is migrated from the vehicle system to the mobile terminal, according to an exemplary embodiment.

FIG. 56 is a flowchart illustrating an example in which a virtual machine is migrated from the vehicle system to the mobile terminal 100, according to an exemplary embodiment.

In operation S461, the controller 130 of the mobile terminal 100 may obtain location information of the mobile terminal 100. In operation S462, the controller 130 of the mobile terminal 100 may receive an input signal for a virtual machine request. In operation S463, the controller 130 may generate virtual machine request information including at least one of the location information of the mobile terminal 100 and user information.

In operation S464, the controller 130 of the mobile terminal 100 may transmit the virtual machine request information to the vehicle system. In operation S465, the vehicle system may determine entry of the mobile terminal 100 to a vehicle. In operation S466, based on the virtual machine request information, the vehicle system may determine a virtual machine to be transmitted. In operation S467, the vehicle system may transmit a virtual machine for a vehicle control to the mobile terminal 100.

The virtual machine for the vehicle control may include an application related to controlling a vehicle, e.g., seat setting, head-up display (HUD) display screen setting, steering wheel manipulation sensitivity setting, a navigation application, vehicle information, and the like.

In operation S468, the controller 130 of the mobile terminal 100 may drive the virtual machine for the vehicle control.

In operation S469, the vehicle system may determine whether the mobile terminal 100 has exited the vehicle. In operation S470, when the vehicle system determines that the mobile terminal 100 has exited the vehicle, the vehicle system may transmit a virtual machine reclaim command signal to the mobile terminal 100.

In another exemplary embodiment, the operation of transmitting, by the vehicle system, the virtual machine reclaim command signal to the mobile terminal 100 may be skipped. That is, when the vehicle system determines that the mobile terminal 100 has exited the vehicle, the vehicle system may not reclaim the installed virtual machine. In a case in which the mobile terminal 100 and the vehicle system are owned by a same user, even if the user of the mobile terminal 100 exits the vehicle, the mobile terminal 100 may maintain the virtual machine.

In operation S471, based on the virtual machine reclaim command signal, the controller 130 of the mobile terminal 100 may transmit the virtual machine to the vehicle system.

In operation S472, based on the virtual machine reclaim command signal, the controller 130 of the mobile terminal 100 may delete the virtual machine.

The aforementioned exemplary embodiments should be considered in a descriptive sense only and not for purposes of limitation, and are not limited to an order of the operations in the flowchart of FIG. 56. According to one or more exemplary embodiments, some operations may be skipped or added, and an order of some operations may be changed.

Figure 57:
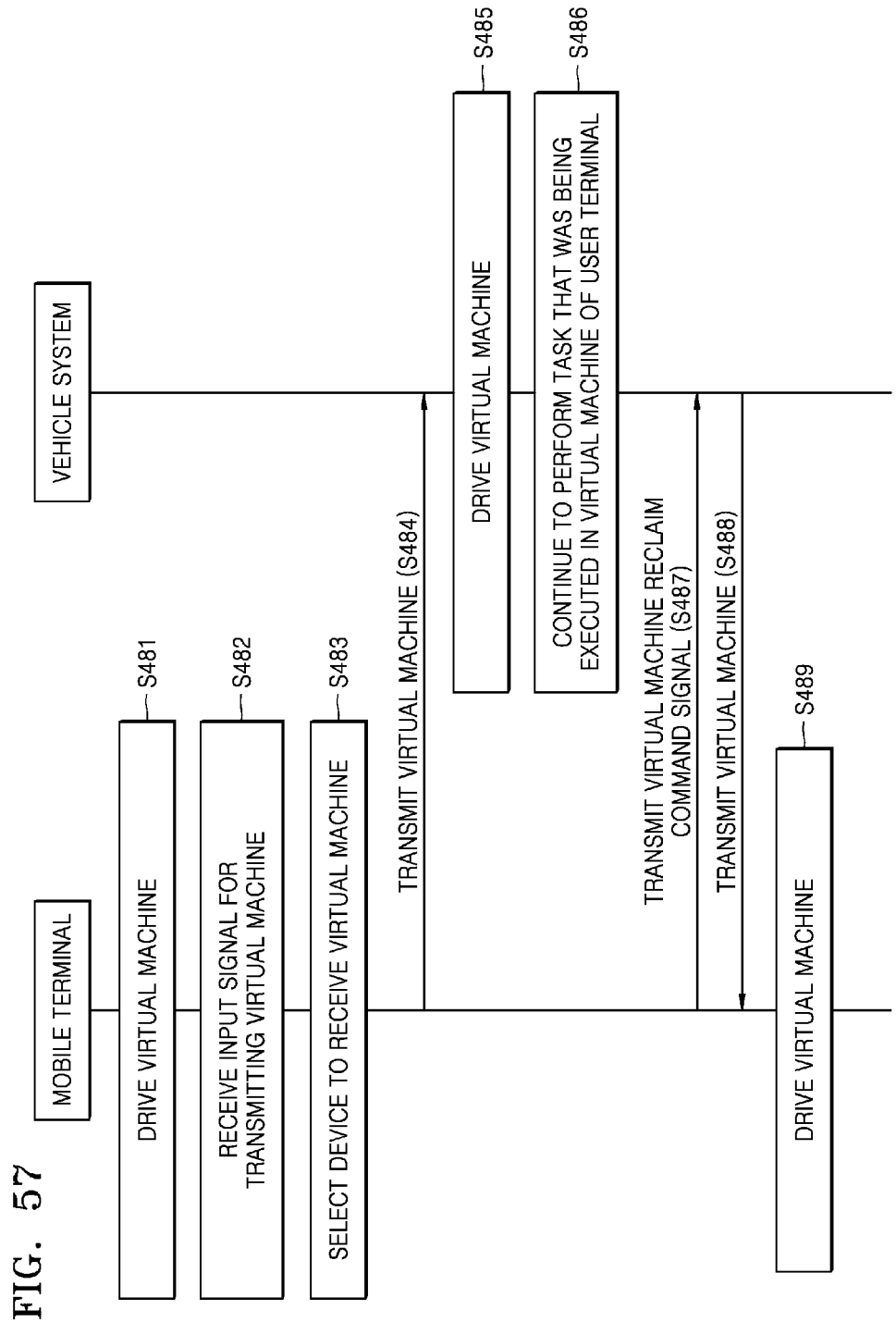
FIG. 57 is a flowchart illustrating an example in which a virtual machine is migrated from the mobile terminal to the vehicle system, according to an exemplary embodiment.
Figure 58:
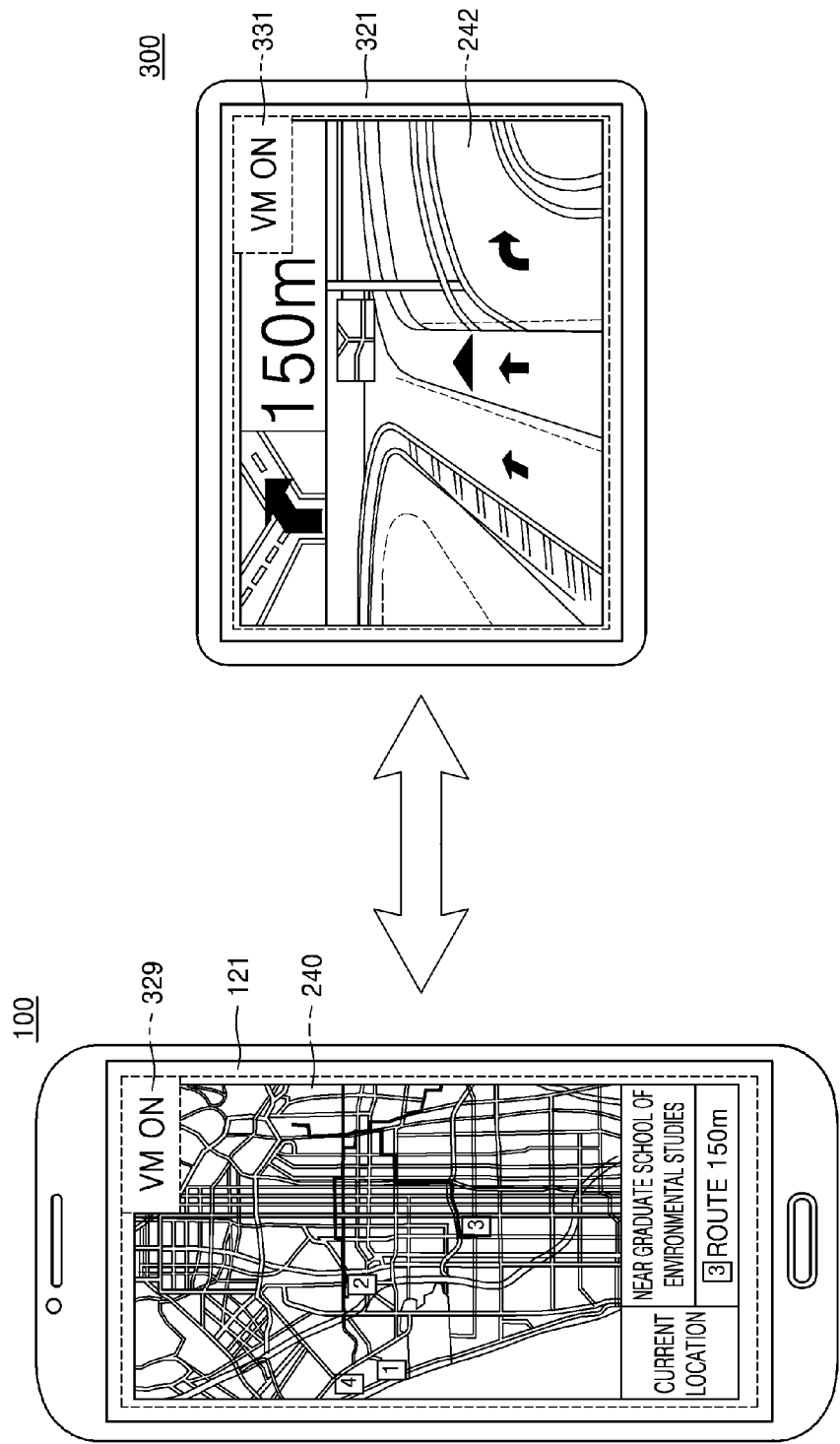
FIG. 58 illustrates an example in which a virtual machine is migrated from the mobile terminal to the vehicle system, according to an exemplary embodiment.

FIG. 57 is a flowchart illustrating an example in which a virtual machine is migrated from the mobile terminal 100 to the vehicle system, according to an exemplary embodiment. FIG. 58 illustrates an example in which a virtual machine is migrated from the mobile terminal 100 to the vehicle system, according to an exemplary embodiment.

Referring to FIG. 57, in operation S481, the controller 130 of the mobile terminal 100 may drive a virtual machine. In operation S482, the controller 130 may receive an input signal for transmitting the virtual machine.

For example, while the mobile terminal 100 drives the virtual machine, the mobile terminal 100 may receive a user input signal for transmitting the virtual machine to another device.

As another example, the operation of receiving, by the controller 130, the input signal for transmitting the virtual machine may be skipped. That is, the mobile terminal 100 may automatically transmit the virtual machine to the vehicle system.

In operation S483, the controller 130 of the mobile terminal 100 may select a device to receive the virtual machine. For example, the controller 130 may select another device (e.g., the vehicle system) to receive the virtual system that is operating in the mobile terminal 130. For example, the controller 130 of the mobile terminal 100 may select a device within a short-distance wireless communication range.

In operation S484, the controller 130 of the mobile terminal 100 may transmit the virtual machine to a receiving device (e.g., the vehicle system). In operation S485, the vehicle system according to an exemplary embodiment may drive the virtual machine.

In operation S486, the vehicle system may continue to perform a task that was being executed in the virtual machine of the mobile terminal 100.

That is, since the mobile terminal 100 transmits the virtual machine in the form of live migration to the vehicle system, the vehicle system may continue to perform the task that was being executed in the mobile terminal 100. The live migration means that a virtual machine that is currently operating is transferred from one device to another device without stopping a service.

For example, a music player that was being executed in the mobile terminal 100 may continue be executed in the vehicle system.

Referring to the left side of FIG. 58, the mobile terminal 100 may execute a navigation application through a virtual machine. That is, the controller 130 may display, on the display unit 121, an icon 329 indicating that the virtual machine is operating. The controller 130 may display, on the display unit 121, an execution screen 240 of the navigation application.

While the controller 130 of the mobile terminal 100 executes the navigation application through the virtual machine, the controller 130 of the mobile terminal 100 may transmit the virtual machine in the form of live migration to a vehicle system 300.

The vehicle system 300 may operate the virtual machine received from the mobile terminal 100. The vehicle system 300 may display an icon 331 indicating that the virtual machine is operating, on a display unit 321, an execution screen 242 of the vehicle system 300.

The vehicle system 300 may continue to execute the navigation application that was being executed in the mobile terminal 100. That is, the navigation application may continue to provide a route guide to a same destination.

The vehicle system 300 may display the execution screen 240 of the navigation application on the display unit 321.

Referring to FIG. 58, the mobile terminal 100 may display a route guide service of the navigation application in a pedestrian mode, and the vehicle system 300 that received the virtual machine from the mobile terminal 100 may convert a mode of the route guide service to a vehicle mode, and may display the route guide service.

After the mobile terminal 100 according to an exemplary embodiment transmits the virtual machine to the vehicle system 300, the mobile terminal 100 may not stop driving the virtual machine. In this case, the mobile terminal 100 and the vehicle system 300 may simultaneously execute the navigation application that provides the route guide to the same destination. For example, the mobile terminal 100 may operate in a mode of displaying an entire route from a start point to a destination, and the vehicle system 300 may operate in a route guide mode while a vehicle is driven.

Referring to FIG. 57, the controller 130 of the mobile terminal 100 according to an exemplary embodiment may transmit a virtual machine reclaim command signal (S487). For example, when a user of the mobile terminal 100 exits the vehicle and thus the mobile terminal 100 determines that the mobile terminal 100 exits the vehicle zone z50, the mobile terminal 100 may transmit the virtual machine reclaim command signal to the vehicle system.

In another exemplary embodiment, the operation of transmitting, by the mobile terminal 100, the virtual machine reclaim command signal to the vehicle system may be skipped. That is, in a case in which the mobile terminal 100 and the vehicle system are owned by a same user, the vehicle system may maintain the virtual machine received from the mobile terminal 100.

The vehicle system according to an exemplary embodiment may transmit the virtual machine to the mobile terminal 100 (S488). The vehicle system may transmit the virtual machine in the form of live migration to the mobile terminal 100.

In operation S489, the controller 130 of the mobile terminal 100 may drive the virtual machine received in the operation S488.

For example, when the mobile terminal 100 exits the vehicle, the mobile terminal 100 receives the virtual machine that has been operating in the vehicle system, so that the mobile terminal 100 may continue to execute the navigation application that was being executed in the vehicle system. That is, the user may continue to be provided with a route guide to a particular destination via the mobile terminal 100.

The aforementioned exemplary embodiments should be considered in a descriptive sense only and not for purposes of limitation, and are not limited to an order of the operations in the flowchart of FIG. 57. According to one or more exemplary embodiments, some operations may be skipped or added, and an order of some operations may be changed.

Figure 59:
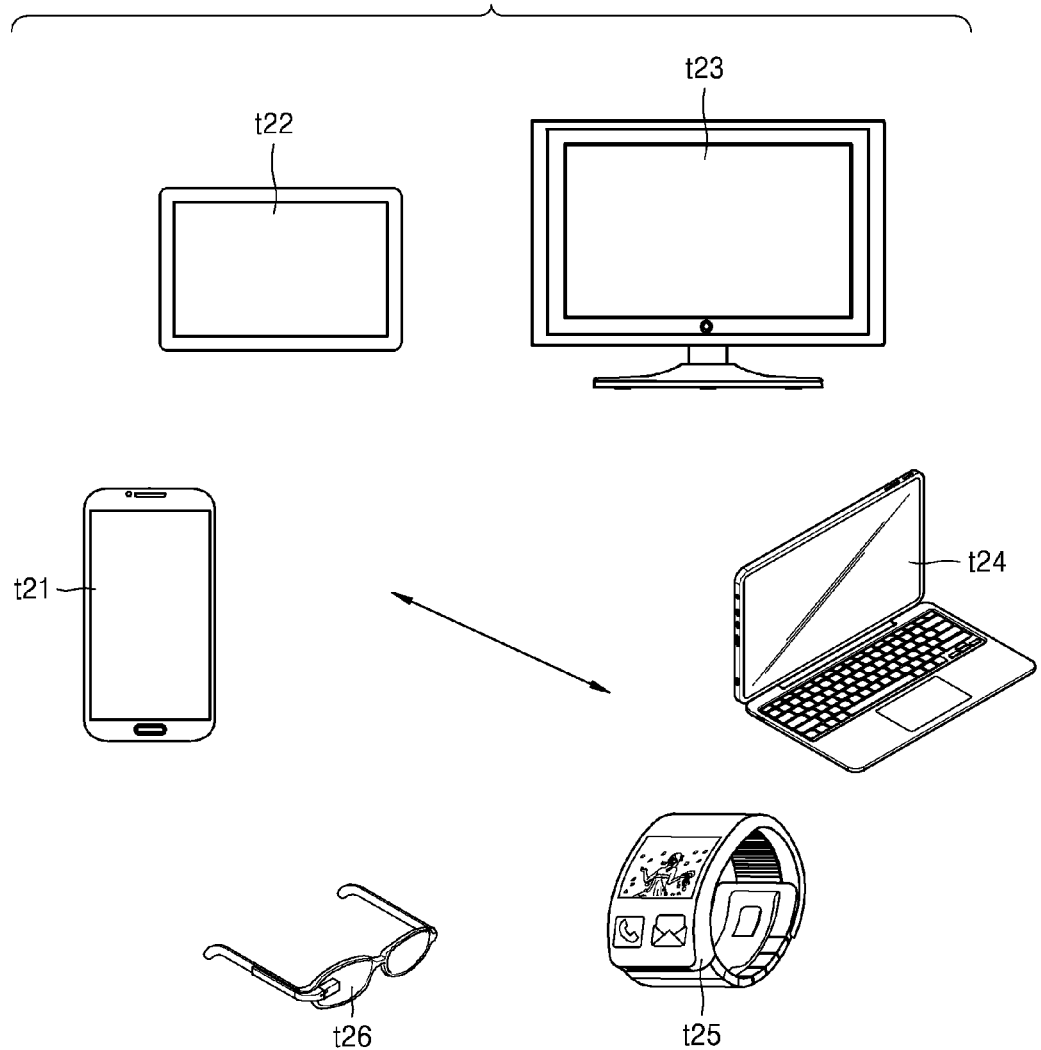
FIG. 59 illustrates migration of a virtual machine between a terminal and another terminal, according to an exemplary embodiment.

FIG. 59 illustrates a migration of a virtual machine between a terminal and another terminal, according to an exemplary embodiment.

As illustrated in FIG. 59, the virtual machine may be transmitted in the form of VM migration between one of terminals t21 through t26 and another one of the terminals t21 through t26. The terminals t21 through t26 may indicate terminals in which computing environments capable of driving the virtual machine are set up.

The terminals t21 through t26 may include the smartphone t21, the tablet PC t22, the TV t23, the notebook t24, the watch-type wearable device t25, the glasses-type wearable device t26, etc.

The terminals t21 through t26 shown in FIG. 59 are examples to which an exemplary embodiment may be applied, and one or more exemplary embodiments are not limited thereto.

Figure 60:
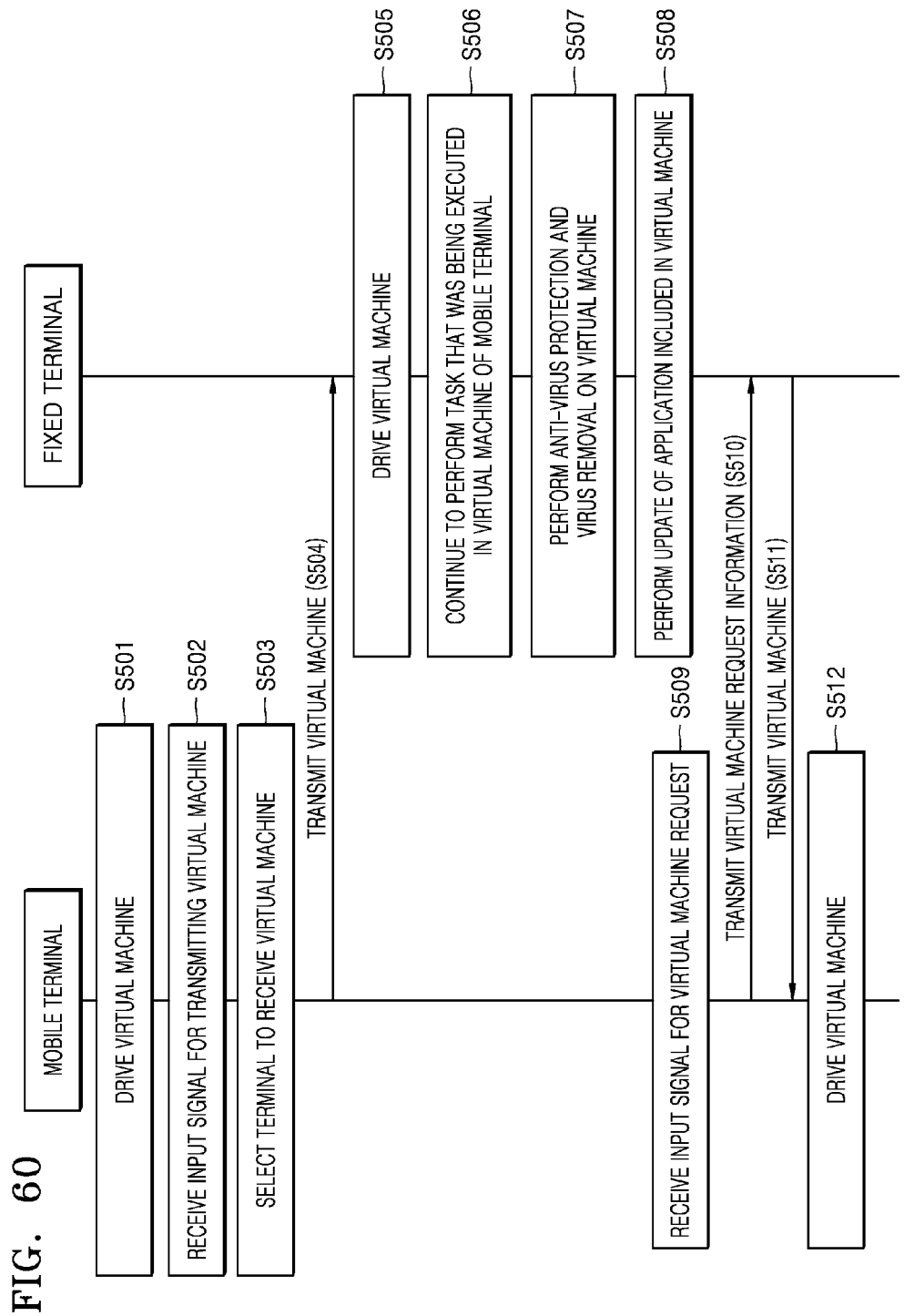
FIG. 60 is a flowchart illustrating a controlling method performed by the mobile terminal and a fixed terminal, according to an exemplary embodiment.
Figure 61:
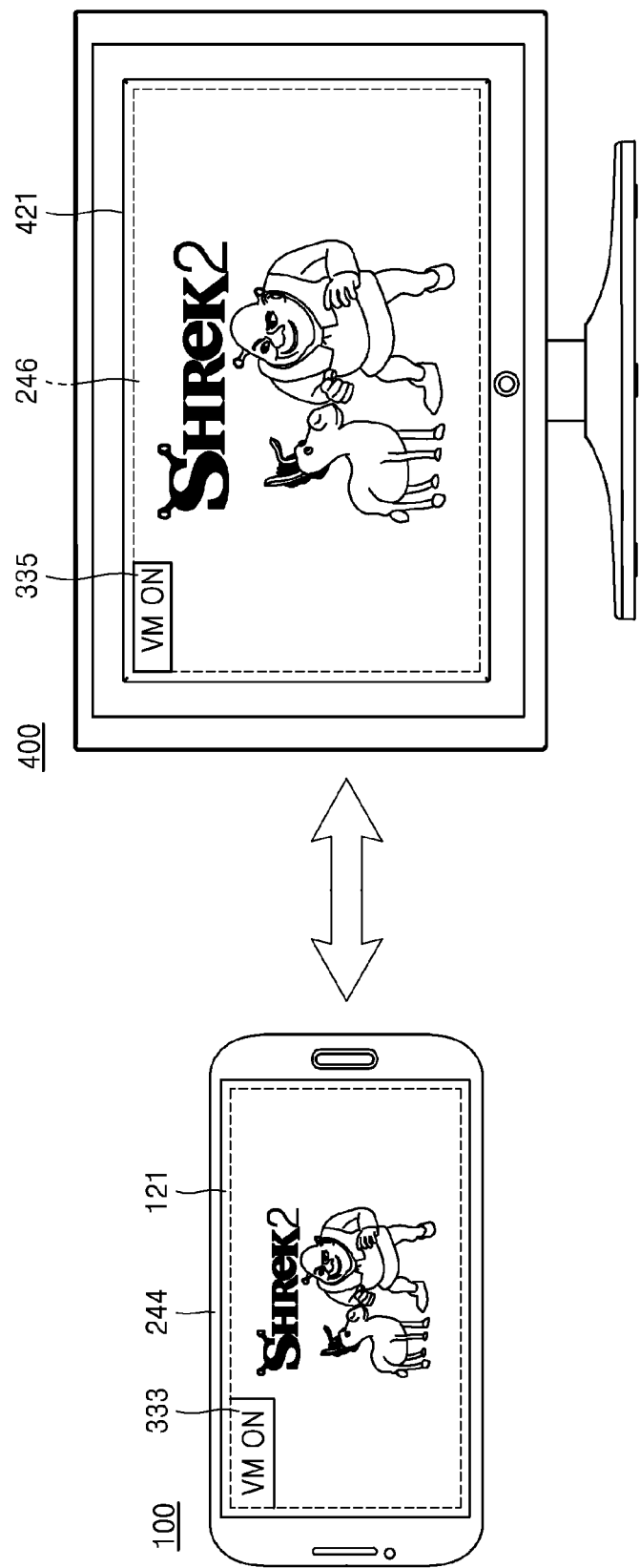
FIG. 61 illustrates an example of migrating a virtual machine between the mobile terminal and a fixed terminal, according to an exemplary embodiment.

FIG. 60 is a flowchart illustrating a controlling method performed by the mobile terminal 100 and a fixed terminal, according to an exemplary embodiment. FIG. 61 illustrates an example of migrating a virtual machine between the mobile terminal 100 and a fixed terminal 400, according to an exemplary embodiment.

Referring to FIG. 60, in operation S501, the controller 130 of the mobile terminal 100 may drive a virtual machine. In operation S502, the controller 130 of the mobile terminal 100 may receive an input signal for transmitting the virtual machine.

For example, when the mobile terminal 100 operates the virtual machine, the mobile terminal 100 may receive a user input signal for transmitting the operating virtual machine to another device.

In operation S503, the controller 130 of the mobile terminal 100 may select a terminal to receive the virtual machine. For example, when a user of the mobile terminal 100 arrives home, the controller 130 may select a TV that is a fixed terminal to receive the virtual machine.

In operation S504, the controller 130 of the mobile terminal 100 may transmit the virtual machine to the fixed terminal (e.g., the TV). The controller 130 may transmit the virtual machine in the form of live migration to the fixed terminal. The live migration means that a virtual machine that is currently operating is transferred from one device to another device without stopping a service.

In operation S505, the fixed terminal according to an exemplary embodiment may drive the virtual machine. In operation S506, the fixed terminal may continually perform a task that has been executing in the virtual machine of the mobile terminal 100.

For example, referring to the left side of FIG. 61, the mobile terminal 100 may execute a content reproduction application through the virtual machine. The controller 130 may display an execution screen 244 of the content reproduction application on the display unit 121. The controller 130 may display, on the display unit 121, an icon 333 indicating that the virtual machine is operating.

Referring to the right side of FIG. 61, the fixed terminal 400 may continue to perform a task that was being executed in the virtual machine received from the mobile terminal 100. That is, the fixed terminal 400 may display an execution screen 246 of the content reproduction application on a display unit 421. The execution screen 246 of the content reproduction application that is displayed on the display unit 421 of the fixed terminal 400 may be a screen whereon content reproduction that was being performed in the mobile terminal 100 continues to be performed.

According to an exemplary embodiment, when a user who has been watching movie content via the mobile terminal 100 arrives home, the user may continue to watch the movie content via a TV having a large display unit.

According to an exemplary embodiment, when the user who has been executing a game application via the mobile terminal 100 arrives home, the user may continue to execute the game application via the TV having the large display unit.

In operation S507, the fixed terminal according to an exemplary embodiment may perform anti-virus protection and virus removal on the virtual machine. For example, the fixed terminal that received the virtual machine may perform anti-virus protection and virus removal on an application and the like included in the virtual machine.

In operation S508, the fixed terminal according to an exemplary embodiment may perform an update of the application included in the virtual machine.

In operation S509, the controller 130 of the mobile terminal 100 according to an exemplary embodiment may receive an input signal for a virtual machine request. For example, the controller 130 of the mobile terminal 100 may receive a user input signal for requesting the fixed terminal to transmit the virtual machine.

In operation S510, the controller 130 of the mobile terminal 100 may transmit virtual machine request information to the fixed terminal.

In operation S511, the fixed terminal according to an exemplary embodiment may transmit the virtual machine to the mobile terminal 100. In operation S512, the controller 130 of the mobile terminal 100 according to an exemplary embodiment may drive the virtual machine received in the operation S511.

For example, referring to FIG. 61, the content reproduction application (refer to right side of FIG. 61) that was being executed in the virtual machine of the fixed terminal 100 may continue to be executed in the mobile terminal 100 due to migration of the virtual machine (refer to left side of FIG. 61).

The aforementioned exemplary embodiments should be considered in a descriptive sense only and not for purposes of limitation, and are not limited to an order of the operations in the flowchart of FIG. 60. According to one or more exemplary embodiments, some operations may be skipped or added, and an order of some operations may be changed.

Figure 62:
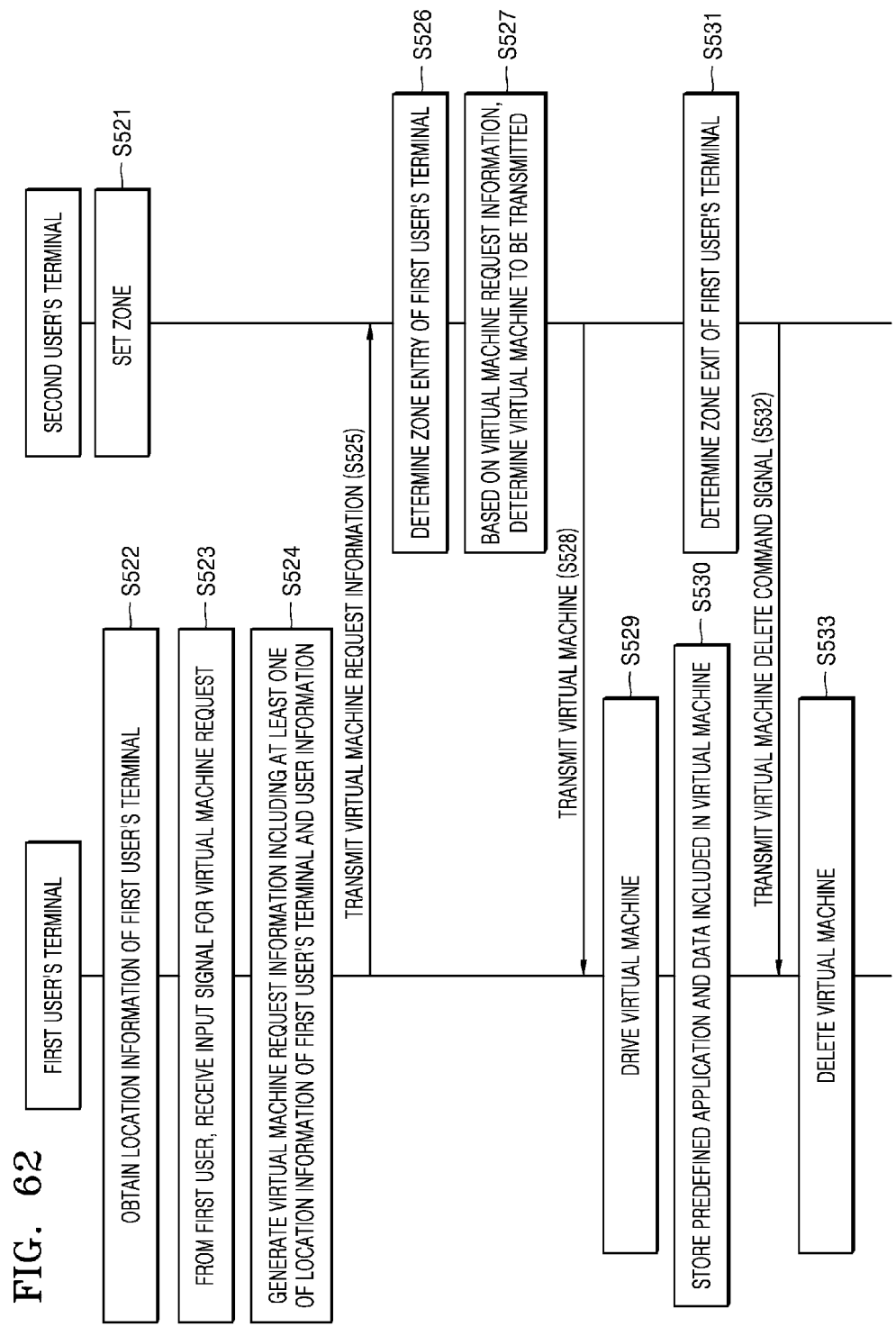
FIG. 62 is a flowchart illustrating a controlling method performed by a first user's terminal and a second user's terminal, according to an exemplary embodiment.

FIG. 62 is a flowchart illustrating a controlling method performed by a first user's terminal and a second user's terminal, according to an exemplary embodiment.

In operation S521, the second user's terminal according to an exemplary embodiment may set a zone. That is, the second user's terminal may set, as the zone, an area with a predefined range with respect to the second user's terminal. For example, a predefined range that a wireless signal reaches from a location of the second user's terminal may be set as the zone.

The second user's terminal may set, as the zone, a particular space (e.g., a meeting room), a particular building, or a particular floor, etc.

In operation S522, the first user's terminal according to an exemplary embodiment may obtain location information of the first user's terminal. A method of obtaining, by the mobile terminal 100 corresponding to the first user's terminal, the location information is described above with reference to FIG. 2A.

In operation S523, the first user's terminal according to an exemplary embodiment may receive an input signal for a virtual machine request from a first user. In operation S524, the first user's terminal according to an exemplary embodiment may generate virtual machine request information including at least one of the location information of the first user's terminal and user information.

In operation S525, the first user's terminal may transmit the virtual machine request information, which is generated in the operation S524, to the second user's terminal.

In operation S526, the second user's terminal according to an exemplary embodiment may determine zone entry of the first user's terminal. For example, the second user's terminal may determine a predefined zone entry, based on the location information of the first user's terminal included in the virtual machine request information received in the operation S525.

In operation S527, based on the virtual machine request information received in the operation S525, the second user's terminal may determine a virtual machine to be transmitted.

In operation S528, the second user's terminal may transmit the virtual machine determined in the operation S527 to the first user's terminal.

In operation S529, the first user's terminal may drive the virtual machine. In operation S530, the first user's terminal may store a predefined application and data included in the virtual machine.

That is, it is possible to achieve an effect of sharing content between the first user's terminal and the second user's terminal. For example, when the second user's terminal migrates the virtual machine to the first user's terminal in which an OS different from that of the second user's terminal is embedded, content sharing may be possible.

In operation S531, the second user's terminal according to an exemplary embodiment may determine a zone exit of the first user's terminal. In operation S532, when the second user's terminal determines that the first user's terminal has exited the zone, the second user's terminal may transmit a virtual machine delete command signal to the first user's terminal. In operation S533, the first user's terminal may delete the virtual machine, according to the virtual machine delete command signal.

The second user's terminal according to an exemplary embodiment may share the application or the data with the first user's terminal within the predefined zone.

The aforementioned exemplary embodiments should be considered in a descriptive sense only and not for purposes of limitation, and are not limited to an order of the operations in the flowchart of FIG. 62. According to one or more exemplary embodiments, some operations may be skipped or added, and an order of some operations may be changed.

The one or more exemplary embodiments described herein may be applied to different exemplary embodiments, and only some exemplary embodiments may be embodied and a plurality of exemplary embodiments may be combined.

Figure 63:
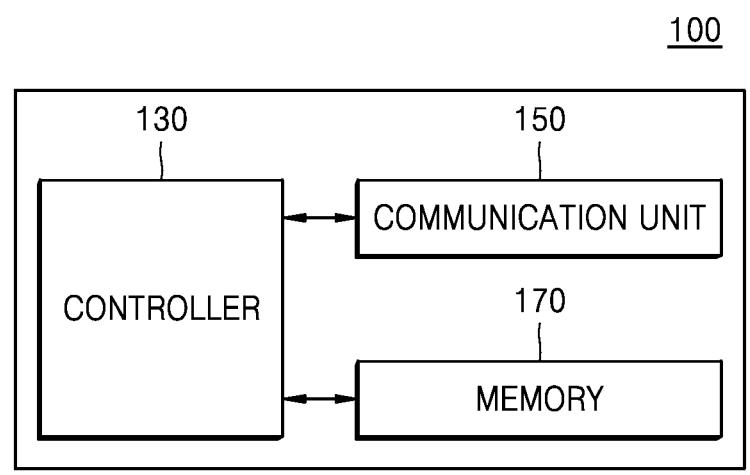
FIGS. 63 and 64 are block diagrams illustrating the mobile terminal, according to one or more exemplary embodiments.

FIGS. 63 and 64 are block diagrams illustrating the mobile terminal 100, according to one or more exemplary embodiments.

As illustrated in FIG. 63, the mobile terminal 100 according to an exemplary embodiment may include the communication unit 150, the memory 170, and the controller 130. However, not all elements shown in FIG. 63 are necessary elements of the mobile terminal 100. That is, the mobile terminal 100 may be embodied with more or less elements than the elements shown in FIG. 63.

For example, as illustrated in FIG. 64, the mobile terminal 100 may further include the display unit 121 (e.g., display), a sensing unit 140, a user input unit 110 (e.g., user interface), an output unit 120 (e.g., outputter), and an audio/video (A/V) input unit 160 (e.g., A/V inputter), as well as the communication unit 150 (e.g., communicator), the memory 170, and the controller 130.

The user input unit 110 may be a unit by which a user inputs data so as to control the mobile terminal 100. For example, the user input unit 110 may include at least one of a key pad, a dome switch, a touch pad (a touch capacitive type touch pad, a pressure resistive type touch pad, an infrared beam sensing type touch pad, a surface acoustic wave type touch pad, an integral strain gauge type touch pad, a piezo effect type touch pad, and the like), a jog wheel, and a jog switch, but exemplary embodiments are not limited thereto.

The user input unit 110 may receive a user input by being controlled by the controller 130.

The output unit 120 may output an audio signal, a video signal, or a vibration signal by being controlled by the controller 130, and may include the display unit 121, a sound output unit 122 (e.g., speaker), a vibration motor 123, and the like.

The display unit 121 displays information that is processed in the mobile terminal 100, by being controlled by the controller 130.

If the display unit 121 and a touch pad form a mutual layer structure and then are formed as a touch screen, the display unit 121 may be used as both an output device and input device. The display unit 121 may include at least one of liquid crystal display (LCD), a thin film transistor-liquid crystal display (TFT-LCD), an organic light-emitting diode (OLED) display, a flexible display, a three-dimensional (3D) display, and an electrophoretic display. According to a type of the mobile terminal 100, the mobile terminal 100 may include at least two display units 121. Here, the at least two display units 121 may be disposed to face each other by using a hinge.

The sound output unit 122 may output audio data that is received from the communication unit 150 or is stored in the memory 170. The sound output unit 122 may also output a sound signal (e.g., a call signal receiving sound, a message receiving sound, a notifying sound, and the like) related to capabilities performed by the mobile terminal 100. The sound output unit 122 may include a speaker, a buzzer, and the like.

The vibration motor 123 may output a vibration signal. For example, the vibration motor 123 may output the vibration signal that corresponds to an output of the audio data (e.g., the call signal receiving sound, the message receiving sound, and the like) or video data. When a touch is input to the touch screen, the vibration motor 123 may output a vibration signal.

The controller 130 may generally control all operations of the mobile terminal 100 and a flow of signals between internal elements 110 through 170 of the mobile terminal 100, and may process data. For example, the controller 130 may control the user input unit 110, the output unit 120, the sensing unit 140, the communication unit 150, the A/V input unit 160, etc. by executing programs stored in the memory 170. When a user input is received or a preset and stored condition is satisfied, the controller 130 may execute an OS and various applications stored in the memory 170.

In more detail, the controller 130 according to an exemplary embodiment may determine indoor and outdoor locations of the mobile terminal 100 by using the location sensor 146.

The controller 130 may generate virtual machine request information including at least one of location information of the mobile terminal 100 and user information.

The controller 130 may transmit the virtual machine request information to the server 200.

The controller 130 may receive a virtual machine from the server 200.

The controller 130 may drive the virtual machine.

The controller 130 may receive, via the communication unit 150, an application that is executable in a particular zone corresponding to the location information of the mobile terminal 100, and an OS for executing the application from the server 200 corresponding to the location information of the mobile terminal 100, and may install the application and the OS in the memory 170. The installed application and OS may operate in the virtual machine.

The controller 130 may receive, via the communication unit 150, data used in executing the application from the server 200 corresponding to the location information of the mobile terminal 100.

The controller 130 may access, via the communication unit 150, data stored in a storage of the server 200 corresponding to the location information of the mobile terminal 100, and may read or may write the data. The controller 130 may access data stored in the server 200, by using an NFS.

The controller 130 may execute the application and may store, in the memory 170, data that is generated due to execution of the application. The controller 130 may execute the application, may transmit, via the communication unit 150, the data generated due to execution of the application to the server 200 corresponding to the location information of the mobile terminal 100, and may control the data to be stored in the storage of the server 200.

When the application and the OS received from the server 200 are installed in the memory 170, the controller 130 may set whether to store the data, which is generated due to execution of the application, in the memory 170 or whether to store, via the communication unit 150, the data in the server 200 that corresponds to the location information of the mobile terminal 100.

Based on the location information of the mobile terminal 100, when the controller 130 determines that the mobile terminal 100 has entered the particular zone, the controller 130 may display, on the display unit 121, information about an application that is executable in the particular zone.

When the controller 130 drives a virtual machine that includes the OS received from the server 200, the controller 130 may change a screen of the display unit 121 to a background screen that corresponds to the received OS.

Based on the location information of the mobile terminal 100, when the controller 130 determines that the mobile terminal 100 has exited the particular zone, the controller 130 may delete the application and the OS that were installed in the memory 170 and are driven in the virtual machine.

Based on the location information of the mobile terminal 100, when the controller 130 determines that the mobile terminal 100 exited the particular zone, the controller 130 may transmit, to the server 200, the application and the OS that were installed in the memory 170 and are driven in the virtual machine.

The sensing unit 140 may sense a state of the mobile terminal 100 or a status around the mobile terminal 100 and may transfer sensed information to the controller 130. The sensing unit 140 may include at least one selected from a magnetic sensor 141, an acceleration sensor 142, a temperature/humidity sensor 143, an infrared sensor 144, a gyroscope sensor 145, a location sensor (e.g., GPS) 146, an air pressure sensor 147, a proximity sensor 148, and an RGB sensor (e.g., a luminance sensor) 149, but one or more exemplary embodiments are not limited thereto.

The sensing unit 140 may include a sensor for sensing a touch input via an input instrument, and a sensor for sensing a touch input by a user. In this case, the sensor for sensing the touch input by the user may be included in the touch screen or the touch pad. The sensor for sensing the touch input via the input instrument may be formed underneath or in the touch screen or the touch pad.

The communication unit 150 may include one or more elements allowing communication between the mobile terminal 100 and an external device or between the mobile terminal 100 and the server 200. For example, the communication unit 150 may include a short-range wireless communication unit 151, a mobile communication unit 152, and a broadcast receiving unit 153.

The short-range wireless communication unit 151 may include, but is not limited to, a Bluetooth communication unit, a BLE communication unit, an NFC unit, a WLAN (Wi-Fi) communication unit, a ZigBee communication unit, an infrared Data Association (IrDA) communication unit, a Wi-Fi Direct (WFD) communication unit, a ultra wideband (UWB) communication unit, and an Ant+ communication unit.

The mobile communication unit 152 exchanges a wireless signal with at least one of a base station, an external terminal, and a server on a mobile communication network. The wireless signal may include various types of data according to communication of a sound call signal, a video call signal, or a text/multimedia message.

The broadcast receiving unit 153 receives a broadcast signal and/or information related to a broadcast from the outside through a broadcast channel. The broadcast channel may include a satellite channel and a ground wave channel. In another embodiment, the mobile terminal 100 may not include the broadcast receiving unit 153.

The A/V input unit 160 may receive an input of an audio signal or a video signal and may include a camera 161 and a microphone 162. The camera 161 may obtain an image frame such as a still image or a moving picture via an image sensor during a video call mode or an image-capturing mode. An image that is captured via the image sensor may be processed by the controller 130 or a separate image processing unit.

The image frame that is processed by the camera 161 may be stored in the memory 170 or may be transmitted to an external source via the communication unit 150. According to a configuration of the mobile terminal 100, two or more cameras 161 may be arranged.

The microphone 162 receives an input of an external sound signal and processes the received sound signal into electrical voice data. For example, the microphone 162 may receive a sound signal from an external device or a speaker. In order to remove noise that occurs while the sound signal is externally input, the microphone 162 may use various noise removing algorithms.

The memory 170 may store a program for processing and controlling the controller 130, and may store a plurality of pieces of data that are input to or output from the mobile terminal 100.

The memory 170 may include a storage medium of at least one type selected from a flash memory, a hard disk, a multimedia card type memory, a card type memory such as a secure digital (SD) or xD-Picture (xD) card memory, a random access memory (RAM), a static random access memory (SRAM), a read-only memory (ROM), an electrically erasable programmable read-only memory (EEPROM), a programmable read-only memory (PROM), a magnetic memory, a magnetic disc, and an optical disc. The mobile terminal 100 may run web storage or a cloud server that performs a storage function of the memory 170 on the Internet.

The memory 170 may store a program for processing and controlling the controller 130. The application that is executable in the particular zone corresponding to the location information of the mobile terminal 100, and the OS for executing the application may be installed in the memory 170, wherein the application and the OS are received, via the communication unit 150, from the server 200 in the particular zone corresponding to the location information of the mobile terminal 100.

According to an exemplary embodiment, the memory 170 may include a storage in which a plurality of pieces of data are stored. The memory 170 may store the data that is generated due to execution of the application.

The programs stored in the memory 170 may be classified into a plurality of modules according to their functions, for example, into a user interface (UI) module 171, a touch screen module 172, an alarm module 173, etc.

The UI module 171 may provide a specialized UI or graphical user interface (GUI) in connection with the mobile terminal 100 for each application. The touch screen module 172 may detect a user's touch gesture on the touch screen and transmit information related to the touch gesture to the controller 130. The touch screen module 172 may recognize and analyze a touch code. The touch screen module 172 may be configured by additional hardware including a controller.

Various sensors may be arranged in or near the touch screen so as to detect a touch or a proximate touch on the touch sensor. An example of the sensor to detect the touch on the touch screen may include a tactile sensor. The tactile sensor detects a contact of a specific object at least as sensitively as a person can detect. The tactile sensor may detect various types of information such as the roughness of a contact surface, the hardness of the contact object, the temperature of a contact point, and the like.

An example of the sensor to detect the touch on the touch screen may include a proximity sensor. The proximity sensor detects the existence of an object that approaches a predetermined detection surface or that exists nearby, by using a force of an electro-magnetic field or an infrared ray, instead of a mechanical contact. Examples of the proximity sensor include a transmission-type photoelectric sensor, a direction reflection-type photoelectric sensor, a mirror reflection-type photoelectric sensor, a high frequency oscillation-type proximity sensor, a capacity-type proximity sensor, a magnetic proximity sensor, an infrared-type proximity sensor, and the like. The touch gesture of the user may include a tap gesture, a touch & hold gesture, a double tap gesture, a drag gesture, a panning gesture, a flick gesture, a drag & drop gesture, a swipe gesture, and the like.

The alarm module 173 may generate a signal for notifying the user about an occurrence of an event in the mobile terminal 100. Examples of the event that may occur in the mobile terminal 100 include a call signal receiving event, a message receiving event, a key signal input event, a schedule notifying event, and the like. The alarm module 173 may output an alarm signal in the form of a video signal via the display unit 121, an alarm signal in the form of an audio signal via the sound output unit 122, or an alarm signal in the form of a vibration signal via the vibration motor 123.

FIG. 65 is a block diagram illustrating the server 200, according to an exemplary embodiment.

As illustrated in FIG. 65, the server 200 according to an exemplary embodiment may include the communication unit 903, the memory 905, and the controller 901. However, not all elements shown in FIG. 65 are necessary elements of the server 200. That is, the server 200 may be embodied with more or less elements than the elements shown in FIG. 65.

The controller 901 may generally control all operations of the server 200 and a flow of signals between internal elements 903 and 905 of the server 200, and may process data. In more detail, the controller 901 of the server 200 according to an exemplary embodiment may receive virtual machine request information from the mobile terminal 100.

The controller 901 of the server 200 may determine that the mobile terminal 100 has entered a predefined zone.

The controller 901 of the server 200 may preset a zone with a predefined range, based on location information.

Based on the virtual machine request information, the controller 901 may determine a virtual machine to be transmitted to the mobile terminal 100. The controller 901 may transmit the determined virtual machine to the mobile terminal 100.

The controller 901 may obtain location information of the mobile terminal 100 at regular intervals, and when the controller 901 determines that the mobile terminal 100 has exited a particular zone, the controller 901 may transmit, to the mobile terminal 100 via the communication unit 903, a signal for reclaiming an application and an OS that were transmitted to the mobile terminal 100.

The controller 901 may obtain the location information of the mobile terminal 100 at regular intervals, and when the controller 901 determines that the mobile terminal 100 has exited the particular zone, the controller 901 may transmit, to the mobile terminal 100 via the communication unit 903, a signal for deleting the application and the OS that were transmitted to the mobile terminal 100.

The controller 901 may obtain the location information of the mobile terminal 100 at regular intervals, and when the controller 901 determines that the mobile terminal 100 has exited the particular zone, the controller 901 may transmit, to the mobile terminal 100 via the communication unit 903, a signal for limiting at least some of functions provided by the application that was transmitted to the mobile terminal 100.

When a predefined time period elapses, the controller 901 may transmit, to the mobile terminal 100 via the communication unit 903, the signal for limiting at least some of functions provided by the application that was transmitted to the mobile terminal 100.

The communication unit 903 may include one or more elements allowing communication between the server 200 and an external device. For example, the communication unit 903 may include a short-range wireless communication unit, a mobile communication unit, and a broadcast receiving unit.

The memory 905 may include a storage medium of at least one type selected from a flash memory, a hard disk, a multimedia card type memory, a card type memory such as an SD or xD card memory, a RAM, a SRAM, a ROM, an EEPROM, a PROM, a magnetic memory, a magnetic disc, and an optical disc. The server 200 may run web storage or a cloud server that performs a storage function of the memory 905 on the Internet.

The memory 905 may store a program for processing and controlling the controller 901, and may store a plurality of pieces of data that are input to or output from the server 200.

The memory 905 may store a program for processing and controlling the controller 901. The memory 905 may install the virtual machine including the application and the OS for executing the application.

According to an exemplary embodiment, the memory 905 may include a storage in which a plurality of pieces of data are stored. The memory 905 may store data that is requested for execution of the application or data that is generated and is changed due to execution of the application.

According to an exemplary embodiment, the memory 905 may store a virtual disk file that is requested for execution of the application, when the virtual machine is driven.

The memory 905 may store a virtual disk file to which the mobile terminal 100 may access (for read and write) by using an NFS.

The one or more exemplary embodiments described herein may be applied to different exemplary embodiments, and only some exemplary embodiments may be embodied or a plurality of exemplary embodiments may be combined.

The one or more embodiments may be embodied as a recording medium, e.g., a program module to be executed in computers, which include computer-readable commands. The computer storage medium may include any usable medium that may be accessed by computers, volatile and non-volatile medium, and detachable and non-detachable medium. Also, the computer storage medium includes all volatile and non-volatile media, and detachable and non-detachable media which are technically implemented to store information including computer readable commands, data structures, program modules or other data. The communication medium includes computer-readable commands, a data structure, a program module, other data as modulation-type data signals such as carrier signals, or other transmission mechanism, and includes other information transmission mediums.

Throughout the present disclosure, the term 'unit' may indicate a hardware component such as a processor or a circuit, and/or may indicate a software component that is executed by a hardware configuration such as a processor.

It should be understood that the exemplary embodiments described herein should be considered in a descriptive sense only and not for purposes of limitation. Descriptions of features or aspects within each embodiment should typically be considered as available for other similar features or aspects in other exemplary embodiments. For example, configuring elements that are singular forms may be executed in a distributed fashion, and also, configuring elements that are distributed may be combined and then executed.

While one or more exemplary embodiments have been described with reference to the figures, it will be understood by those of ordinary skill in the art that various changes in form and details may be made without departing from the spirit and scope as defined by the following claims.

What is claimed is:

1. A mobile terminal comprising:
a memory;
a location finder;
a communicator; and
a controller configured to:

obtain location information of the mobile terminal by the location finder;

in response to the obtained location information corresponding to a predetermined area, receive, via the communicator, an application corresponding to the predetermined area together with an operating system (OS) corresponding to the predetermined area for executing the application, from a server that corresponds to the predetermined area, the application corresponding to the predetermined area and the operating system (OS) corresponding to the predetermined area being executable when the mobile terminal being located within the predetermined area; and install the received application and the received OS in the memory.

2. The mobile terminal of claim 1, wherein the application and the OS are configured to operate in a virtual machine.

3. The mobile terminal of claim 1, wherein, in response to the controller determining, based on the obtained location information, that the mobile terminal has entered the predetermined area, the controller is further configured to transmit virtual machine request information comprising the obtained location information to the server that corresponds to the obtained location information.

4. The mobile terminal of claim 1, wherein the controller is further configured to receive, via the communicator, data that is used for executing the application, from the server corresponding to the obtained location information.

5. The mobile terminal of claim 1, wherein the controller is further configured to execute the application, and to access, via the communicator, data that is stored in the server corresponding to the obtained location information and is used in executing the application.

6. The mobile terminal of claim 5, wherein the controller is further configured to access the data stored in the server corresponding to the obtained location information by using a network file system (NFS).

7. The mobile terminal of claim 1, wherein the controller is further configured to execute the application, and to store, in the memory, data that is generated by the execution of the application.

8. The mobile terminal of claim 1, wherein the controller is further configured to:
execute the application;
transmit, via the communicator, data generated by the execution of the application, to the server that corresponds to the obtained location information; and
control the data to be stored in the server.

9. The mobile terminal of claim 1,
wherein, when the application and the OS are installed in the memory, the controller is further configured to set whether to store data generated by execution of the application in the memory, or whether to store, via the communicator, the data in the server corresponding to the obtained location information.

10. The mobile terminal of claim 1, further comprising a display, wherein,
in response to the controller determining, based on the obtained location information, that the mobile terminal has entered the predetermined area, the controller is further configured to control the display to display information about the application that is executable in the predetermined area.

11. The mobile terminal of claim 1, further comprising a display configured to display a background screen corresponding to an OS that is being driven in the mobile terminal, and
wherein, when the controller drives the OS received from the server, the controller is further configured to switch a screen of the display to a background screen corresponding to the OS received from the server.

12. The mobile terminal of claim 1, wherein the location finder is further configured to obtain the location information of the mobile terminal at regular intervals.

13. The mobile terminal of claim 12, wherein,
in response to the controller determining, based on the obtained location information, that the mobile terminal has exited the predetermined area, the controller is further configured to delete the installed application and the installed OS.

14. The mobile terminal of claim 12, wherein,
in response to the controller determining, based on the obtained location information, that the mobile terminal has exited the predetermined area, the controller is further configured to transmit the installed application and the installed OS to the server.

15. A method of executing an application within a predetermined area, the method performed by a mobile terminal and comprising:
obtaining location information of the mobile terminal;
in response to the obtained location information corresponding to the predetermined area, receiving, via a communicator, an application corresponding to the predetermined area together with an operating system (OS) corresponding to the predetermined area for executing the application, from a server that corresponds to the predetermined area, the application corresponding to the predetermined area and the operating system (OS) corresponding to the predetermined area being executable when the mobile terminal being located within the predetermined area; and
installing the received application and the received OS in a memory of the mobile terminal.

16. The method of claim 15, wherein the installed application and the installed OS operate in a virtual machine.

17. The method of claim 15, further comprising determining, based on the obtained location information, whether the mobile terminal has exited the predetermined area, and if the mobile terminal has exited the predetermined area, deleting the installed application and the installed OS, and
wherein the obtaining the location information comprises obtaining the location information of the mobile terminal at regular intervals.

18. A server that provides an application that is executable within a predetermined area, the server comprising:
a communicator; and
a controller configured to:
in response to a location information of a mobile terminal corresponding to the predetermined area, transmit, via the communicator, the application corresponding to the predetermined area together with an operating system (OS) corresponding to the predetermined area for executing the application, to the mobile terminal, the application corresponding to the predetermined area and the operating system (OS) corresponding to the predetermined area being executable when the mobile terminal being located within the predetermined area.

19. The server of claim 18, wherein,
in response to the controller obtaining location information of the mobile terminal at regular intervals and determining, based on the location information, that the mobile terminal has exited the predetermined area,
the controller is further configured to transmit, via the communicator, a signal to the mobile terminal for reclaiming the application and the OS.

20. The server of claim 18, wherein,
in response to the controller obtaining location information of the mobile terminal at regular intervals and determining, based on the location information, that the mobile terminal has exited the predetermined area,
the controller is further configured to transmit, via the communicator, a signal to the mobile terminal for deleting the application and the OS.

21. The server of claim 18, wherein,
in response to the controller obtaining location information of the mobile terminal at regular intervals and determining, based on the location information, that the mobile terminal has exited the predetermined area,
the controller is further configured to transmit, via the communicator, a signal to the mobile terminal for limiting at least one function that is provided by the application.

22. The server of claim 18, wherein, after a predetermined time period has elapsed, the controller is further configured to transmit, via the communicator, a signal to the mobile terminal for limiting at least one function that is provided by the application.

23. A system comprising a mobile terminal that executes an application within a predetermined area and a server that provides the application, wherein
the mobile terminal is configured to:
obtain location information of the mobile terminal;
in response to the obtained location information corresponding to the predetermined area, receive the application corresponding to the predetermined area together with an operating system (OS) corresponding to the predetermined area for executing the application, from the server corresponding to the predetermined area, the application corresponding to the predetermined area and the operating system (OS) corresponding to the predetermined area being executable when the mobile terminal being located within the predetermined area; and
install the received application and the received OS in a memory of the mobile terminal; and
the server is configured to transmit the application together with the OS for executing the application to the mobile terminal located within the predetermined area.

24. The system of claim 23, wherein the mobile terminal comprises a display on which a user is notified when the user enters a predetermined area.

25. The system of claim 23, wherein the mobile terminal is further configured to receive a user input signal for a virtual machine request.

26. A method of driving a virtual machine on a mobile terminal, the method comprising:
obtaining location information of the mobile terminal;
receiving an input signal from a user comprising user information;
generating virtual machine request information comprising at least one from among the location information of the mobile terminal and the user information;
transmitting the virtual machine request information to an external source; and
in response to the obtained location information corresponding to a predetermined area, receiving an application corresponding to the predetermined area together with an operating system (OS) corresponding to the predetermined area for executing the application, from the external source that corresponds to the predetermined area, the application corresponding to the predetermined area and the operating system (OS) corresponding to the predetermined area being executable when the mobile terminal being located within the predetermined area.

27. The method of claim 26, wherein the user information comprises at least one from among age information of the user, gender information of the user, nationality information of the user, and position information in a company of the user.

28. The method of claim 26, wherein the location information comprises at least one from among address information of a current location, building information, and a particular floor of a building.

* * * * *